(12) United States Patent
Iyer et al.

(10) Patent No.: US 12,177,868 B2
(45) Date of Patent: Dec. 24, 2024

(54) INTRA-UE PRIORITIZATION IN UPLINK TRANSMISSIONS

(71) Applicant: InterDigital Patent Holdings, Inc., Wilmington, DE (US)

(72) Inventors: Lakshmi R. Iyer, King of Prussia, PA (US); Stephen E. Terry, Northport, NY (US); Patrick Svedman, Stockholm (SE); Qing Li, Princeton Junction, NJ (US); Yifan Li, Conshohocken, PA (US); Pascal M. Adjakple, Great Neck, NY (US); Guodong Zhang, Woodbury, NY (US); Allan Y. Tsai, Boonton, NJ (US); Mohamed Awadin, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/759,537

(22) Filed: Jun. 28, 2024

(65) Prior Publication Data

US 2024/0357606 A1 Oct. 24, 2024

Related U.S. Application Data

(63) Continuation of application No. 17/429,689, filed as application No. PCT/US2020/018333 on Feb. 14, 2020, now Pat. No. 12,069,679.

(Continued)

(51) Int. Cl.
*H04W 72/23* (2023.01)
*H04W 72/1268* (2023.01)
(Continued)

(52) U.S. Cl.
CPC ....... *H04W 72/23* (2023.01); *H04W 72/1268* (2013.01); *H04W 72/20* (2023.01); *H04W 72/569* (2023.01); *H04W 80/02* (2013.01)

(58) Field of Classification Search
CPC .............. H04W 80/02; H04W 72/566; H04W 72/20; H04W 72/1268; H04W 72/23
See application file for complete search history.

(56) References Cited

U.S. PATENT DOCUMENTS 11,212,825 B2 * 12/2021 Gong ................... H04L 5/0092
11,696,120 B2 * 7/2023 Shimezawa ........... H04W 76/27
370/329

(Continued)

FOREIGN PATENT DOCUMENTS

| JP | 2012-503379 A | 2/2012 |
| JP | 2018-207493 A | 12/2018 |
| WO | WO 2019/016951 A1 | 1/2019 |

OTHER PUBLICATIONS

3rd Generation Partnership Project, "DL/UL Intra-UE Transmission Prioritization and Multiplexing" Huawei, HiSilicon, R1-1810718, 3GPP TSG RAN WG1 Meeting #94bis, Oct. 8-12, 2018, 9 pages.

(Continued)

*Primary Examiner* — Hassan A Phillips
*Assistant Examiner* — Prenell P Jones
(74) *Attorney, Agent, or Firm* — Flaster Greenberg P.C.

(57) ABSTRACT

Methods and apparatuses are described herein for Intra-UE Prioritization in uplink (UL) transmissions. In an example, an apparatus may receive first information indicating a first uplink grant associated with a first transmission and second information indicating a second uplink grant associated with a second transmission. The apparatus may determine, based on the first information and the second information, that the first transmission and the second transmission overlap at least partially in time. The apparatus may determine a first priority associated with the first transmission and a second priority associated with the second transmission. The apparatus may then cause, based at least in part on the first priority and the second priority, at least one of: prioritization of one transmission over another transmission, or preemption of the first transmission by the second transmission.

20 Claims, 59 Drawing Sheets

Related U.S. Application Data

(60) Provisional application No. 62/805,614, filed on Feb. 14, 2019, provisional application No. 62/824,701, filed on Mar. 27, 2019.

(51) Int. Cl.
   *H04W 72/20* (2023.01)
   *H04W 72/566* (2023.01)
   *H04W 80/02* (2009.01)

(56) References Cited

U.S. PATENT DOCUMENTS

| | | | |
|---|---|---|---|
| 2011/0255492 A1 | 10/2011 | Dai et al. | |
| 2012/0275381 A1 | 11/2012 | Kim et al. | |
| 2017/0367110 A1 | 12/2017 | Li et al. | |
| 2018/0242351 A1 | 8/2018 | Dinan | |
| 2018/0359766 A1 | 12/2018 | Shih | |
| 2020/0015250 A1* | 1/2020 | Yang | H04W 52/06 |
| 2020/0146045 A1* | 5/2020 | Loehr | H04L 1/1812 |
| 2020/0236582 A1* | 7/2020 | Chin | H04W 72/23 |
| 2021/0160901 A1 | 5/2021 | Takeda et al. | |
| 2021/0378046 A1 | 12/2021 | Shimoda et al. | |
| 2022/0070896 A1 | 3/2022 | Wong et al. | |
| 2022/0248395 A1* | 8/2022 | Andersson | H04W 72/21 |

OTHER PUBLICATIONS

3rd Generation Partnership Project, "Considerations on Intra-UE Transmission Multiplexing & Prioritisation", Sony, R1-1900376, 3GPP TSG RAN WG1 Ad-Hoc Meeting 1901, Jan. 21-25, 2019, 9 pages.

3rd Generation Partnership Project, "E-mail Discussion Summary [103bis#41] [NR/IIoT] Intra-UE Prioritization (Nokia)", Nokia (Rapporteur), R2-1817579, 3GPP TSG-RAN WG2 #104, Nov. 12-16, 2018, 45 pages.

3rd Generation Partnership Project, "LS on Intra-UE Prioritization/ Multiplexing", R2-1818795, 3GPP TSG-RAN WG2 Meeting #104, Spokane, USA, Nov. 12-16, 2018, 2 pages.

* cited by examiner

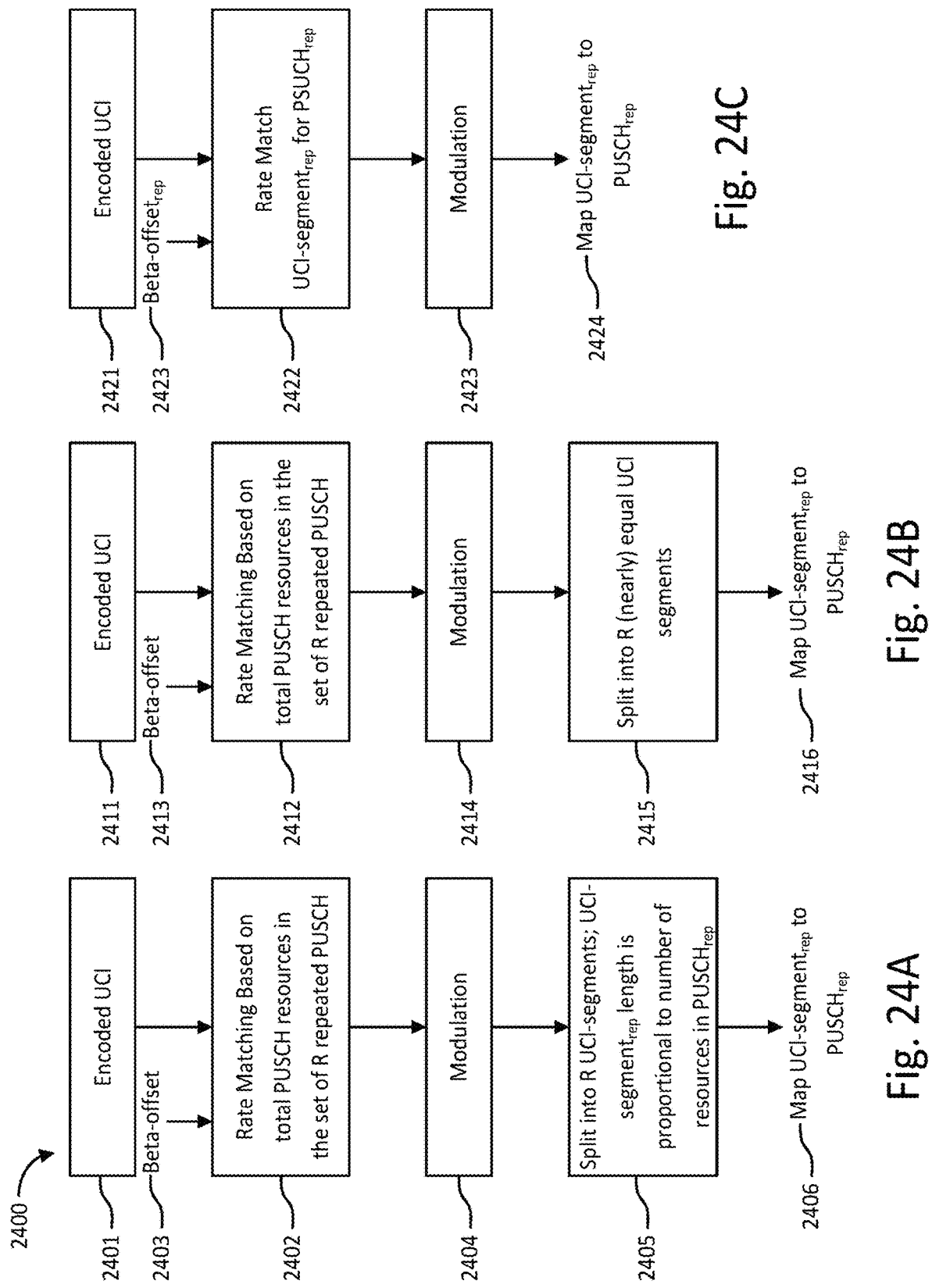

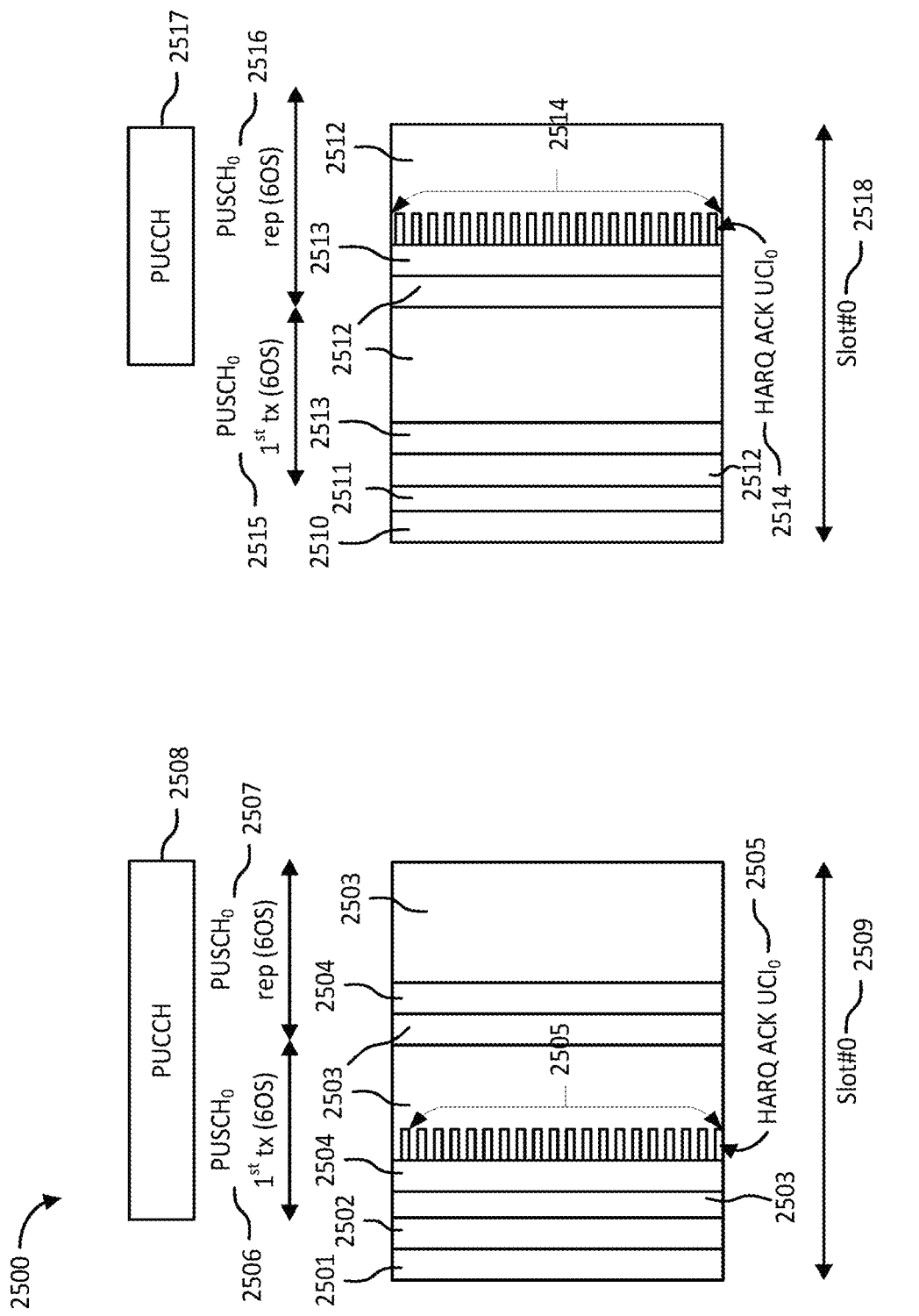

INTRA-UE PRIORITIZATION IN UPLINK TRANSMISSIONS

CROSS-REFERENCE TO RELATED APPLICATIONS

This Application is a Continuation of U.S. patent application Ser. No. 17/429,689 filed, Aug. 10, 2021, which is the National Stage Application of International Patent Application No. PCT/US2020/018333, filed Feb. 14, 2020, which claims the benefit of U.S. Provisional Patent Application No. 62/805,614, filed Feb. 14, 2019, and U.S. Provisional Patent Application No. 62/824,701, filed Mar. 27, 2019, which are hereby incorporated by reference in their entirety.

BACKGROUND

It may be desirable to support transmissions of various priority levels to support different applications. While the priorities may be identifiable at the Medium Access Control (MAC) layer, sometimes it may be beneficial to enable identification of priority at the physical layer itself. This can happen when a physical transmission has begun but must be preempted at the physical layer. Accordingly, there is a need to identify the priority at the physical layer, define UE behavior when intra-UE collision occurs on the Physical Downlink Shared Channel (PDSCH), define the UE procedures to handle the collision, and enable the UE to resolve the prioritization at the MAC layer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for Intra-UE Prioritization during transmission. Methods are described for identifying the priority of a transmission in the UL, handling intra-UE PDSCH collisions, supporting multiple HARQ ACK codebooks, enabling UCI on the Physical Uplink Shared Channel (PUSCH) for multiple priorities, PUSCH repetition, handling collision of HARQ IDs for a configured grant (CG) and a dynamic grant, and enabling MAC layer handling of intra-UE conflicts.

In an example, an apparatus may receive first information indicating a first uplink grant associated with a first transmission and second information indicating a second uplink grant associated with a second transmission. The apparatus may determine, based on the first information and the second information, that the first transmission and the second transmission overlap at least partially in time. The apparatus may determine a first priority associated with the first transmission and a second priority associated with the second transmission. The apparatus may then cause, based at least in part on the first priority and the second priority, at least one of: prioritization of one transmission over another transmission, or preemption of the first transmission by the second transmission.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 24A is a diagram of Splitting modulated UCI symbols between repetitions Jointly generated UCI symbols across repetitions, mapping in proportion to the PUSCH resource in each segment;

FIG. 24B is a diagram of Splitting modulated UCI symbols between repetitions Jointly generated UCI symbols across repetitions, mapping nearly equally between the PUSCH segments;

FIG. 24C is a diagram of Splitting modulated UCI symbols between repetitions Separately generated UCI modulated symbols for each repetition;

FIG. 25A is a diagram of UCI transmission over PUSCH repetitions with mapping the UCI to the PUSCH with minimal latency;

FIG. 25B is a diagram of UCI transmission over PUSCH repetitions with mapping the UCI to the PUSCH which aligns with the end of;

DETAILED DESCRIPTION OF ILLUSTRATIVE EMBODIMENTS

Figure 1:
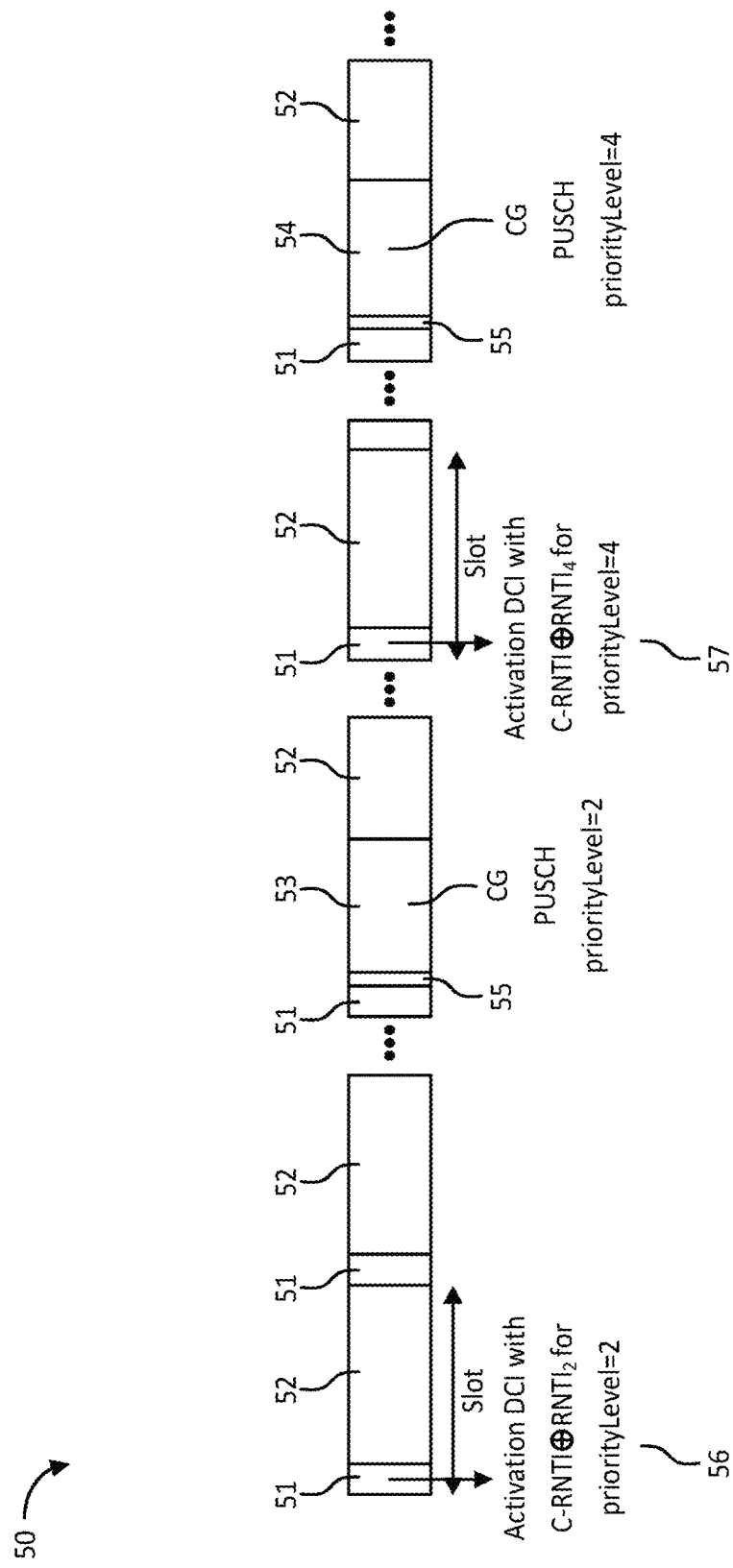
FIG. 1 is a diagram of Activation DCI changing the priority of a Type-2 configured Grant.

Methods and apparatuses are described herein for Intra-UE Prioritization during transmission. In the embodiments described herein, the terms user equipment (UE), wireless communications device, and wireless transmit/receive unit (WTRU) may be used interchangeably, without limitation, unless otherwise specified.

The following abbreviations and definitions may be used herein:

BWP Bandwidth Part
cDAI counter-DownLink Assignment Index
CA Carrier Aggregation
CBG Code Block Group
CG Configured Grant
CNGTI Code Block Group Transmission Index
C-RNTI Cell Radio-Network Temporary Identifier
CS-RNTI Configured Schedule Radio-Network Temporary Identifier
CSI-RS Channel State Information Reference Signal
DAI DownLink Assignment Index
DC Dual Connectivity
DL Downlink
DL-SCH Downlink Shared Channel
DMRS Demodulation Reference Signal
eMBB enhanced Mobile Broadband
eNB Evolved Node B
FDD Frequency Division Duplex
FR1 Frequency region 1 (sub 6 GHz)
FR2 Frequency region 2 (mmWave)
gNB NR NodeB
HARQ Hybrid ARQ
IE Information Element
IIOT Industrial Internet of Things
KPI Key Performance Indicators
L1 Layer 1
L2 Layer 2
L3 Layer 3
LAA License Assisted Access
LTE Long Term Evolution
MAC Medium Access Control
MCS Modulation Coding Scheme
MCS-C-RNTI Modulation Coding Scheme Cell Radio Network Temporary Identifier
MIB Master Information Block
MTC Machine-Type Communications
mMTC Massive Machine Type Communication
NR New Radio
NR-U NR Unlicensed
OS OFDM Symbol
OFDM Orthogonal Frequency Division Multiplexing
PCell Primary Cell
PHY Physical Layer
PRACH Physical Random Access Channel
PRI PUCCH Resource Indicator
RACH Random Access Channel
RAN Radio Access Network
RAP Random Access Preamble
RAR Random Access Response
RAT Radio Access Technology
RRC Radio Resource Control
RS Reference signal
SCell Secondary Cell
SI System Information
SR Scheduling Request
tDAI total-DownLink Assignment Index
TB Transport Block
TCI Transmission Configuration Indicator
TDD Time Division Duplex
TRP Transmission and Reception Point
TTI Transmission Time Interval
UE User Equipment
UL Uplink
UL-SCH Uplink Shared Channel
URLLC Ultra-Reliable and Low Latency Communications In applications such as Industrial Internet of Things (IIOT), multiple data streams may be generated by a sensor or actuator. These streams may be transmitted to the gNB through a common UE. The data streams may have different requirements in terms of latency, reliability, payload size, QoS, etc. The network must enable the gNB and UE to prioritize the data streams according to their requirements. A simple example is the case where a UE supports both eMBB and URLLC operation. For example, a drone may require eMBB capabilities to support video transmission but URLLC capabilities to be steered in real time. It may be necessary to prioritize URLLC transmissions such as PDSCH, PUSCH, Physical Downlink Control Channel (PDCCH), PUCCH over eMBB transmissions.

Some scenarios where prioritization must occur due to resource conflict between priorities include but are not limited to the following: intra-UE prioritization of high priority PDSCH grant over low priority PUSCH grant; intra-UE prioritization of PUSCH when there is resource conflict between a CG and dynamic grant; intra-UE prioritization of PUSCH when there is resource conflict between dynamic high priority PUSCH grant over dynamic low priority PUSCH grant; intra-UE prioritization of UL control information when there is resource conflict between control information transmissions of different priorities; and intra-UE prioritization when there is resource conflict between control channel and data channel of different priorities. In addition, the following scenario may be considered, when a UE is configured with multiple CGs: intra-UE prioritization of between multiple CGs PUSCH of different priorities.

In 3GPP NR Rel 15, a group-common PDCCH based preemption indicator (DCI with format 2_1 with INT-RNTI) was introduced to indicate to a group of eMBB UEs that certain resources are preempted in the DL. If a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The set of PRBs may be equal to the active DL BWP. The preempted resources may be indicated with coarse granularity (14 bits indicating the preemption status on a slot or multiples of it). The preemption indication in frequency may be particularly coarse as preemption may be indicated for at most half the BWP or the whole BWP even if the impacted resources do not span that bandwidth. The preemption indication may suggest the eMBB UE to flush its buffer if its PDSCH resources are impacted by the preemption. The UE may flush the impacted soft bits in its HARQ buffer or soft bits/symbols from some other buffer processing the impacted PDSCH. For example, the HARQ buffer may already contain soft bits from a previous eMBB reception and the preempted transmission is an eMBB re-transmission. Before soft combining the re-transmission with the previous transmission, the UE would typically first receive the signal into a receive buffer and then perform various operations on the received signal (e.g. FFT, channel estimation, demodulation) before combining the result into the HARQ soft bit buffer. In this case, HARQ soft bit buffer need not be flushed. But another intermediate buffer(s) containing the impacted retransmission may be flushed. Therefore, the location in which the flushing occurs is generically referred to as a buffer.

In 3GPP NR Rel 16, a preemption indication is being considered for the UL wherein, an indication is provided to eMBB UEs that some of its resources may be preempted by a URLLC transmission. Accordingly, the eMBB UE must not transmit in those resources.

3GPP NR Rel. 15 has defined PUCCH resource sets and multiple PUCCH resource configurations per resource set. A UE may determine the PUCCH resource set based on the payload of its UCI and the PUCCH resource indicator (PRI) from the DCI scheduling the grant. The spatial direction for PUCCH transmission may be configured per PUCCH resource and may be activated by a MAC control element (CE) from a list of RRC configured RS that indicate beam correspondence.

3GPP NR Rel. 15 supports semi-static and dynamic codebooks for HARQ ACK transmission. The UE may be configured to use one of the codebooks. The semi-static codebook may have a fixed size. The UE may transmit a HARQ ACK for every slot even if does not receive a grant for a PDSCH. It may transmit a Nack for such slots. Therefore, the payload can be large for the semi-static codebook. Dynamic codebooks may have a variable size and may support transmission of HARQ ACK only for scheduled grants. The scheduling DCI indicated cDAI and tDAI to the UE to indicate the number of scheduled grants for that codebook. cDAI is incremented every time a scheduling DCI is transmitted while tDAI keep count of total number of DAIs in the codebook (including scheduling across the carriers). If a DCI is not received, the discrepancy between cDAI and tDAI may indicate which DCI was not received. So the UE can determine without ambiguity the scheduled PDSCH and NACK the DCI that was not received.

If a UE has a PUSCH transmission that overlaps with certain PUCCH transmissions, the UE may piggyback the UCI on the PUSCH either by puncturing the PUSCH or by rate matching the PUSCH resources around the resources for UCI. Encoded HARQ-ACK bits may be mapped immediately after the first DMRS; if PUSCH uses frequency hopping, the HARQ-ACK modulated symbols may be split between the frequency hops. Encoded CSI bits may be mapped starting from the first non-DMRS symbol of the PUSCH.

Multiple traffic types with different latencies, reliability requirements, periodicities and payloads may be supported for a single UE. Multiple configured Grants (CGs) may be configured to a UE to support different traffic types and priorities.

In 3GPP NR Rel 15, the CG PUSCH was introduced. The grant may either be RRC configured (Type-1) or activated/deactivated through a DCI (Type-2). A configuredGrant-Timer may be started on transmission of a HARQ process to prevent a new transmission of the same HARQ process from the UE. If a CG PUSCH is not decoded correctly at the gNB, the gNB sends a dynamic grant for retransmission with CS-RNTI to the UE.

Code blocks Groups (CBGs) and were introduced in 3GPP NR Rel 15 so that UE can transmit ACK/NACK with finer granularity for a TB. Also, the gNB can schedule retransmissions for specific CBGs by indicating the index of the CBG through the CBGTI (Code Block Group Transmission Index) field in the DCI.

The embodiments described herein address issues related to transmissions of different priority levels. The examples described herein, URLLC traffic may be used to denote high priority transmission, and eMBB traffic may be used to denote low priority transmission. However, the techniques described herein may be applied to any transmission types where more than two priorities may be supported by the UE.

It may be desirable to support transmissions of various priority levels to support various applications. While the transmission priorities may be identifiable at the MAC layer, it may be beneficial to enable identification of priority at the physical layer. For example, physical transmission may have already begun but must be preempted at the physical layer. Methods are described herein that identify the priority at the physical layer.

For example, in the event of intra-UE PDSCH collisions, a UE may flush out both eMBB and URLLC traffic on receiving the preemption indication. This must be avoided in order to preserve the reliability and latency of the URLLC service. Methods are described herein that define UE behavior when intra-UE collision occurs on the PDSCH.

HARQ ACK transmission may be used for multiple priorities. In conventional systems, the UE does not have a defined mechanism to transmit the ACK/NACK for both the colliding PDSCH grants. The HARQ codebook may be extended to support UCI for transmissions with different reliability and latency requirements. When UCI is piggybacked on PUSCH, the priority levels of the UCI and PUSCH may be considered.

Procedures to handle intra-UE prioritization of PUSCH grants are described herein. For example, if there is a UL intra-UE collision between dynamic grants or high priority configured grants and a dynamic grant occurs, the UE procedures described herein handle the collision. MAC Layer procedures for intra-UE prioritization are describe herein to enable the UE to resolve prioritization at the MAC layer.

In accordance with one embodiment, a gNB may indicate the priority of a grant through DCI using one of: RNTI, DCI length, field in DCI, PDCCH resource, duration of the grant. A UE may indicate the priority in an UL transmission through the RNTI used in the PUSCH data or PUCCH. In case of intra-UE preemption, if a preemption indicator is not received, the UE may flush its low priority buffer's resources that were preempted by its high priority PDSCH. In case of intra-UE preemption, if a preemption indicator is received, the UE may use the RNTI of the preemption indicator to determine the priority of the buffers to be flushed. Multiple HARQ ACK codebooks may be supported for multiple priorities. RRC signaling may configure the UE with the codebook to be used for each priority. Multiple HARQ ACK codebooks may be transmitted in a slot. Each codebook may be transmitted in a sub-slot of the slot. The sub-slot may be indicated by the K1 parameter at a finer granularity or an additional field K1a may be introduced in the DCI to indicate the sub-slot offset within a slot. If multiple dynamic codebooks are configured, the UE may use the cDAI, tDAI and the priority indication for the PDSCH grant to determine to which codebook the ACK/NACK belongs. For multi-TRP transmission, the UE may transmit the HARQ ACK feedback in different codebooks to each TRP. The CORESET DMRS or another configured RS may indicate the spatial direction for the PUCCH transmission. The UE may override the spatial direction configured through MAC CE and may use the spatial direction indicated by the CORESET or the configured RS to transmit PUCCH. Multiple HARQ ACK codebooks may be piggybacked on a PUSCH transmission. Each codebook may be mapped to one sub-slot of the PUSCH. Different codebooks carrying different UCI of priorities may be mapped to different hops of the PUSCH transmission. Beta-offset value of 0 may be supported to eliminate piggybacked UCI resources on a PUSCH. A HARQ ACK codebook may be mapped to multiple repetitions of a PUSCH transmission. When HARQ process ID of a CG grant of higher priority collides with that of a lower priority dynamic grant, the UE may ignore the low priority grant. When multiple CG grants collide in a UE, the UE may retransmit the preempted CG grant on a CG resource. A UE's PUSCH repetition may be subject to early termination on being acknowledged at one TRP or timer based termination or selective termination depending on which TRP has Acknowledged the transmission.

Some of the examples described herein may be for unpaired spectrum, and some figures do not include the "Frequency" label explicitly in the y-axis. This is because mainly the time domain (x-axis) is relevant in these figures. However, the principles/examples described herein may also be applied to paired spectrum.

PHY layer identification of the priority of a grant is described herein. A UE may be scheduled or configured for receiving a PDSCH or for transmitting a PUSCH or PUCCH. However, the gNB may override that transmission with a higher priority transmission. For example, an eMBB PDSCH may be preempted by a URLLC PDSCH for that UE. In another example, an eMBB PUSCH may be preempted by a URLLC PUSCH. An URLLC PUCCH may collide with an eMBB PUCCH. The UE's MAC layer may prioritize the higher priority transmission if there is sufficient time to react to the grants; the MAC may deliver the prioritized transmission to the UE and cancel the lower priority transmission. On the UL, if the UE has already begun transmission at the PHY layer, it may identify that another transmission may be more important and stop the lower priority transmission and transmit the higher priority transmission. For this purpose, it may be desirable to have knowledge of the priority of a transmission at the PHY layer. For example, if a DL PDSCH grant's priority is known at the PHY, the UE may prioritize its HARQ-ACK UCI transmission accordingly over other low priority UL transmissions. It may be beneficial to indicate the priority to the UE through one of the following ways.

The RNTI may be used for scrambling the DCI of the grant to indicate the priority to the UE. If the eMBB and URLLC are the only two priority levels, the RNTI indicating the MCS (MCS-C-RNTI) for higher reliability may be interpreted to indicate URLLC. However, if multiple priorities are supported, such as priorities within URLLC itself, multiple RNTIs may be used to indicate the priorities. The gNB may configure the UE with the different RNTIs and indicate their relative priority levels as illustrated in the example in Table 1 below. Priority level '0' may correspond to the lowest priority and the priority increases with ascending order of priority-level.

TABLE 1

Different RNTIs configured to a
UE for transmissions of different priority levels

| Priority level (2 bits) | RNTI mask for scheduling PDSCH/PUSCH |
|---|---|
| 00 (lowest) | $RNTI_1$ |
| 01 | $RNTI_2$ |
| 10 | $RNTI_3$ |
| 11 (highest) | $RNTI_4$ |

The example RNTIs shown in Table 1 may be used to mask the C-RNTI of the UE. When receiving a grant, the UE may check the CRC of the DCI for all the possible masking RNTIs and may select the one for which the CRC passes.

For dynamic grants, the RNTI may be detected by the UE by blindly decoding the DCI and may be given by C-RNTI⊕RNTIp where RNTIp may be the masking RNTI from Table 1 with priorityLevel p. In these examples, the RNTI masks may be configured to multiple UEs commonly. This configuration may occur through SI or in a UE-specific manner, wherein multiple UEs may be configured with the same RNTIp values for different priorities.

In an example, instead of a mask, the gNB may provide multiple C-RNTIs (C-RNTI1, C-RNTI2, etc.) to a UE for multiple priority levels. The configuration may be performed in a UE-specific manner.

Alternatively or additionally, the RNTIs may be provided through a group common PDCCH to multiple UEs.

For a Type-1 UL configured grant, the priority level for a grant may be configured through RRC. For example, if the configured grant is given an ID 'configuredGrantID' to distinguish different configured grants, the ID may be equal to the priority level. For certain applications, it may be useful to provide multiple configured grants with the same priority. For example, in NR-U applications, traffic with certain priority may be given multiple configured grants and the UE selects a grant based on channel availability. In this case, a field 'priorityLevel' may be configured in addition to the configured grant ID.

For Type-2 configured grants, the activation DCI may use the CS-RNTI masked with the RNTI of target priority level in Table 1. The activation DCI may be scrambled using CS-RNTI⊕RNTIp. The deactivation DCI may also use CS-RNTI masked with RNTIp. This may be suitable especially if the priorityLevel and configuredGrantID may be the same for the grant. Alternatively or additionally, the deactivation DCI may use only the CS-RNTI to deactivate a grant to the UE, which makes the procedure simple and improves the robustness of the deactivation DCI. The UE uses the configuredGrantID to determine the Type-2 grant to deactivate.

FIG. 1 is a diagram showing a configured grant's priority may be changed by another activation DCI 50. FIG. 1 shows the PDCCHs 51, other signals 52, and gaps 55. FIG. 1 also shows activation DCI 56 scrambled using CS-RNTI⊕RNTI2 for priority level 2 and activation DCI 57 scrambled using CS-RNTI⊕$RNTI_4$ for priority level 4. PUSCH 53 comprises a configured grant with priority level 2 and PUSCH 54 comprises a configured grant with priority level 4. Alternatively or additionally, a MAC CE from the gNB may be used to set the priorityLevel to the UE.

An explicit field 'priorityLevel' in the DCI may indicate the priority of the grant.

The DCI length for the grant may indicate the priority of the grant. A compact DCI may be used for URLLC, but with this method, more DCI lengths need to be defined to support multiple levels of priority.

One or more characteristics of the PDCCH such as the starting PRB of the DCI's CCE may indicate the priority level. For example, the (startingPRB mod priorityLevelmax) may set the priority level for the grant. The starting symbol of the PDCCH may indicate the priority. The aggregation level (AL) of the PDCCH may indicate the priority; as URLLC DCI may require a higher priority, a higher AL may be used compared to eMBB DCI. A set of reference ALs denoted as '$AL_{ref,p}$' may be configured to the UE for each priority. If a received AL is within that set, the UE may identify the PDCCH to belong to priorityLevel p.

HARQ processes may be configured to for certain priorityLevels. For UEs with high processing capabilities, this may work well as the typical latencies for HARQ-ACK may be small. Accordingly, few HARQ processes may be required to support URLLC cases.

The number of resources in the grant may indicate the priority level. For example, PUSCH transmissions in a mini-slot of length between 2OS and 4OS may have the highest priority while PUSCH transmissions in a mini-slot of length between 10OS and 14OS may indicate the lowest priority. A table of time resource range and corresponding priority may be indicated through RRC signaling to the UE. On receiving the grant, the UE may identify the priority from the amount of time resources available to it. The MCS of the grant may indicate the priority level; high priority transmissions requiring higher reliability may have MCS values with lower spectral efficiency.

The gNB may configure multiple DMRS sequences to the UE corresponding to different priority levels. When the UE receives the PDSCH grant, it may detect the DMRS sequence of the PDSCH and may recognize the priority level. For example, the RNTI masks may be used to generate the DMRS sequences for different priority levels.

The time of arrival of the DCI may determine the priorityLevel. The most recent DCI may denote a higher priority DCI. However, this may not apply to all scenarios. For example, in some scenarios, a UE may receive DL signals/channels in a cell from multiple TRPs and/or transmit UL signals/channels in a cell to multiple TRPs. In this multi-TRP case, one TRP may provide an eMBB grant. A second TRP may provide a URLLC grant. The eMBB grant may arrive after the URLLC grant, but the PDSCH resources may collide, causing intra-UE collision. In this case, the most recent DCI may not be a good indicator of the priority.

The priority of the UCI may be associated with that of the grant. For example, if the PDSCH has priorityLevel p, its HARQ ACK feedback has priority p. Periodic CSI reports may be transmitted with lower priorityLevel plow configured by the gNB to the UE, even if the report corresponds to a BLER target for a certain priority p>plow; this may be because generally periodic CSI reports have lower priority than most transmissions. All periodic CSI reports (for eMBB and URLLC) may be transmitted with the same periodicity. However, if there is a collision between periodic CSI reports of two priorities, the report for the higher priority BLER may be prioritized and the report for lower priority BLER may be dropped. On the other hand, A-CSI reports may be transmitted with the priorityLevel of the corresponding traffic and may use the priorityLevel indicated by the DCI scheduling it.

It may be useful to indicate the priority of the UL transmission such as PUSCH or PUCCH in the transmission. For example, a UE may provide ACK/NACK to URLLC and eMBB PDSCH in separate codebooks so that the latency and reliability for each priority may be achieved through appropriate scheduling of the PUCCH and the coding rate respectively. A PUCCH HARQ-ACK resource may be used by both URLLC and eMBB.

Figure 2:
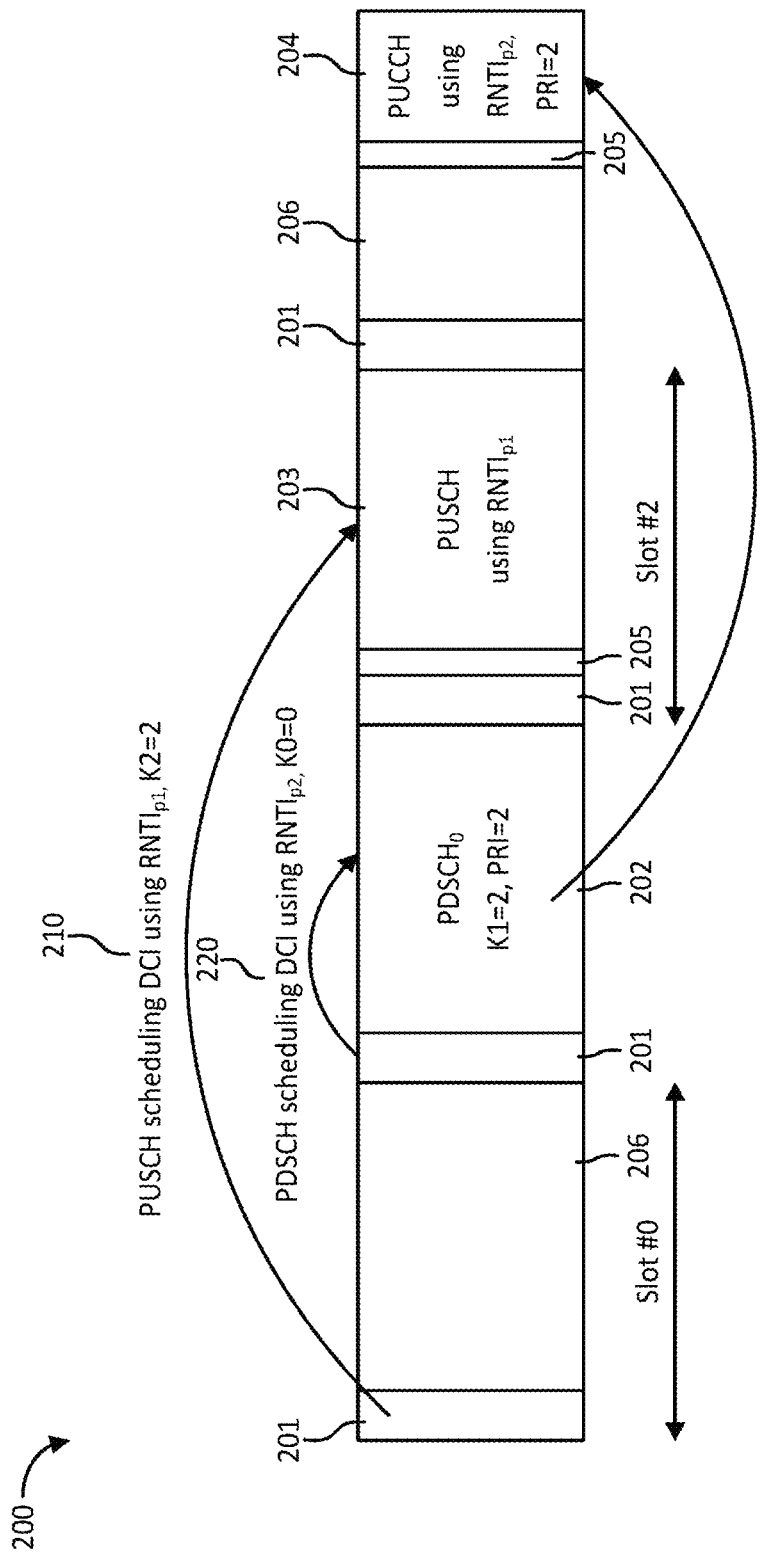
FIG. 2 is a diagram of PUSCH and Physical Uplink Control Channel (PUCCH) with C-RNTI masked with the priorityLevel RNTI.

FIG. 2 shows an example of the PUSCH and PUCCH with the C-RNTI masked with the priorityLevel RNTI 200. A UE indicating priority through the RNTI (=C-RNTI⊕RNTIp) used to scramble the UL UCI. The gNB may identify the RNTI to recognize the priority level for which PUCCH HARQ-ACK was received. FIG. 2 shows the PDCCHs 201, other signals 206, and gaps 205. FIG. 2 also shows a DCI in slot #0 scrambled with mask RNTIp1 210 schedules PUSCH0 in slot #2 203. The PUSCH may also be transmitted with priorityLevel mask RNTIp1 203. A DCI scrambled with a mask RNTIp1 may schedule PDSCH0 in slot #1 220. The corresponding PUCCH may be transmitted on slot #3 where the UCI may be scrambled with mask of RNTIp2 204.

A preemption indication for a given priority is described herein in accordance with another embodiment. When intra-UE DL preemption occurs, a grant of a low priority PDSCH to UE1 may be preempted by a grant of higher priority to UE1.

Figure 3A:
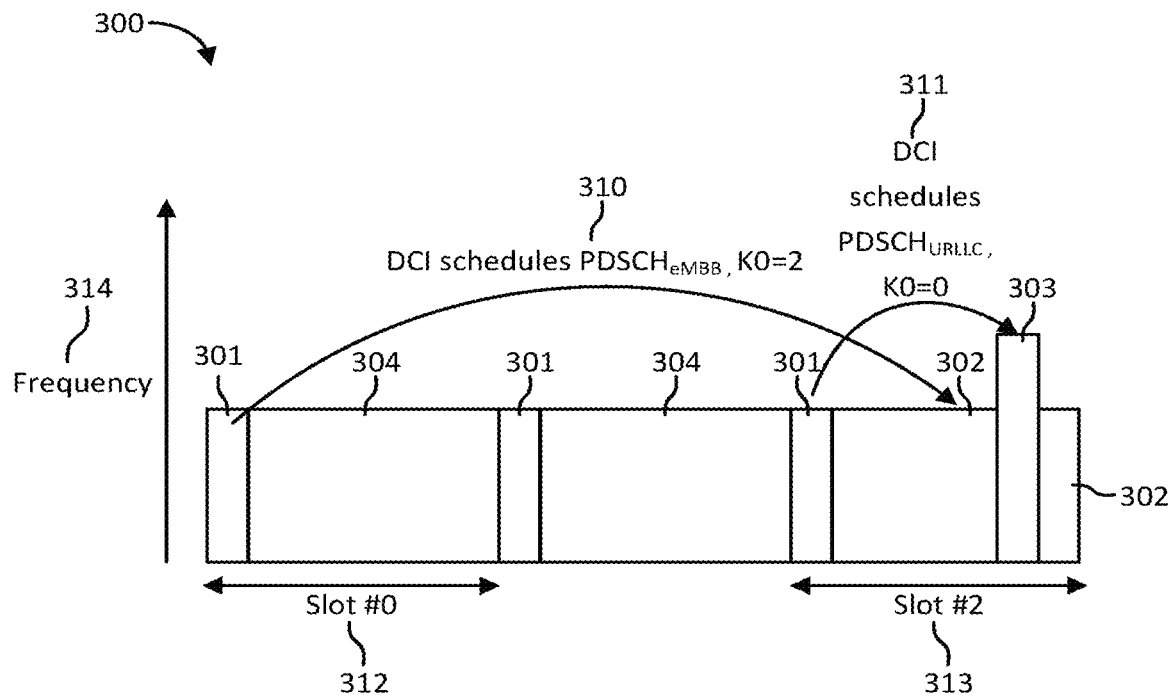
FIG. 3A is a diagram of Intra-UE Preemption of low priority PDSCH by high priority PDSCH RE collision between the PDSCHs.

FIG. 3A shows an example of intra-UE preemption of a low priority PDSCH by a high priority PDSCH with a resource element (RE) collision between PDSCHs 300. FIG. 3A shows the PDCCHs 301, the $PDSCH_{eMBB}$ 302, the $PDSCH_{URLLC}$ 303, and other signals 304 for slots #0 312 to slot #2 313 with respect to frequency 314. In the example of FIG. 3A, a low priority $PDSCH_{eMBB}$ may be scheduled for slot #2 by DCI in slot #0 310. Subsequently, a DCI in slot #2 schedules a high priority URLLC $PDSCH_{URLLC}$ in slot #2 311. As a result, the resources collide for the PDSCHs.

Figure 3B:
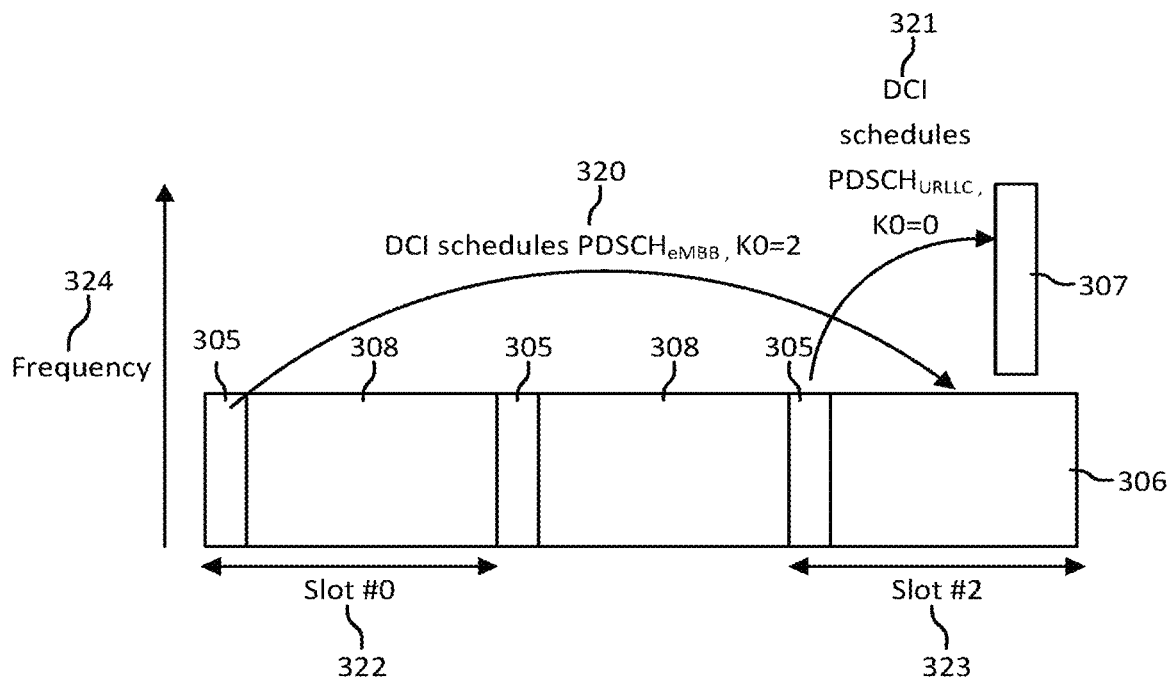
FIG. 3B is a diagram of Intra-UE Preemption of low priority PDSCH by high priority PDSCH No RE collision between the PDSCHs.

FIG. 3B shows an example of intra-UE preemption of a low priority PDSCH by a high priority PDSCH when the $PDSCH_{eMBB}$ and $PDSCH_{URLLC}$ do not collide in frequency but overlap in time. FIG. 3B shows the PDCCHs 305, the $PDSCH_{eMBB}$ 306, the $PDSCH_{URLLC}$ 307, and other signals 308 for slots #0 322 to slot #2 323 with respect to frequency 324. In the example of FIG. 3B, a low priority $PDSCH_{eMBB}$ may be scheduled for slot #2 by DCI in slot #0 320. Subsequently, a DCI in slot #2 schedules a high priority URLLC $PDSCH_{URLLC}$ in slot #2 321. If the UE has the capability to process both the PDSCHs, it may do so. Otherwise, the UE may assume that its $PDSCH_{eMBB}$ has been preempted by its own $PDSCH_{URLLC}$.

Figure 4A:
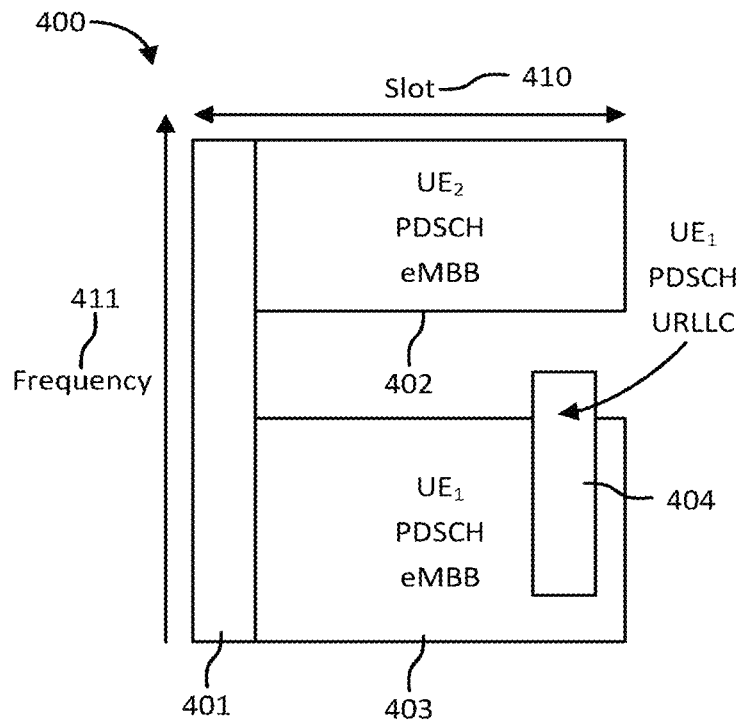
FIG. 4A is a diagram of Preemption by $PDSCH_{URLLC}$ Intra-UE preemption only; gNB may not send preemption indication.

FIG. 4A shows an example of preemption by the $PDSCH_{URLLC}$ 400. FIG. 4A shows the PDCCH 401, the $PDSCH_{eMBB}$ 402 and 403, and $UE_1$ $PDSCH_{URLLC}$ 404 for a slot 410 with respect to frequency 411. If the preemption is entirely intra-UE preemption, i.e., other UEs may not be impacted, then the gNB does not need to send the preemption indication through a group common DCI with format 2_1 using INT-RNTI for scrambling. In this case, $UE_1$ may identify the DL preemption on recognizing the colliding resources for the low priority and high priority grants. $UE_1$ automatically flushes soft bits corresponding to the impacted REs in its respective buffer for the low priority PDSCH.

Figure 4B:
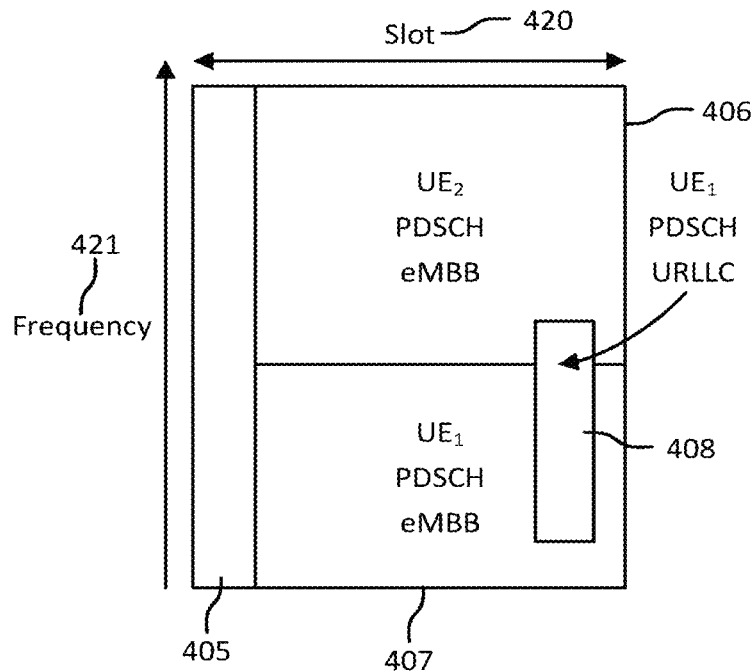
FIG. 4B is a diagram of Preemption by $PDSCH_{URLLC}$ Inter-UE and intra-UE preemption; gNB sends preemption indication.

FIG. 4B shows another example of preemption by the $PDSCH_{URLLC}$. FIG. 4B shows the PDCCH 405, the $PDSCH_{eMBB}$ 406 and 407, and $UE_1$ $PDSCH_{URLLC}$ 408 for a slot 420 with respect to frequency 421. In this example, the preempted resources may include resources from other UEs where $UE_2$'s eMBB PDSCH 406 may be preempted. In this case the gNB may send an indication of preemption to the UEs. For example, the indication may be sent via the group common DCI with format 2_1 using INT-RNTI for scrambling. If $UE_1$ receives the preemption indication, it may flush its buffers for both the low and high priority PDSCHs. But it should not flush the high priority buffer in this case. Instead the $UE_1$ may use one of the following information to flush only the low priority buffer:
  (1) $UE_1$ may flush its buffer corresponding to the transmission that was received earlier in time (PDSCH0) as the more recent transmission (PDSCH1) may be assumed to be of higher priority.

$UE_1$ may use the priorityLevel information in the grants to determine the higher priority HARQ process and flushes the buffer with lower priority.

Figure 5:
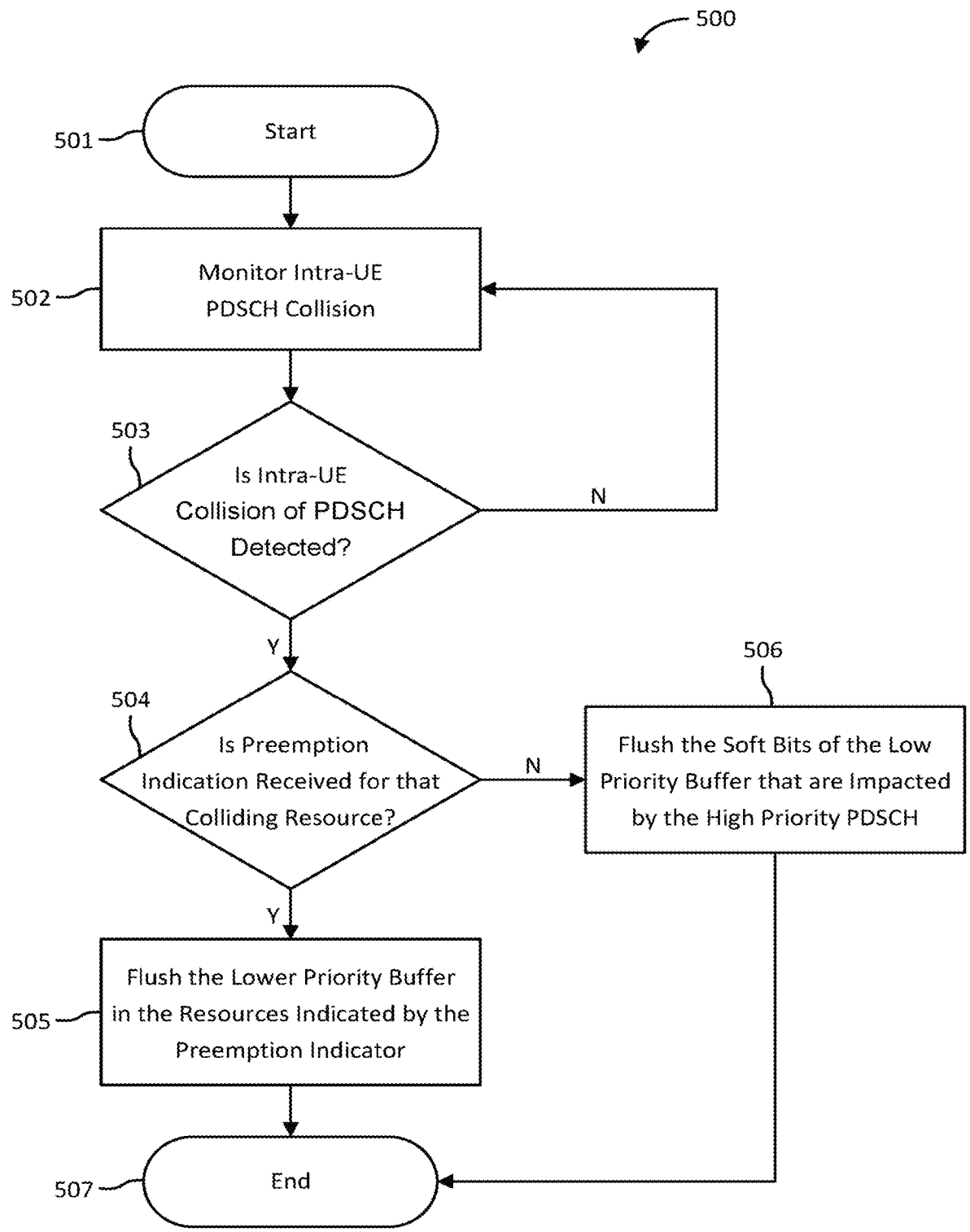
FIG. 5 is a diagram of UE procedure to flush the soft buffer of a low priority HARQ process in the event of preemption.

FIG. 5 shows an example procedure for flushing the low priority HARQ buffer 500 for a UE that has an intra-UE collision of a low priority PDSCH and high priority PDSCH. When the procedure starts (step 501), the UE may monitor for intra-UE PDSCH collisions (step 502). The UE may determine whether an intra-UE collision of the PDSCH (step 503). If no intra-UE collision of the PDSCH is detected, the UE may return to step 502. If an intra-UE collision of the PDSCH is detected, the UE may determine whether a preemption indication was received for the colliding resource (step 504). For intra-UE preemption, a UE-specific preemption indication may be sent by the gNB to the UE indicating which grant has higher priority and which resources are to be flushed for the lower priority buffer. The preemption indication DCI may carry the set of priorities in its payload for which a UE may flush its buffer if its resources experience preemption. If a preemption indication was received for the colliding resource, the UE may flush the lower priority buffer in the resources indicated by the preemption indicator (step 505). If a preemption indication was not received for the colliding resource, the UE may flush the soft bits in the lower priority buffer that are impacted by the high priority PDSCH (step 506). The procedure then ends (step 507). In an alternative procedure, if a UE detects both intra-UE preemption (due to arrival of colliding grants) and a preemption indicator, the UE may ignore the preemption indicator. It may flush only the bits of its lower priority PDSCH in the REs that were preempted by its higher priority PDSCH.

Figure 6:
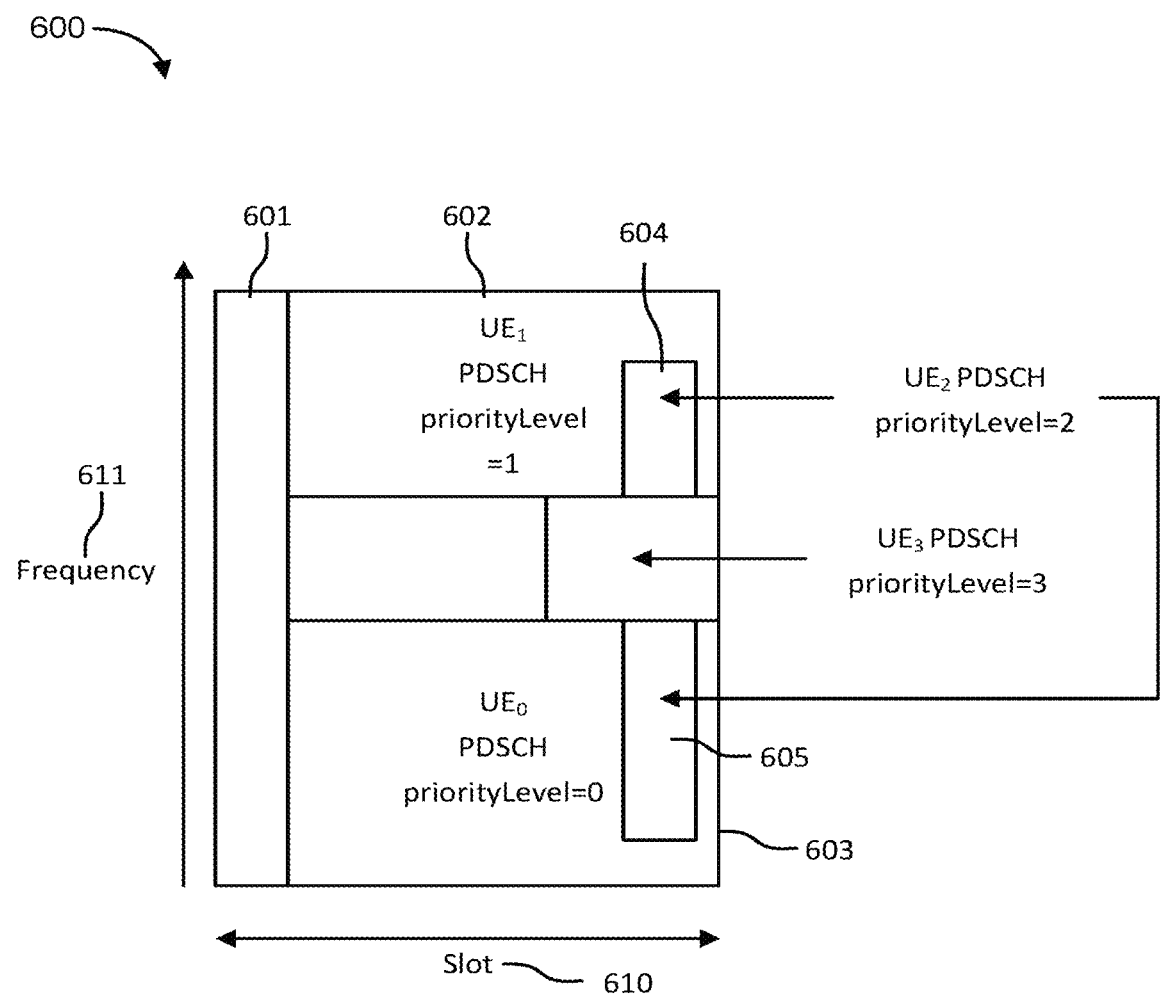
FIG. 6 is a diagram of $UE_2$ preempts PDSCH of $UE_0$ and $UE_1$ with lower priorities but does not preempt $UE_3$'s PDSCH of higher priority.

FIG. 6 shows an example in which a UE preempts the PDSCH of other UEs 600. FIG. 6 shows the PDCCH 601, $UE_1$ PDSCH priorityLevel 1 602, $UE_0$ PDSCH priorityLevel 0 603, $UE_2$ PDSCH priorityLevel 2 605, and $UE_3$ PDSCH priorityLevel 3 604 for a slot 610 with respect to frequency 611. When multiple priority levels may be supported by a UE, it may be necessary to indicate the priority levels that must be flushed. For example, consider that $UE_2$ has PDSCH transmission with priorityLevel=2 605. It preempts certain resources of priorityLevel=1 of $UE_1$ 602 and priorityLevel=0 of $UE_0$ 603. However, it does not preempt resource of priorityLevel=3 of $UE_3$ 604 (as $UE_3$'s priority may be higher than that of $UE_2$).

The format 2_1 DCI may indicate at a coarse level the impacted REs in time and frequency. But the indication does not have the granularity to indicate that $UE_3$'s resources may not be preempted. So, according to Rel 15 procedures, $UE_0$, $UE_1$ and $UE_3$ may all flush their buffers. But the intention is to enable only $UE_0$ and $UE_1$ to flush their buffers without impacting that of $UE_3$. So in the embodiments described herein, the INT-RNTI may be masked with the priorityLevel mask. The UE that receives the preemption indicator DCI, may detect the mask and may determine the priority levels to flush. In the current example, the gNB sends the DCI with mask of RNTI1. So UEs may know that they must flush their buffers if they have priorityLevel≤1. Accordingly, only $UE_0$ and UE flush their buffers and $UE_3$ does not.

Figure 7:
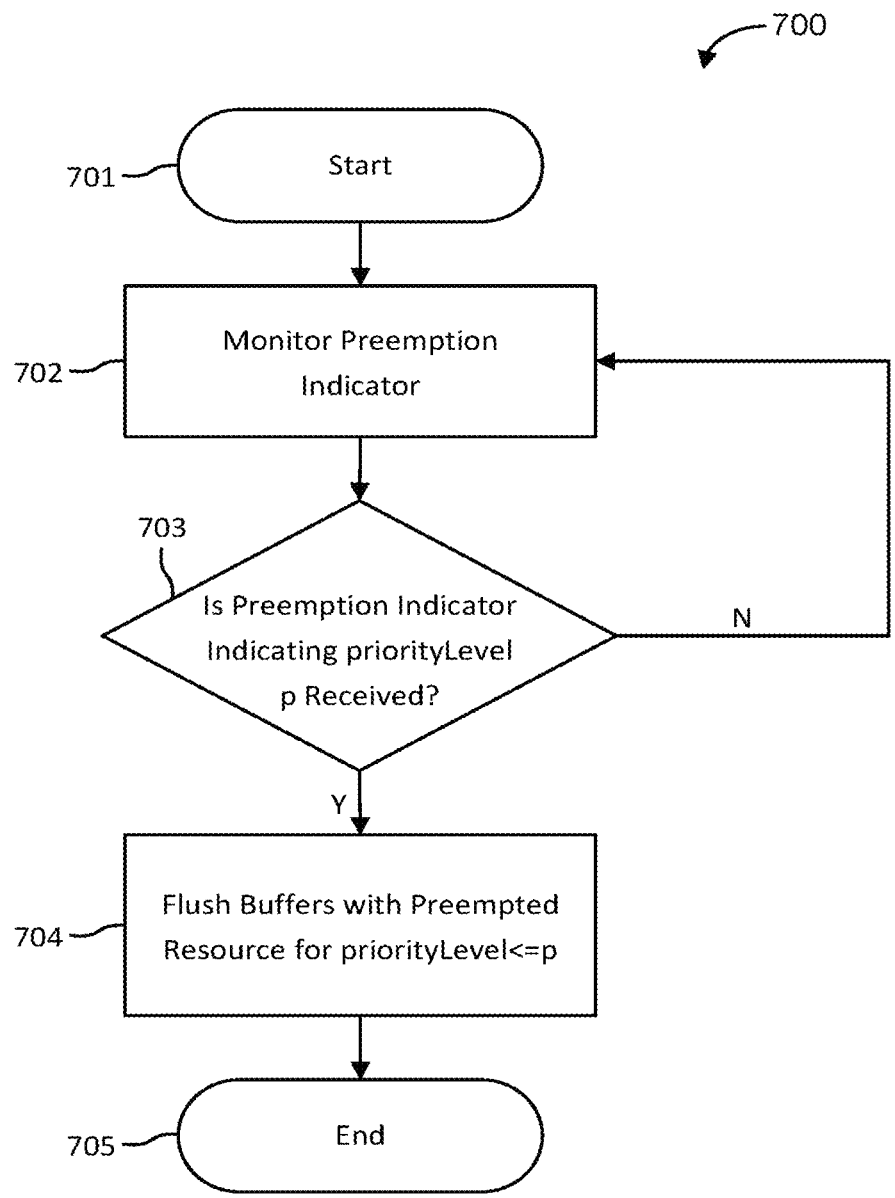
FIG. 7 is a diagram of UE procedure to flush the soft buffers of priorities indicated through the $RNTI_p$ mask.

FIG. 7 shows an example procedure for use in a UE for flushing the soft buffers of priorities indicated through the $RNTI_p$ mask 700. In the example of FIG. 7, the UE flushes impacted buffers with priorityLevel<=received priorityLevel indication through the preemption indicator. When the procedure starts (step 701), the UE may monitor for a preemption indicator (step 702). The UE may determine whether a preemption indication indicating priorityLevel p was received (step 703). If a preemption indication indicating priorityLevel p was received, the UE may flush buffers with the preempted resource for priorityLevel<=p (step 704). If a preemption indication indicating priorityLevel p was not received, the UE may return to step 702. The procedure then ends (step 705).

Alternatively or additionally, the UE may indicate the priority level of the transmission that is preempting other UEs through the preemption indicator. UEs having preempted resource with priority lower than that indicated by the preemption indicator will flush their buffer.

Procedures for high and low priority control signaling are described herein. In general, a high priority transmission may take precedence over a low priority transmission. The UE may cancel or puncture the low priority transmission to support the high priority transmission. Scenarios including but not limited to the following may be supported:
  (1) UE drops low priority PUCCH in favor of high priority PUSCH;
  (2) UE drops low priority PUSCH in favor of high priority PUCCH;
  (3) UE drops low priority UCI in favor of high priority UCI;
  (4) UE drops low priority PUCCH in favor of high priority PUCCH; and
  (5) UE drops low priority PUSCH in favor of high priority PUSCH.

Other ways to accommodate transmissions with different priorities may also be supported as described below.

Multiple PUCCH transmission opportunities in a slot are described herein. A UCI may be transmitted once per slot. It may be desirable to provide M UCI feedback opportunities per slot for low latency and high priority PDSCH, with M>1. Greater the value of M, greater the number of feedback opportunities within the slot. The time resources of each opportunity for UCI transmission within the slot may be referred to as a sub-slot. So M sub-slots may be supported for UCI transmission in a slot.

Figure 8A:
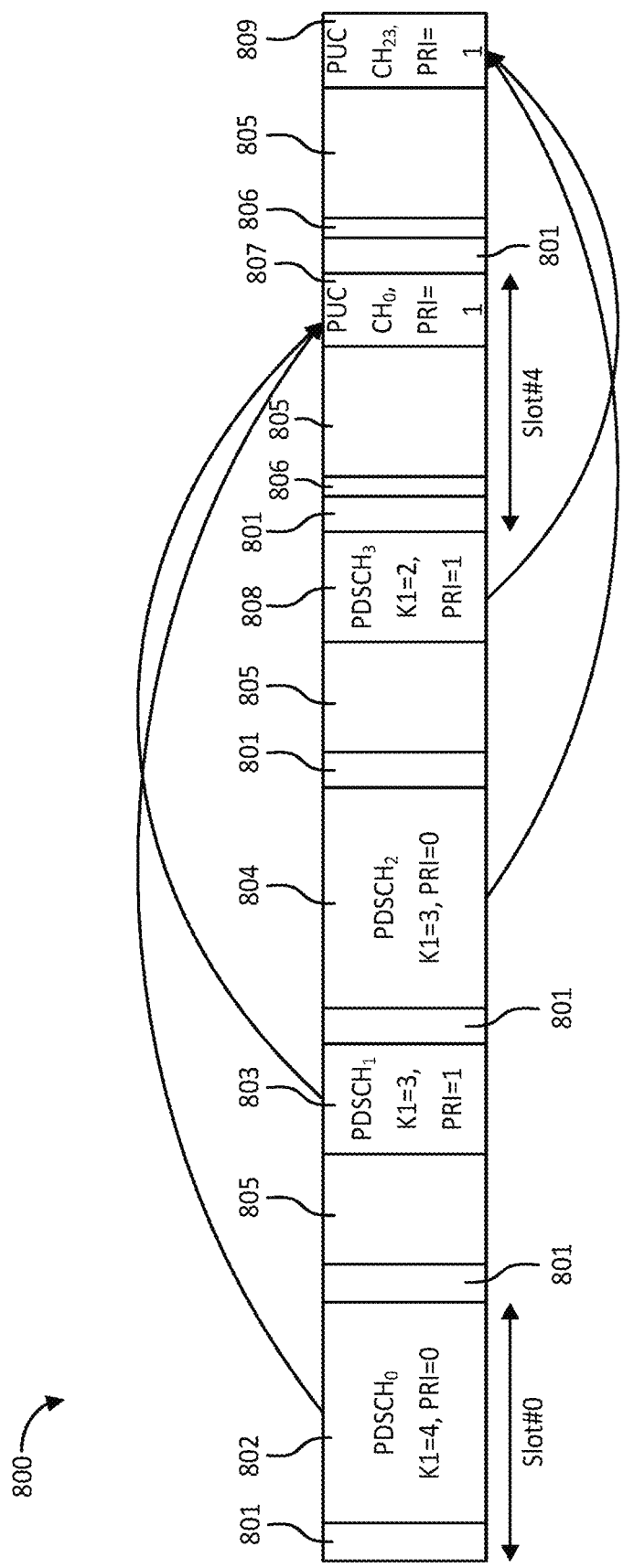
FIG. 8A is a diagram of HARQ-ACK UCI transmission on PUCCH M=1, single UCI feedback opportunity in a slot.

FIG. 8A shows an example of HARQ-ACK UCI transmission on the PUCCH with single UCI feedback 800. FIG. 8A shows the PDCCH 801, $PDSCH_0$ K1=4 and PRI=0 802, $PDSCH_1$ K1=3 and PRI=1 803, $PDSCH_2$ K1=4 and PRI=0 804, $PDSCH_3$ K1=2 and PRI<1 808, $PUCCH_{01}$ PRI=1 807, $PUCCH_{23}$ PRI=1 809, other DL signals 810, other UL signals 805, and gaps 806 for a plurality of slots. As shown in FIG. 8A, HARQ-ACK for multiple PDSCHs can be jointly transmitted in a HARQ codebook only once in a slot. Here, the ACK/NACK for $PDSCH_0$ 802 and $PDSCH_1$ 803 may be transmitted on $PUCCH_{01}$ 807 as the corresponding K1 values denote slot #4 for UCI feedback and PRI=1 may be used as the PRI is from the most recent scheduling DCI. Similarly, ACK/NACK for $PDSCH_2$ 804 and $PDSCH_3$ 808 may be transmitted on $PUCCH_{23}$ 809 as the corresponding K1 values denote slot #5 for UCI feedback.

Figure 8B:
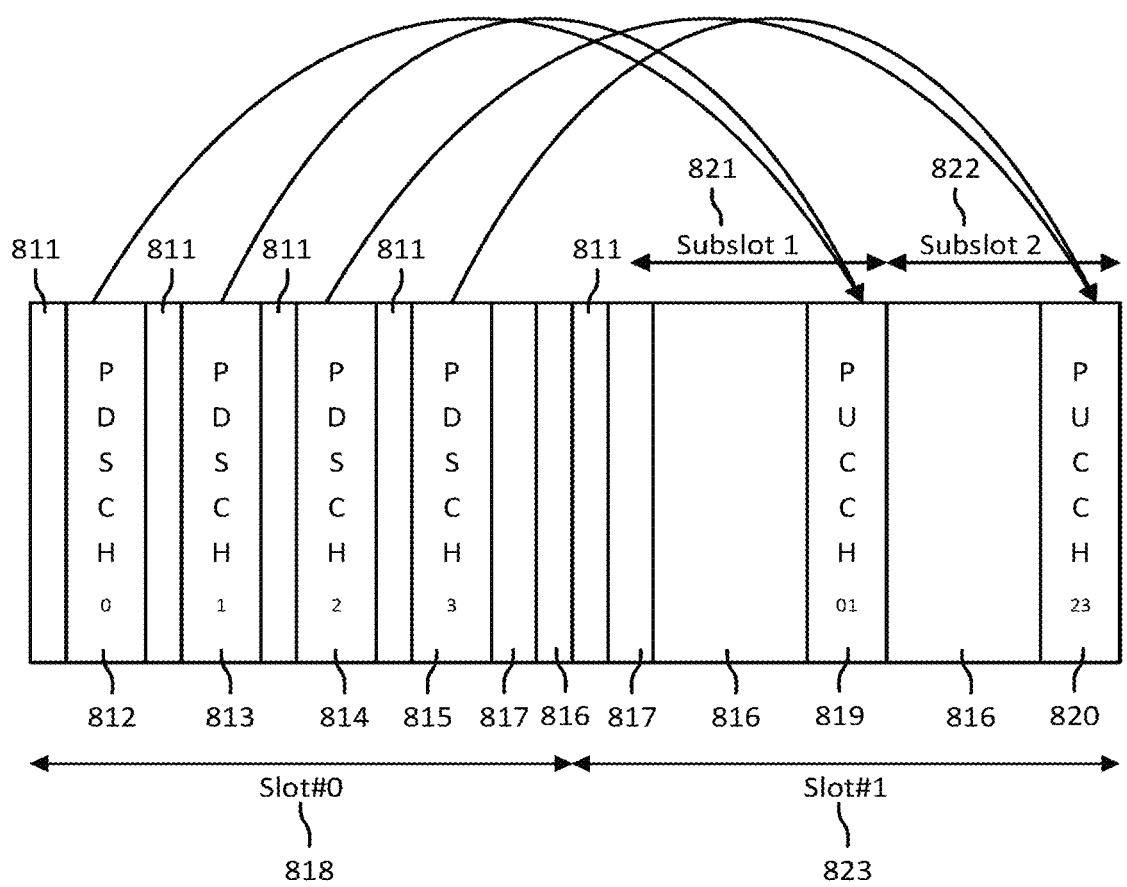
FIG. 8B is a diagram of HARQ-ACK UCI transmission on PUCCH M=2, multiple UCI feedback opportunities in a slot.

FIG. 8B shows an example of HARQ-ACK UCI transmission on the PUCCH with multiple UCI feedback opportunities in a slot. FIG. 8B shows the PDCCH 811, $PDSCH_0$ 812, $PDSCH_1$ 813, $PDSCH_2$ 814, $PDSCH_3$ 815, $PUCCH_{01}$ 819, $PUCCH_{23}$ 820, other UL signals 816, and gaps 817 for a plurality of subslots (e.g., subslots 821 and 822). As shown in FIG. 8B, multiple opportunities may be provided for UCI feedback in a slot. Here, 2 PUCCH transmissions may be supported in a slot (M=2). The PDSCH may be received in 2 OS mini-slots in slot #0 813. The ACK/NACK for PDSCH$_0$ and PDSCH may be transmitted in sub-slot #1 as PUCCH$_{01}$ 819 which spans OS #6, 7 in slot #1 while the ACK/NACK for PDSCH$_2$ and PDSCH$_3$ may be transmitted in sub-slot #2 as PUCCH$_{23}$ 820 which spans OS #12, 13 in slot #1 823.

The number of sub-slots may be configured by the gNB to the UE through RRC signaling. Furthermore, the sub-slots may be of different lengths to support different types of traffic, their priorities and latencies. The gNB may configure sub-slots in a non-overlapping manner to the UE so that there may be no collisions between transmissions on the sub-slots. Alternatively, the gNB may configure sub-slots to the UE with overlapping resources. If UE identifies that it may be scheduled to transmit on 2 overlapping sub-slots, it may drop one of the transmissions. The lower priority transmission may be dropped or the latter sub-slot may be dropped or the earlier sub0 slot may be dropped.

The following methods may be used to indicate the sub-slot to be used for PUCCH transmission when M>1:

If M sub-slots may be allowed for PUCCH transmission, K1 may be indicated in terms of sub-slots. The number of sub-slots per slot may be configured for each priorityLevel. K1 may be interpreted accordingly for each priorityLevel; so, each priorityLevel interprets K1 as per the number of sub-slots configured to it per slot. This configuration may be provided through RRC signaling to the UE. Table 2 below gives an example of how K1 may be configured for different number of sub-slots per slot.

Figure 9A:
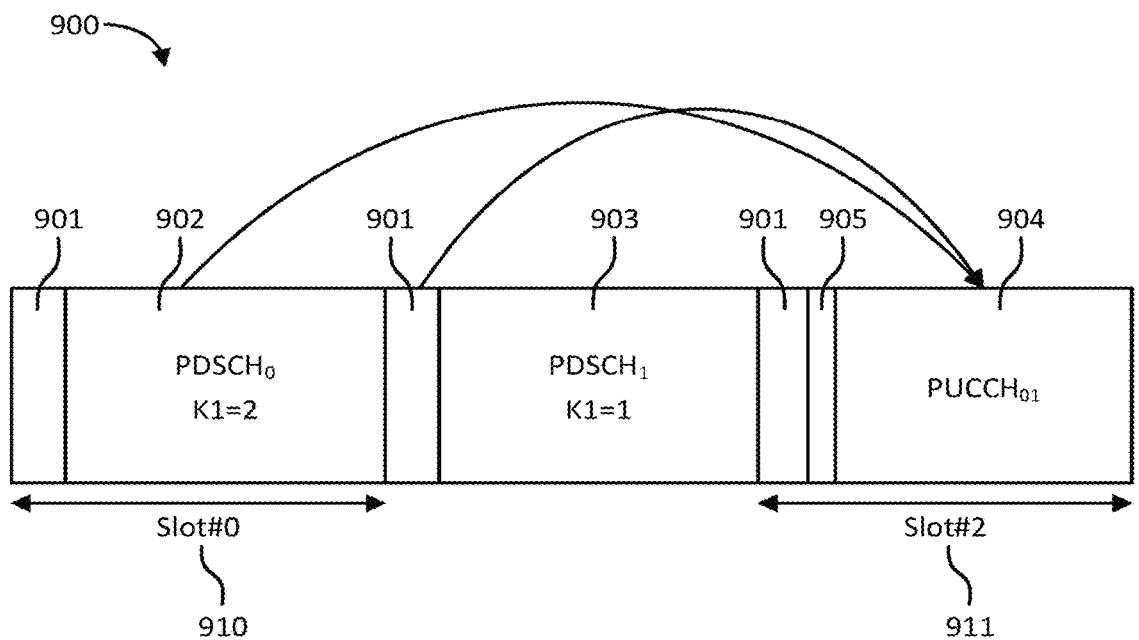
FIG. 9A is a diagram of Sub-slot configuration M=1, 1 sub-slot/slot.

FIG. 9A shows an example sub-slot configuration 900 with the eMBB PDSCH configured for one sub-slot per slot and K1 incremented in units of slot. FIG. 9A shows a plurality of slots (e.g., slot #0 910 and slot #2 911) comprising PDCCH 901, gaps 905, PDSCH$_0$ with K1=2 902, PDSCH$_1$ with K1=1 903, and PUCCH$_{01}$ 904. PDSCH$_0$ with K1=2 902 and PDSCH$_1$ with K1=1 903 may be acknowledged jointly in slot #2 911.

Figure 9B:
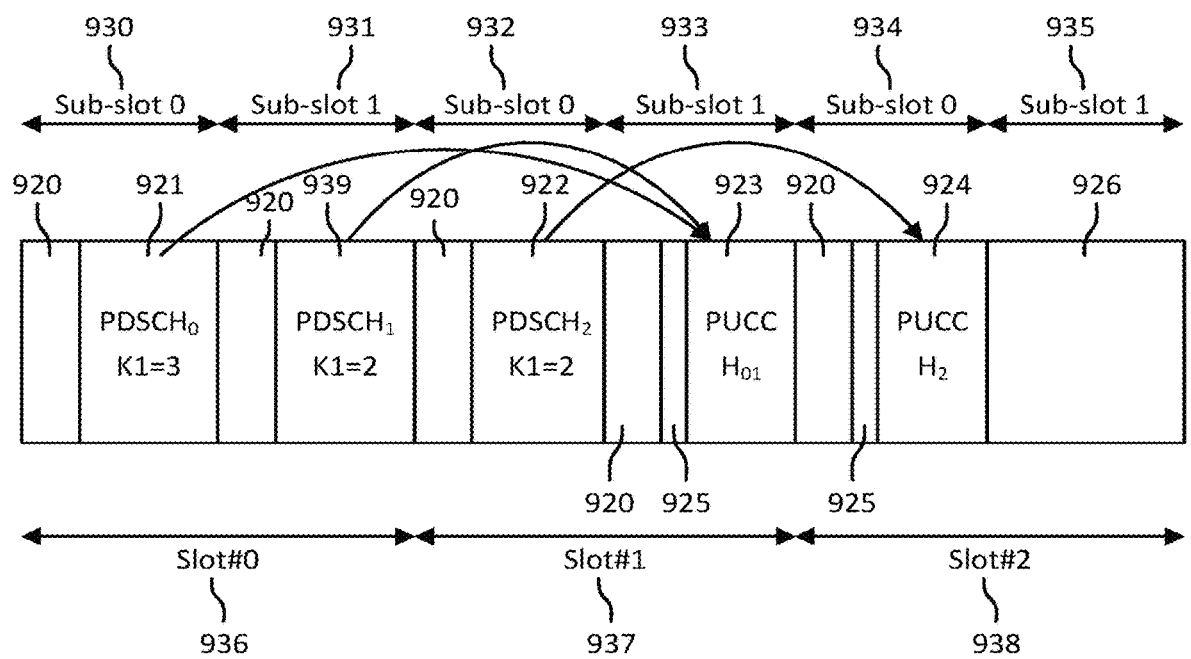
FIG. 9B is a diagram of Sub-slot configuration M=2, 2 sub-slots/slot.

FIG. 9B shows another example sub-slot configuration with URLLC PDSCH configured for two sub-slots per slot and K1 incremented in units of half a slot. FIG. 9B shows a plurality of slots: slot #0 936 comprising sub-slot 0 930 and sub-slot 1 931, slot #1 937 comprising sub-slot 0 932 and sub-slot 1 933, and slot #2 938 comprising sub-slot 0 934 and sub-slot 1 935. FIG. 9B also shows PDCCH 920, gaps 925, other signals 926, PDSCH$_0$ with K1=3 921, PDSCH$_1$ with K1=2 939, PDSCH$_2$ with K1=2 922, PUCCH$_{01}$ 923, and PUCCH$_2$ 924. In the example of FIG. 9B, DSCH0 with K1=3 and PDSCH1 with K1=2 may be acknowledged jointly in sub-slot #1 of slot #1. And PDSCH$_2$ in sub-slot #0 of slot #1 with K1=2 may be acknowledged in sub-slot #0 of slot #2.

Figure 10:
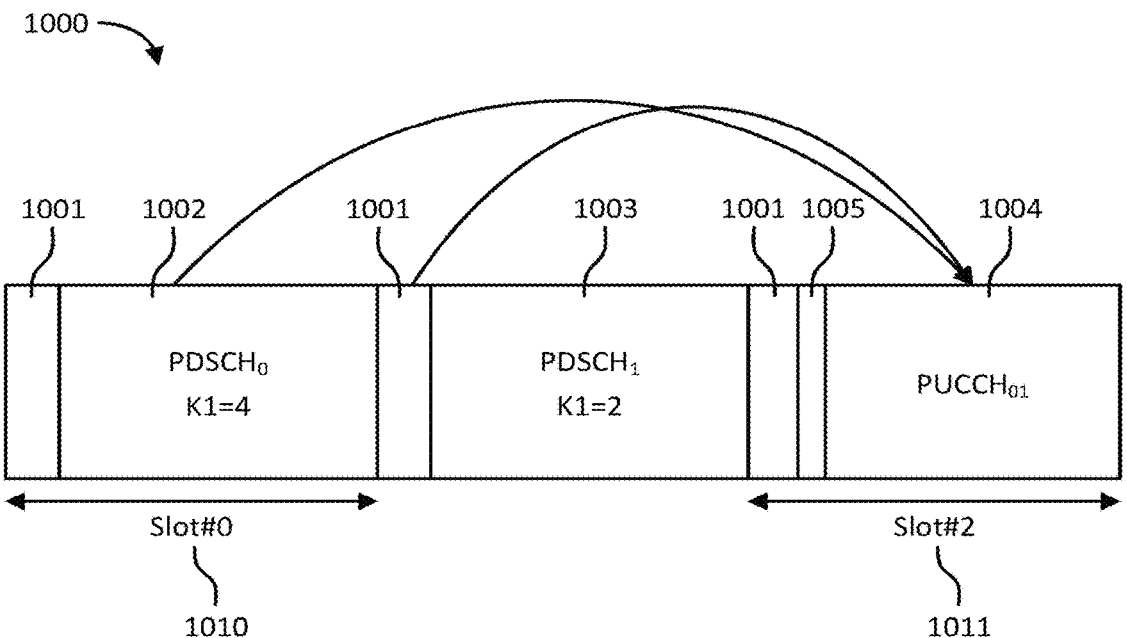
FIG. 10 is a diagram of K1 is incremented in the finest granularity of sub-slots (2 per slot) for lowest priority (eMBB)

FIG. 10 shows K1 incremented in the finest granularity of sub-slots for the lowest priority 1000. FIG. 10 shows a plurality of slots (e.g., slot #0 1010 and slot #2 1011) comprising PDCCH 1001, gap 1005, PDSCH$_0$ with K1=4 1002, PDSCH$_1$ with K1=2 1003, and PUCCH$_{01}$ 1004. PDSCH$_0$ with K1=4 1002 and PDSCH$_1$ with K1=2 1003 may be acknowledged jointly in slot #2 1011. In this alternative, K1 may be interpreted according to the finest granularity, i.e., according to the maximum number of sub-slots per slot. The UE may decide the K1 to use based on the priorityLevel signaled in the grant. FIG. 10 shows an eMBB use case incrementing K1 by the maximum number of sub-slots per slot assuming that the largest number of sub-slots per slot for the UE may be 2. So only K1 values of 2, 4, 6, etc. may be valid for eMBB as the indication of the PUCCH resource in in terms of slot for eMBB.

TABLE 2

Different K1 for different number of sub-slots

| PriorityLevel | # sub-slots per slot | K1 |
| --- | --- | --- |
| 0 (lowest) | 1 | Increments in unit of slot |
| 1 | 2 | Increments in unit of 0.5 slot |
| 2 | 3 | Increments by about ⅓ of a slot. Exact number of symbols for each sub-slot may be provided through RRC signaling or specification. |
| 3 (highest) | 4 | Increments by about 0.25 of a slot. Exact number of symbols for each sub-slot may be provided through RRC signaling or specification. |

Figure 11:
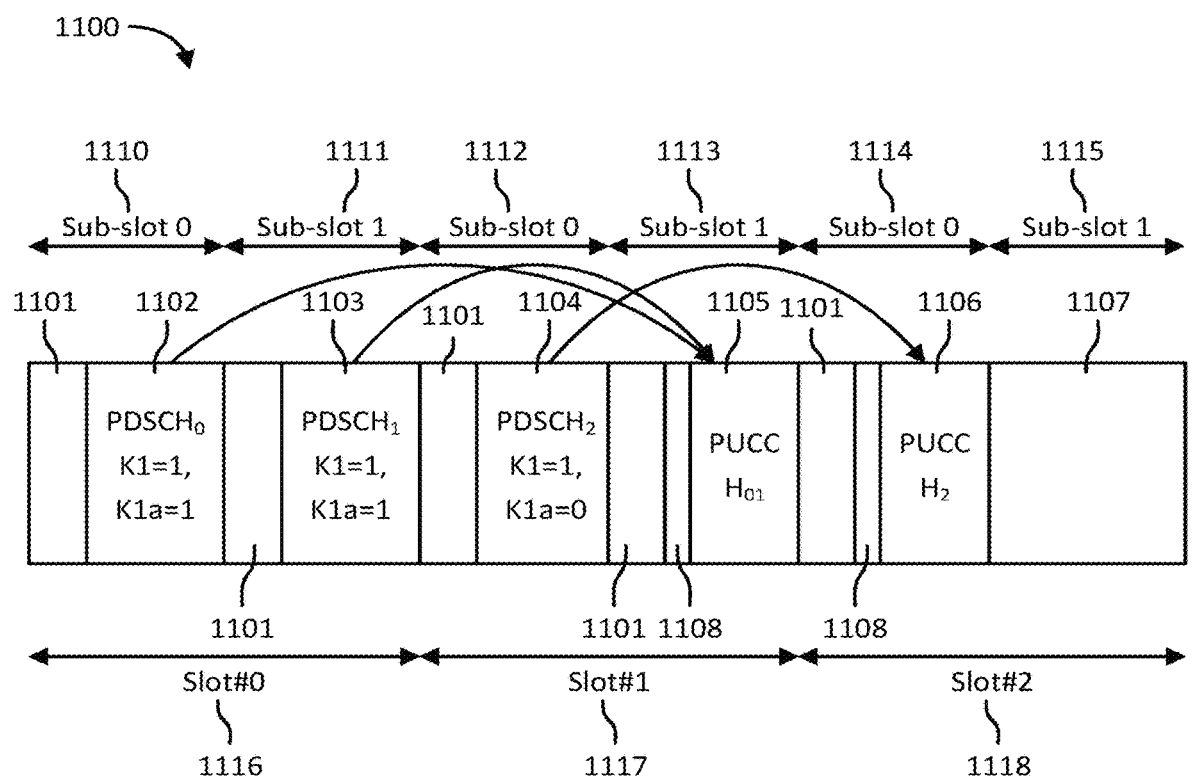
FIG. 11 is a diagram of K1 indicates the slot for PUCCH and K1a indicates the sub-slot.

FIG. 11 shows an example 1100 where K1 indicates the slot for PUCCH and K1a indicates the sub-slot. FIG. 11 shows a plurality of slots: slot #0 1116 comprising sub-slot 0 1110 and sub-slot 1 1111, slot #1 1117 comprising sub-slot 0 1112 and sub-slot 1 1113, and slot #2 1118 comprising sub-slot 0 1114 and sub-slot 1 1115. FIG. 11 also shows PDCCH 1101, gaps 1108, other signals 1107, PDSCH$_0$ with K1=1 and K1a=1 1102, PDSCH$_1$ with K1=1 and K1a=1 1103, PDSCH$_2$ with K1=1 and K1a=0 1104, PUCCH$_{01}$ 1105, and PUCCH$_2$ 1106. Additional bits may be introduced in the field 'K1a' in the scheduling DCI to indicate the sub-slot for PUCCH. K1 may be incremented in terms of slots and K1a may provide the offset of the sub-slot number within the slot. In FIG. 11, K1 indicates the slot offset and K1a indicates the sub-slot offset within that slot for PUCCH resource. M=2 sub-slots per slot for this example.

HARQ Codebooks for different priority transmissions are described herein. The gNB may determine if the HARQ ACK bits for different priorities are to be jointly encoded or separately encoded. If they are separately encoded, different codebooks may be used for different priority levels. The gNB may indicate through RRC signaling the codebook type for each priority level. For example, eMBB transmissions may use semi-static codebook while URLLC may use dynamic codebook. Dynamic codebook may be well suited for URLLC as the overhead in the UCI may be smaller and the smaller payload can be transmitted with fewer resources for high reliability. Also, it may be expected that the URLLC HARQ-ACK may be transmitted with low latency. Therefore, not many PDSCHs may be multiplexed in the same PUCCH. So semi-static codebook may be unnecessary especially if the URLLC traffic can be sporadic.

It may be desirable to configure separate PUCCH resource sets for different priorities or additional PUCCH resources in each resource set. For example, eMBB traffic may have PUCCH resources in the last symbols of a slot whereas, URLLC may require multiple PUCCH resources in a slot including resources in the leading symbols of a slot to minimize latency. RRC signaling may configure the PUCCH resource set and the corresponding priorityLevels of PDSCH that can be acknowledged through a PUCCH resource in the PUCCH resource set.

If PUCCH resource sets are different for different priority levels, they may use separate codebooks for HARQ-ACK. If a PUCCH resource set may be the same for two transmissions of different priorityLevels, their HARQ-ACK may either be jointly encoded and transmitted in one code-book or may be transmitted on separate codebooks—this behavior of whether to HARQ-ACK of different priorities can be jointly transmitted may be configured by the gNB to the UE through RRC signaling.

Figure 12:
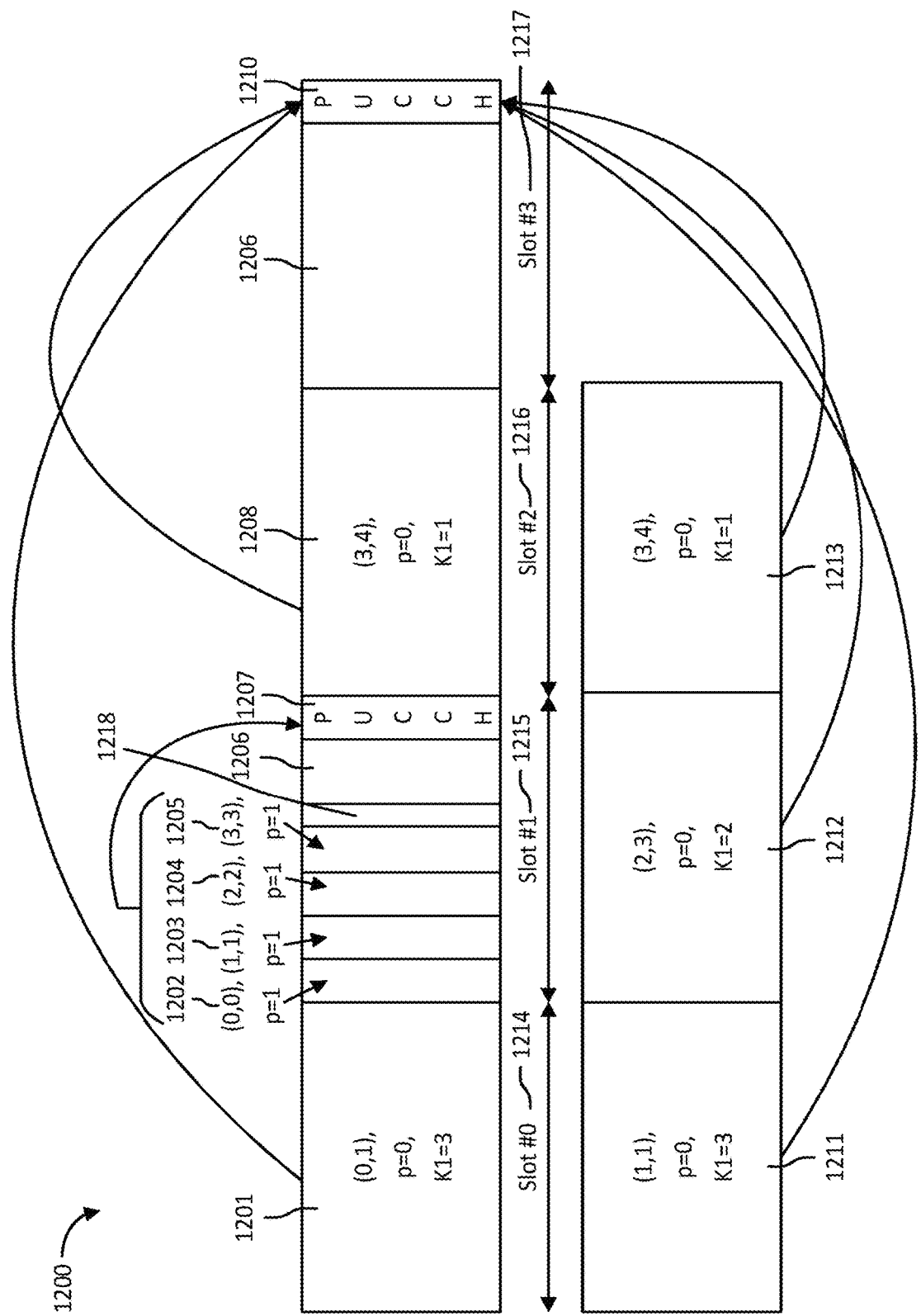
FIG. 12 is a diagram of Separate HARQ ACK codebooks for p=0 (eMBB) and p=1 (URLLC)

FIG. 12 shows an example of separate HARQ ACK codebooks 1200 for p=0 (eMBB) and p=1 (URLLC). FIG. 12 shows $PDCCH_{01}$ p=0 and K1=3 1201, $PDCCH_{00}$ p=1 1202, $PDCCH_{11}$ p=1 1203, $PDCCH_{22}$ p=1 1204, $PDCCH_{33}$ p=1 1205, $PDCCH_{34}$ p=0 and K1=1 1208, $PDCCH_{11}$ p=0 and K1=3 1211, $PDCCH_{23}$ p=0 and K1=2 1212, and $PDCCH_{34}$ p=0 and K1=1 1213, gap 1218, other DL signals 1206, PUCCG 1207, and PUCCH 1210. If multiple dynamic codebooks are used for multiple priority levels, counters cDAI and tDAI may be defined for each priority level separately. A codebook of priorityLevel p may use parameters cDAIp and tDAIp to determine their dynamic codebook. The cDAIp and DAIp may be indicated in the scheduling DCI, and p may be determined by the UE from the priorityLevel embedded in the DCI or PDCCH (through one of the methods described earlier). Accordingly, the UE may prepare the codebook for transmitting for priorityLevel p. In the example of FIG. 12, the cDAI and tDAI values may be incremented independently for eMBB and URLLC PDSCH. The eMBB PDCCH may indicate the PUCCH 1210 resource in slot #3 1217. As a result, their HARQ-ACK may be combined in one codebook and transmitted on PUCCH 1210 in slot #3 1217. The URLLC PDCCH may indicate a PUCCH resource in slot #1 1215; the URLLC HARQ-ACK may be combined into one codebook and transmitted on PUCCH in slot #1 1207. If the tDAI and cDAI are shared between the priorities, their codebooks cannot be easily separated. This is because, if a DCI is missed, although the discrepancy between the cDAI and tDAI indicates it, the UE cannot determine if it missed the scheduling of URLLC or eMBB transmission and therefore does not know whether to NACK the missed PDSCH in the eMBB codebook or URLLC codebook.

A codebook may be defined based on the PUCCH resource. This may allow transmission of HARQ-ACK in the nearest PUCCH resource and can benefit URLLC latency requirements. If PDSCH of multiple priority levels point to the same PUCCH resource, and the UE is allowed to multiplex the HARQ-ACK for the different priority levels, then the UE jointly may transmit the HARQ-ACK of those transmissions in the same PUCCH resource. In this case, the cDAI may be reset after each PUCCH resource transmissions opportunity.

Multi-TRP PUCCH transmissions are described herein. When supporting multi-TRP transmission, a UE may receive a first PDCCH and corresponding first PDSCH from a first TRP and a second PDCCH and corresponding second PDSCH from a second TRP. The time-frequency resources for the first and second PDSCHs may be overlapping, non-overlapping, or partially overlapping. For example, the PDSCHs may be received in the same or different slots. The PDSCHs may be received on overlapping or non-overlapping PRBs, for instance.

In some scenarios, a UE may receive a PDSCH in which a first set of layers comes from a first TRP and in which a second set of layers comes from a second TRP. In one example, the first and second set of layers may be used to transmit different codewords or transport blocks. In another example, a single codeword or transport block may be transmitted on the first and second set of layers.

Signals/channels transmitted/received from/to different TRPs in a cell may be associated with different applications and thereby associated with different priority levels. For example, a macro TRP may be used for URLLC since it has the best connection to the core network, whereas a low power TRP near the UE location with non-ideal backhaul may be used for eMBB traffic.

Figure 13:
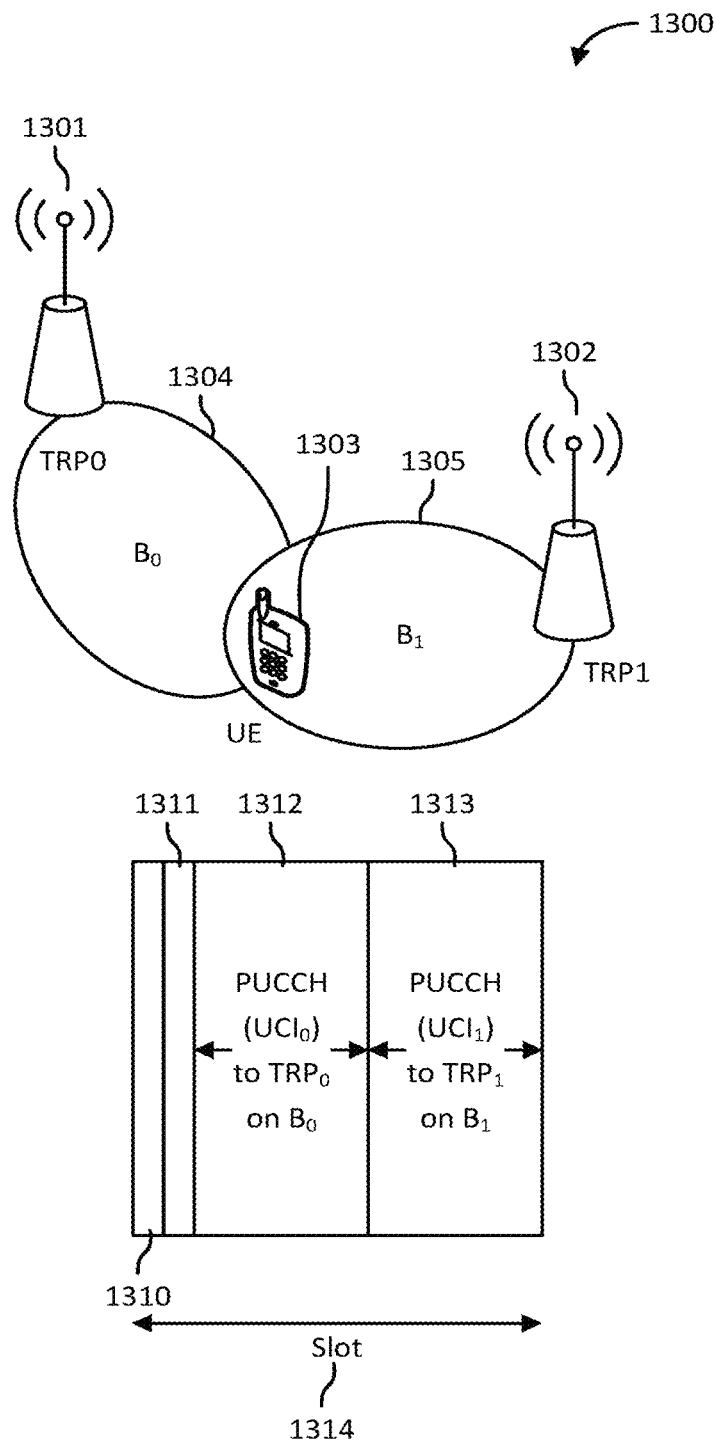
FIG. 13 is a diagram of PUCCH transmission to multiple Transmission and Reception Points (TRPs)

FIG. 13 shows an example where a UE transmits to multiple TRPs 1300. FIG. 13 shows PDCCH 1310, gap 1311, and PUCCH 1312 and 1313 during slot 1314. UE 1303 transmits the PUCCH of $UCI_0$ 1312 to $TRP_0$ 1301 on beam $B_0$ 1304 and transmits the PUCCH of $UCI_1$ 1313 to $TRP_1$ 1302 on Beam $B_1$ 1305. UE 1303 may provide a separate UCI to each TRP 1301 and 1302. Each UCI may contain CSI reports and HARQ-ACK corresponding to a specific TRP (for example, corresponding to a first or second PDSCH or a first or second set of layers of a PDSCH). As a result, UE 1303 may transmit PUCCH 1312 and 1313 to each TRP 1301 and 1302 with the appropriate spatial direction. In other words, the beam for PUCCH transmission in correspondence with a DL RS or QCL with an UL RS may be different for each TRP.

Figure 14:
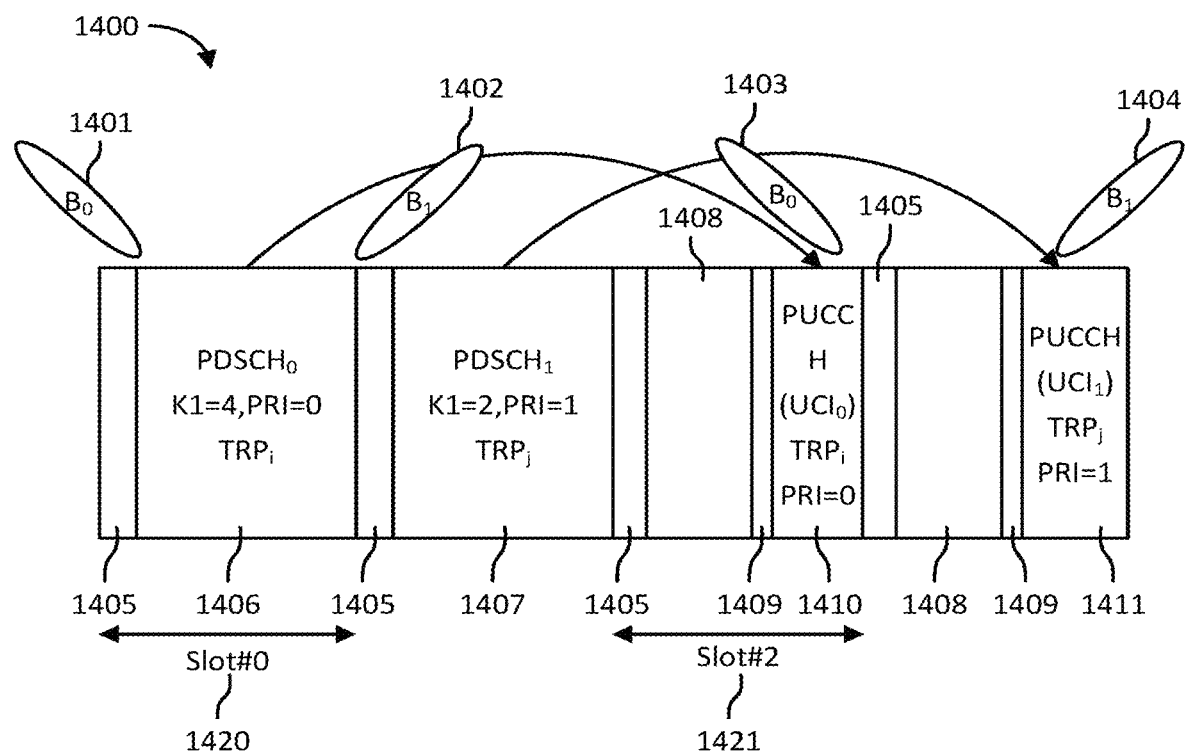
FIG. 14 is a diagram of PUCCH transmission to multiple TRPs. PRI=0 configured for PUCCH transmission on B0 to TRP0, PRI=1 configured for PUCCH transmission on B0 to TRP1.

FIG. 14 shows an example of PUCCH transmission to multiple TRPs 1400. FIG. 14 shows PDCCH 1405, gaps 1409, other signals 1408, $PDSCH_0$ with K1=4 and PRI=0 transmitted by TRP; 1406 during slot #0 1420, $PDSCH_1$ with K1=2 and PRI=1 transmitted by $TRP_j$ 1407, PUCCH $UCI_0$ 1410, and PUCCH $UCI_1$ 1411. As the spatial direction may be different for each of $UCI_0$ and $UCI_1$, different PUCCH resources may be indicated for $UCI_0$ and $UCI_1$ as each PUCCH resource may be identified with a certain spatial direction. As shown in FIG. 14, $UCI_0$ and UCI are transmitted in PUCCH 1410 and PUCCH 1411, respectively.

FIG. 14 also shows that TRP; and TRP; transmits $PDSCH_0$ 1406 and PDSCH1 1407 to the UE on beams $B_0$ 1401 and $B_1$ 1402 with PRI=0 and PRI=1, respectively. The UE responds with PUCCH with $UCI_0$ 1410 to $TRP_0$ in slot #2 1421 on beam $B_0$ 1403 and PUCCH with $UCI_1$ 1411 to $TRP_1$ in slot #3 on beam $B_1$ 1404. PUCCH resource with PRI=0 may be configured for transmission on Beam $B_0$ 1403, and resource with PRI=1 may be configured for transmission on Beam $B_1$ 1404. This configuration of spatial direction of PUCCH resource may be done through MAC CE activation. If multiple TRPs are to be supported, multiple PUCCH resources are configured for different spatial direction.

To overcome the activation overhead, the following alternative may be considered. The UE may be configured to use the spatial direction based on the identity of the TRP. The identity of the TRP may be indicated in the form of a spatial relation to an SSB or CSI-RS or an UL SRS. For example, the identity of a TRP may be tied to the CORESET. For example, TRPi may schedule using $CORESET_i$. Then the TCI configuration of $CORESET_i$ may indicate the spatial direction that is to be used for the PUCCH for $TRP_i$. In this case, the UE may ignore the MAC CE activated spatial direction. Instead, it may use the TRP identity and corresponding spatial direction.

Figure 15:
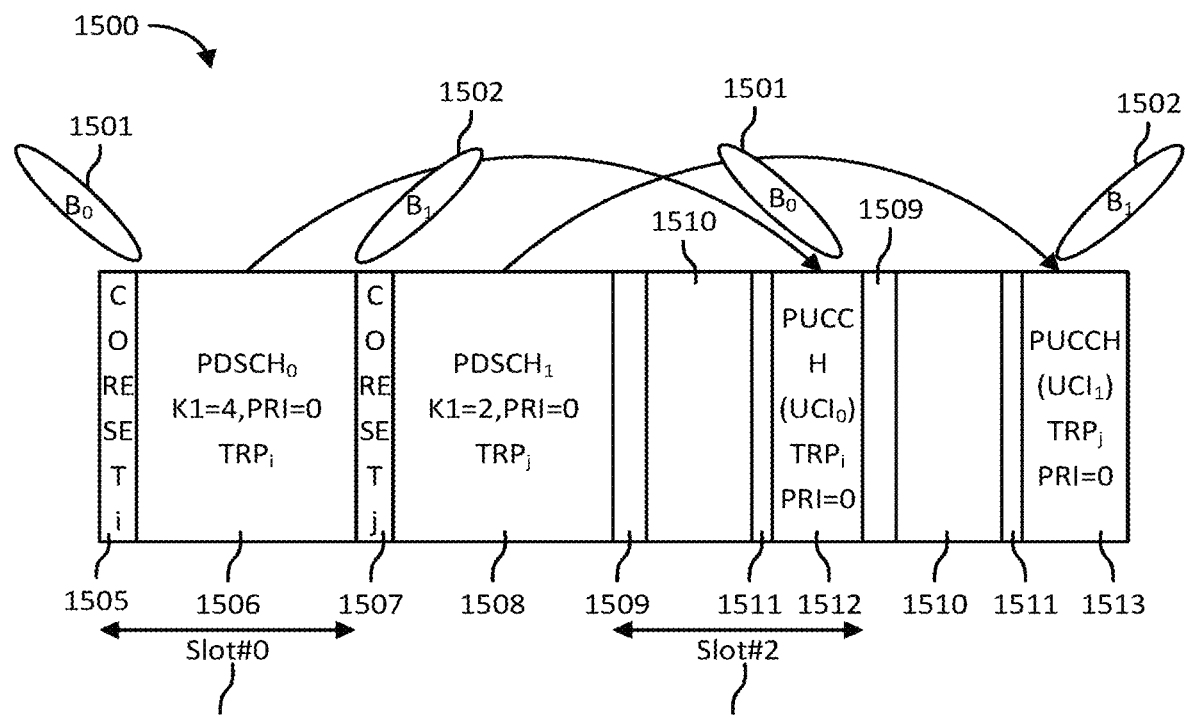
FIG. 15 is a diagram of PUCCH spatial direction based on TRP identity (derived from CORESET in this example)

FIG. 15 shows an example of PUCCH spatial direction based on TRP identity 1500. FIG. 15 shows PDCCH 1509, gaps 1511, other signals 1510, $PDSCH_0$ with K1=4 and PRI=0 transmitted by TRP; 1506 during slot #0 1520, $PDSCH_1$ with K1=2 and PRI=1 transmitted by TRP; 1508, PUCCH $UCI_1$ 1512 during slot #2 1521, and PUCCH $UCI_1$ 1513. FIG. 15 shows the case where CORESET; transmitted in PDCCH 1505 may be configured for $TRP_i$. $TRP_i$ may schedule with PDSCH with PRI=0, but the UE may use beam $B_0$ 1501 for $TRP_i$. $CORESET_j$ is transmitted in PDCCH 1507 and may be configured for $TRP_j$. $TRP_j$ may schedule with PDSCH with PRI=0, but the UE may use beam $B_1$ 1502 for $TRP_j$. As another alternative, instead of using the TCI state of the CORESET, a spatial direction based on SSB or CSI-RS or SRS may be assigned to UE for each TRP through higher layer signaling.

Note that a TRP's identity might not be explicitly used in any configuration information. Instead, a TRP may be indirectly identified through a spatial direction. The spatial directions for the different PUCCHs may be explicitly configured through a DL RS or UL RS or connected to a DL channel, e.g. to $CORESET_i$ as described above, or to TCI states of different PDSCH transmissions, or to different TCI states of different layers of a PDSCH transmission.

The UCI on PUSCH is described herein. A high priority UCI piggybacked on a low priority PUSCH is described herein. It is proposed that when the PUCCH for URLLC overlaps with the PUSCH for eMBB, the URLLC UCI may be piggybacked on to the eMBB PUSCH. As M>1 may be supported for URLLC, multiple instances or codebooks of UCI may be piggybacked on the PUSCH.

Figure 16:
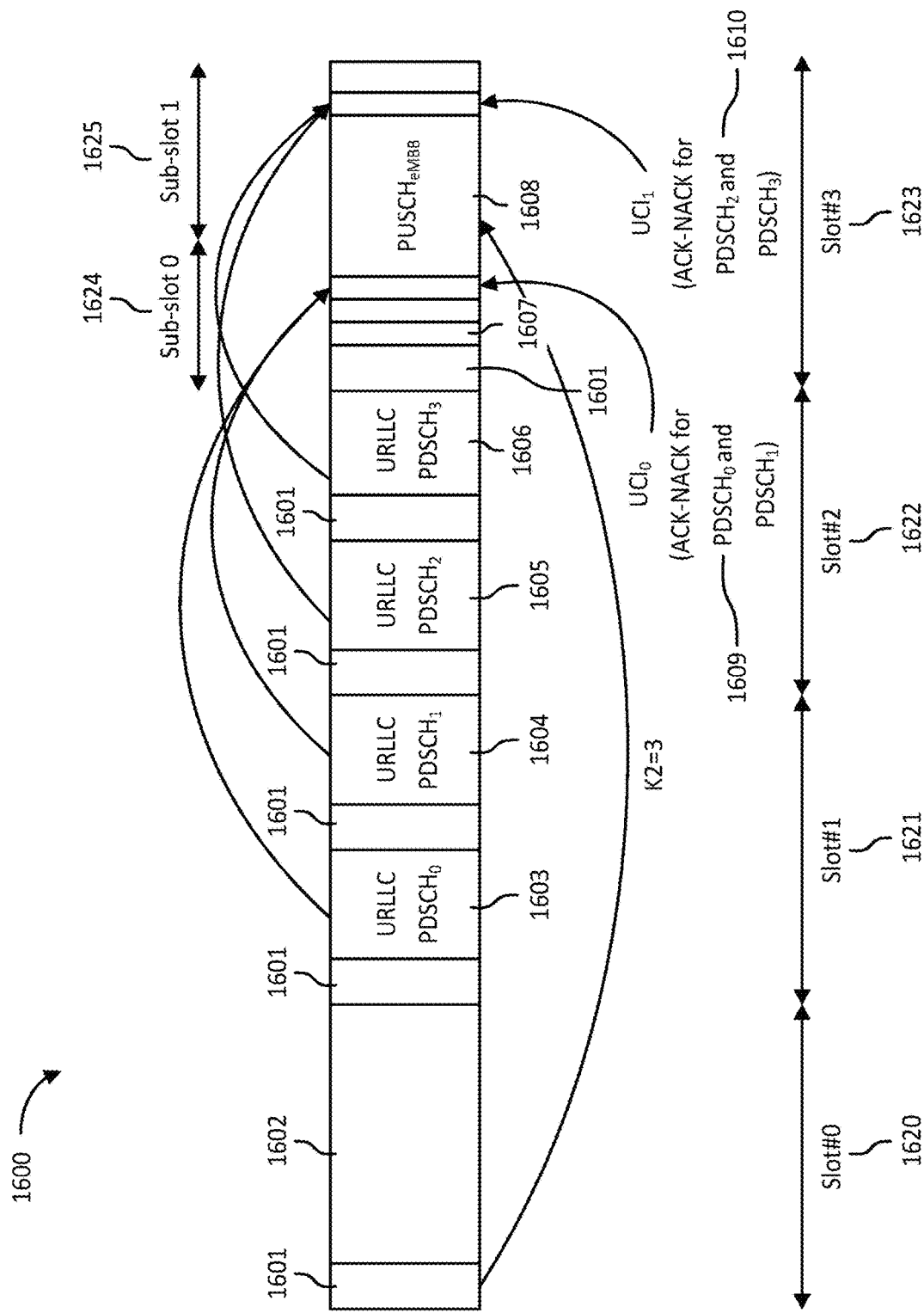
FIG. 16 is a diagram of Multiple HARQ ACK codebooks are piggybacked on single PUSCH within a slot.

FIG. 16 shows an example of multiple HARQ ACK codebooks are piggybacked on a single PUSCH within a slot 1600. FIG. 16 shows PDCCH 1601, gap 1607, and other signals 1602. An eMBB PUSCH 1608 may be scheduled for slot #3 1623. URLLC PDSCHs 1603, 1604, 1605, and 1606 may be scheduled in slot #1 1621 and slot #2 1622. The ACK/NACK for $PDSCH_0$ and $PDSCH_1$ 1609 (denoted as $UCI_0$) may be jointly encoded and transmitted in the first half of slot #3 (sub-slot #0 1624) while the ACK/NACK for $PDSCH_2$ and $PDSCH_3$ 1610 (denoted as $UCI_1$) may be jointly encoded and transmitted in the latter half of slot #3 (sub-slot #1 1625).

The eMBB PUSCH may be rate matched or punctured to accommodate the UCI. Depending on the UE capability and the latency in processing the PDSCH, the methods, including but not limited to the following, may be used to map the $UCI_0$ and $UCI_1$ on the PUSCH:
(1) PUSCH may be punctured to enable mapping of $UCI_0$ and $UCI_1$
(2) PUSCH may be rate matched around resources for $UCI_0$ and $UCI_1$
(3) PUSCH may be rate matched around resources for $UCI_0$ and punctured by resources for $UCI_1$. This case may apply if the latency is not enough to enable the PUSCH to be rate matched for accommodating $UCI_1$.

Similar principles may be applied to UCI carrying CSI. If URLLC requires UCI measurements and reports multiple times per slot, the reports may be piggybacked on the PUSCH similar to $UCI_0$ and $UCI_1$ in FIG. 16.

Alternatively, one instance of the UCI transmission on the slot may be HARQ ACK while the other instance may carry only CSI. For example, $UCI_0$ may include HARQ-ACK while $UCI_1$ may include CSI reports.

Alternatively, the M UCI feedback occasions in the slot may carry each carry both HARQ-ACK and CSI.

The number of REs for the UCI may be determined by the beta-offset factors $\beta_{offset}^{HARQ-ACK}$, $\beta_{offset}^{CSI-1}$, and $\beta_{offset}^{CSI-2}$ which may either be indicated through DCI scheduling the PUSCH or through higher layer signaling. The beta-offset factors denote the fraction of the PUSCH resources that can be used for UCI transmission. It is proposed herein that a UE be configured with a different set of offsets for each supported priority of the UCI. The $m^{th}$ signaling occasion of UCI on PUSCH may be denoted by $UCI_m$. For example, in FIGS. 16, m=0 and m=1 may be supported. It is proposed herein that the UE be configured with $\beta_{offset,m}^{HARQ-ACK}$, $\beta_{offset,m}^{CSI-1}$, and $\beta_{offset,m}^{CSI-2}$ values for each of the m occasions. This provides more flexibility to the gNB in configuring the target reliabilities for different UCI. The configuration may occur through higher layers or through DCI scheduling the PUSCH wherein the field indicating the beta_offset may be configured in one of the following ways:
(1) beta_offset indicator may be available for each of m UCI occasions. If 2 bits are used for each occasion, the total number of required bits scales with the number of occasions and can become large in some cases.
(2) beta_offset indicator may be 2 bits regardless of the number of occasions and therefore the DCI size need not be changed if m changes. In this case, the beta_offset indicator indicates the offset index for each of the m occasions. An example is shown in Table 3. Here, the UE may be configured with a set of four $I_{offset,i,m}^{HARQ-ACK}$ indexes for each of the m occasions. $I_{offset,i,m}^{HARQ-ACK}$ may be an index into a table of beta-offset values for $\beta_{offset,m}^{HARQ-ACK}$. Here i denotes the payload of the target UCI. For example, i=0 denotes the case when the UE multiplexes up to 2 HARQ-ACK information bits, i=1 more than 2 and up to 11 HARQ-ACK information bits, and i=2 denotes more than 11 bits in HARQ-ACK. The DCI carries the 2 bits of beta_offset indicator which indicates the row of offsets to be used. As an example, the $I_{offset,i,0}^{HARQ-ACK}$ for URLLC UCI may be greater than $I_{offset,i,1}^{HARQ-ACK}$ for eMBB UCI to provide more reliability to the URLLC UCI.

TABLE 3

| | Mapping of beta_offset indicator values to offset indexes for M = 2 | |
|---|---|---|
| | m = 0 | m = 1 |
| beta_offset indicator | ($I_{offset,0,0}^{HARQ-ACK}$ or $I_{offset,1,0}^{HARQ-ACK}$ or $I_{offset,2,0}^{HARQ-ACK}$), ($I_{offset,0,0}^{CSI-1}$ or $I_{offset,0,0}^{CSI-2}$), ($I_{offset,1,0}^{CSI-1}$ or $I_{offset,1,0}^{CSI-2}$), | ($I_{offset,0,1}^{HARQ-ACK}$ or $I_{offset,1,1}^{HARQ-ACK}$ or $I_{offset,2,1}^{HARQ-ACK}$), ($I_{offset,0,1}^{CSI-1}$ or $I_{offset,0,1}^{CSI-2}$), ($I_{offset,1,1}^{CSI-1}$ or $I_{offset,1,1}^{CSI-2}$), |
| '00' | $1^{st}$ offset index provided by higher layers | $1^{st}$ offset index provided by higher layers |
| '01' | $2^{nd}$ offset index provided by higher layers | $2^{nd}$ offset index provided by higher layers |
| '10' | $3^{rd}$ offset index provided by higher layers | $3^{rd}$ offset index provided by higher layers |
| '11' | $4^{th}$ offset index provided by higher layers | $4^{th}$ offset index provided by higher layers |

If PUSCH hopping is configured for the UE, the $UCI_m$ may be mapped in the different hops of the eMBB PUSCH. This may be different from other systems wherein the UCI may be split and mapped to each hop of PUSCH.

Figure 17:
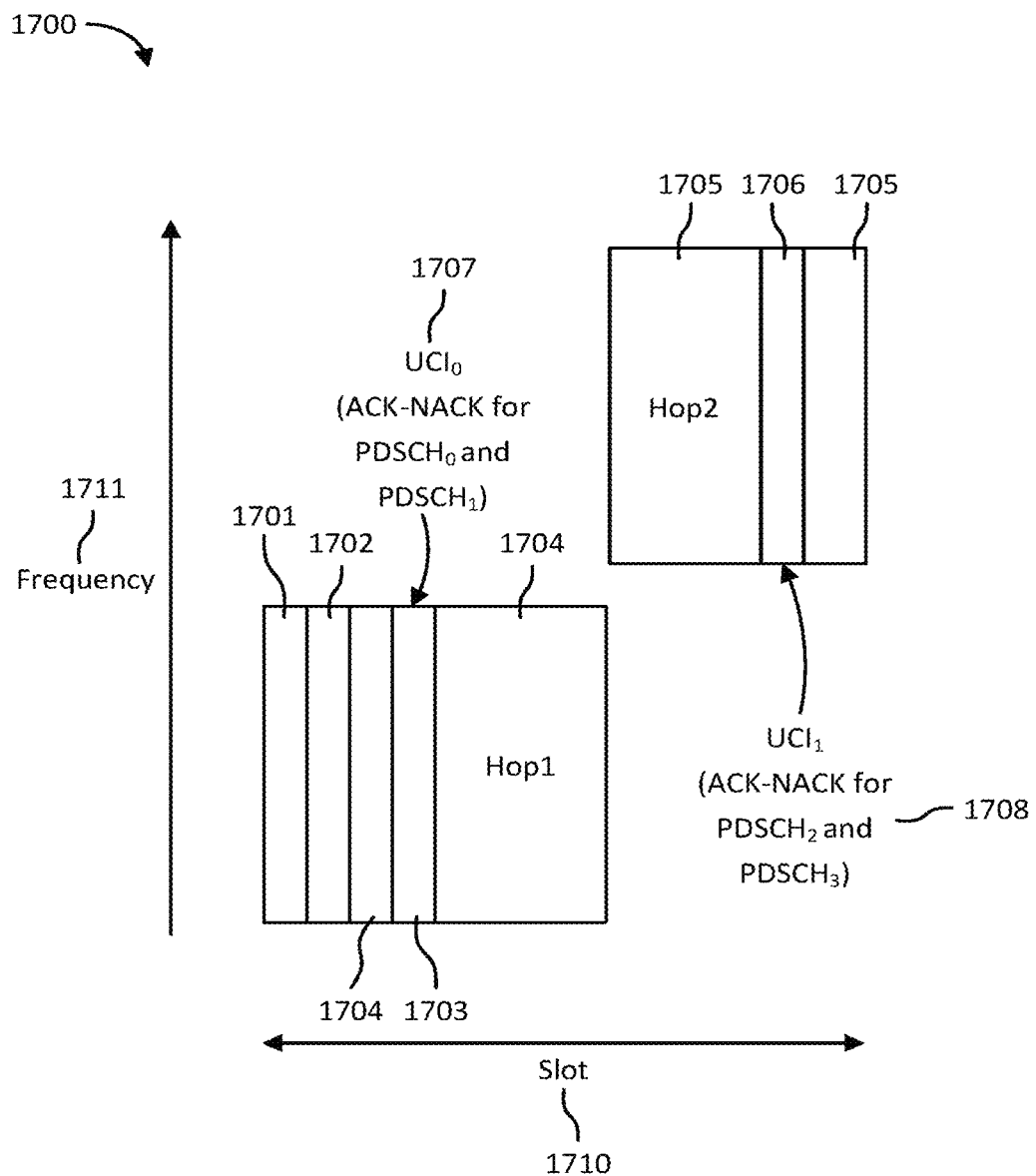
FIG. 17 is a diagram of $UCI_m$ mapping on different hops of PUSCH.

FIG. 17 shows an example of $UCI_m$ mapping on different hops of the PUSCH 1700. FIG. 17 shows PDCCH 1701, gap 1702 during slot 1710 with respect to frequency 1711. As seen in the example in FIG. 17, if the eMBB PUSCH is configured with 2 hops, $UCI_0$ 1703, comprising ACK-NACK for $PDSCH_0$ and $PDSCH_1$ 1707, may be transmitted in hop 1 of the PUSCH 1704. $UCI_1$ 1706, comprising ACK-NACK for $PDSCH_2$ and $PDSCH_3$ 1708, may be transmitted in the hop 2 of the PUSCH 1705.

Figure 18:
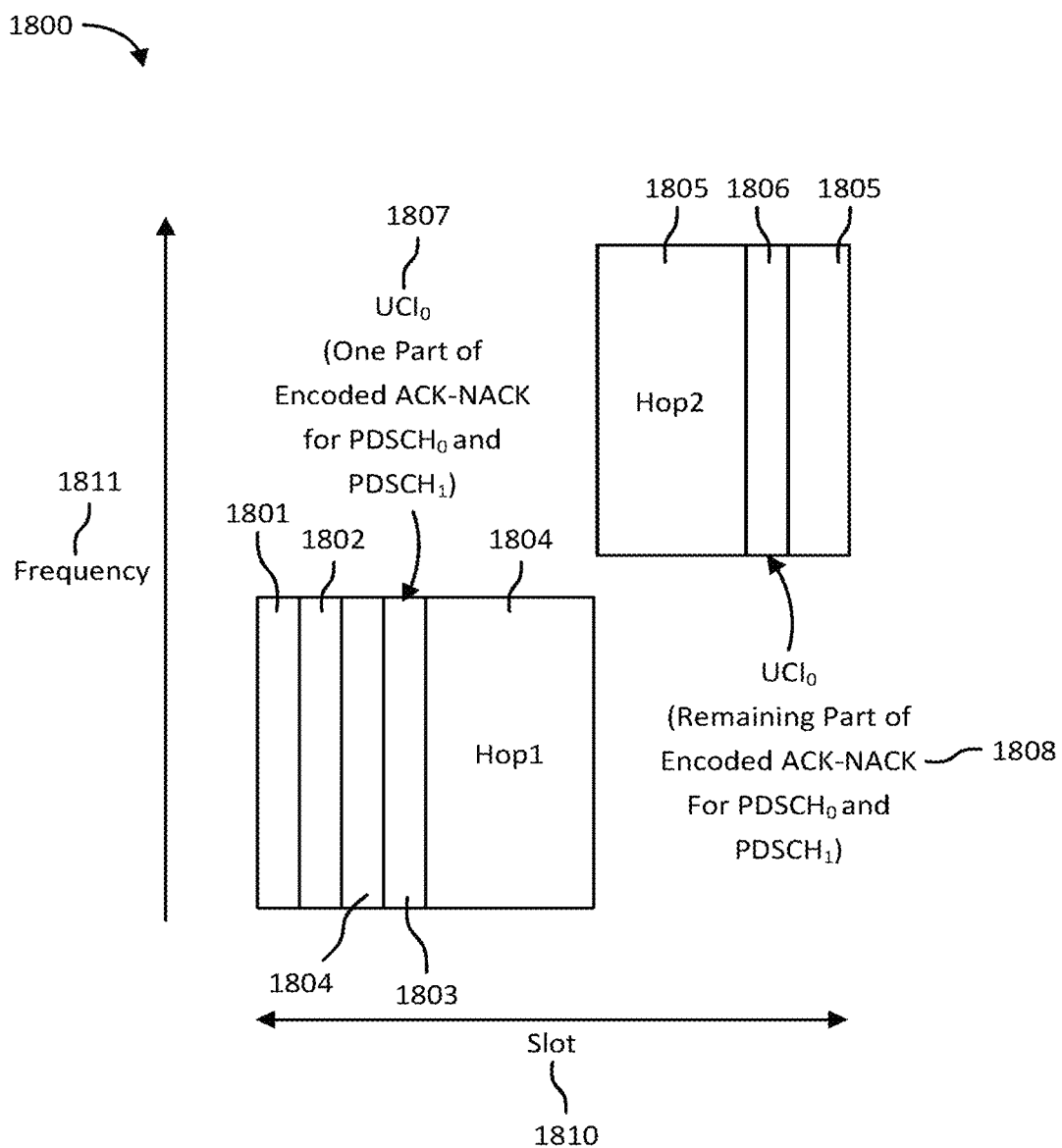
FIG. 18 is a diagram of $UCI_0$ is split mapped on the hops of PUSCH.

If only a single HARQ-ACK codebook requires to be mapped on PUSCH, i.e., M=1, then the vectors of encoded, rate-matched, and modulated URLLC UCI may be split and mapped to both eMBB PUSCH hops. FIG. 18 shows an example of $UCI_0$ being split mapped on the hops of the PUSCH 1800. This configuration may be used if the latency from the latter hop is acceptable. The UE may be configured to support mapping of $UCI_m$ on each PUSCH hop or only to a specific hop (to limit the latency). FIG. 18 shows PDCCH 1801, gap 1802 during slot 1810 with respect to frequency 1811. As seen in the example in FIG. 18, $UCI_0$ 1083, comprising one part of an encoded ACK-NACK for $PDSCH_0$ and $PDSCH_1$ 1807, may be transmitted in hop 1 of the PUSCH 1804. $UCI_0$ 1806, comprising the remaining part of the encoded ACK-NACK for $PDSCH_0$ and $PDSCH_1$ 1808, may be transmitted in the hop 2 of the PUSCH 1805.

If a UE has only one instance of UCI (M=1), it may split and map the UCI to both hops as shown in FIG. 18. However, if it has to transmit M>1 instances of UCI, it may not hop the UCI but map the instances as shown in FIG. 17. Alternatively, the URLLC UCI may be transmitted on the resources of eMBB PUSCH while eMBB data is not transmitted, i.e., URLLC UCI alone is transmitted on the UL-SCH for those resources.

Figure 19:
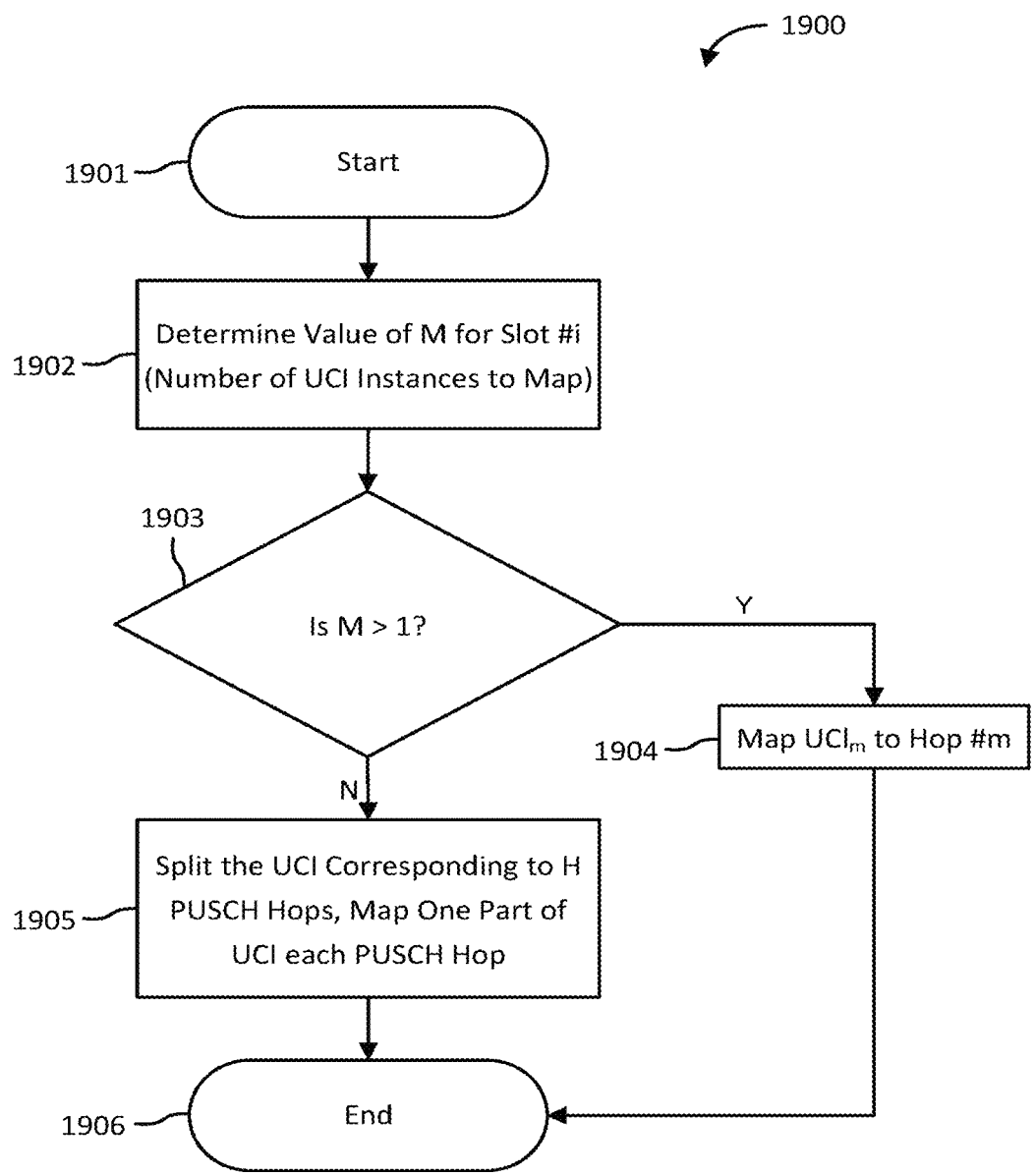
FIG. 19 is a diagram of UE procedure to map $UCI_0$. If M=1, $UCI_0$ is mapped to each hop. If M>1, $UCI_0$ is mapped to hop #0, $UCI_1$ is mapped to hop #1 etc.

FIG. 19 shows an example procedure for mapping $UCI_0$ 1900. In the example of FIG. 19, $UCI_0$ may be mapped to multiple hops if M=1 (example in FIG. 18). If M>1, each instance of the UCI may be multiplexed into a corresponding hop (example in FIG. 17). When the procedure starts (step 1901), the UE may determine the value of M for slot #i (number of UCI instances to map) (step 1902). The UE may then determine whether M is greater than 1 (step 1903). If M is greater than 1, the UE may map $UCI_m$ top hop #m (step 1904). If M is not greater than 1, the UE may split the UCI corresponding to H PUSCH hops, map one part of the UCI on each PUSCH hop (step 1905). The procedure may then end (step 1906).

Figure 20A:
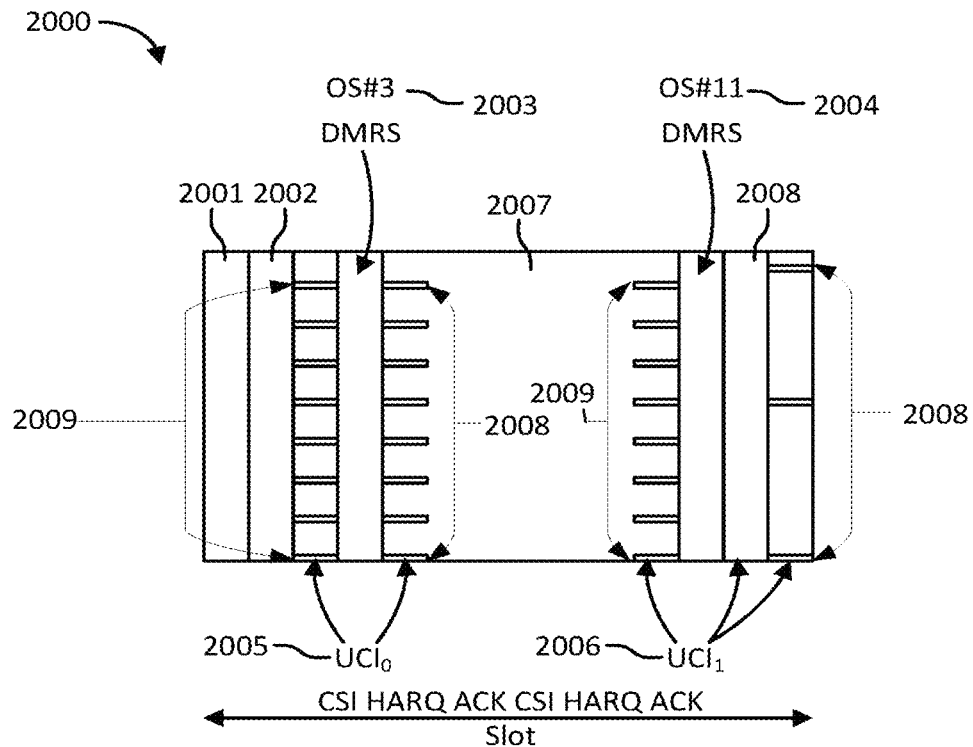
FIG. 20A is a diagram of Mapping of HARQ-ACK and CSI for $UCI_m$ on PUSCH Multiplexed with PUSCH resources.

FIG. 20A shows an example mapping 2000 of HARQ-ACK and CSI for $UCI_m$ on the PUSCH multiplexed with PUSCH resources. The example of FIG. 20A shows the mapping of $UCI_m$ on a PUSCH for M=2. FIG. 20A shows the PDCCH 2001, gap 2002, the PUSCH 2007, OFDM symbol #3 DMRS 2003, OFDM symbol #11 DMRS 2004, CSI 2009, and HARQ ACK 2008. $UCI_m$ may be mapped in the time domain as follows. Modulated HARQ-ACK symbols may be mapped close to the DMRS. For example, they may start on the first available non-DMRS symbol after the first set of contiguous DMRS symbols. For PUSCH with Type A DMRS, the mapping may start from the symbol preceding the DMRS if such as symbol is available. Modulated CSI symbols may be mapped starting on the first available non-DMRS symbol.

In the frequency domain, the modulated symbols of $UCI_m$ may be mapped to REs of symbol i in a distributed manner with distance d between successive REs determined as following:

(1) d=1, if the number of unmapped modulated symbols for that UCI at the beginning of OFDM symbol i may be larger or equal to the number of available REs in this OFDM symbol. The HARQ-ACK of $UCI_1$ 2006 in FIG. 20A shows the mapping for d=1.

(2) d=floor (number available REs on i-th OFDM symbol/ the number of unmapped modulated symbols for that UCI at the beginning of OFDM symbol i). The HARQ-ACK of $UCI_0$ 2005 in FIG. 20A shows the mapping for d>1. This allows for maximum distribution of the resources in frequency for exploiting frequency diversity.

The UCI may be mapped to all the layers of the transport block on the PUSCH.

Figure 20B:
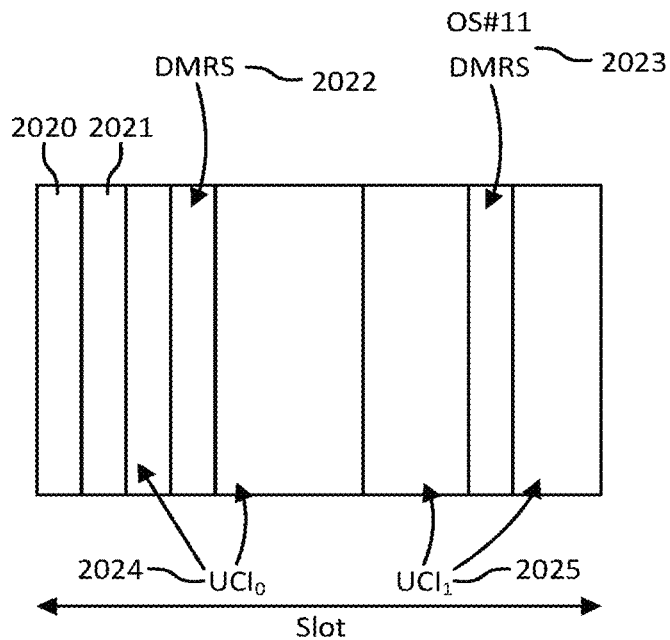
FIG. 20B is a diagram of Mapping of HARQ-ACK and CSI for $UCI_m$ on PUSCH with UCI only on PUSCH.

FIG. 20B shows an example mapping of $UCI_m$ on the PUSCH with UCI only on the PUSCH. FIG. 20B shows the PDCCH 2020, gap 2021, OFDM symbol #3 DMRS 2022, OFDM symbol #11 DMRS 2023, $UCI_0$ 2024, and $UCI_1$ 2025. The UCI may only be transmitted on the PUSCH resources. For example, the UCI for multiple URLLC PDSCHs may be transmitted separately over resources for one eMBB PUSCH. If the required resources for the URLLC UCI exceed a certain threshold, the eMBB PUSCH may be dropped and the REs may be used entirely for the UCIs. The number of symbols for $UCI_0$ 2024 and $UCI_1$ 2025 may be different, depending on how the beta-offsets are configured for each of the UCIs.

For eMBB PUSCH that carries multiple instances of UCI, if sufficient DMRS symbols are not present, every instance of UCI cannot be mapped next to a DMRS. Then, there can be a performance loss for UCI mapped away from DMRS symbols. This can be handled in the following ways.

Figure 21A:
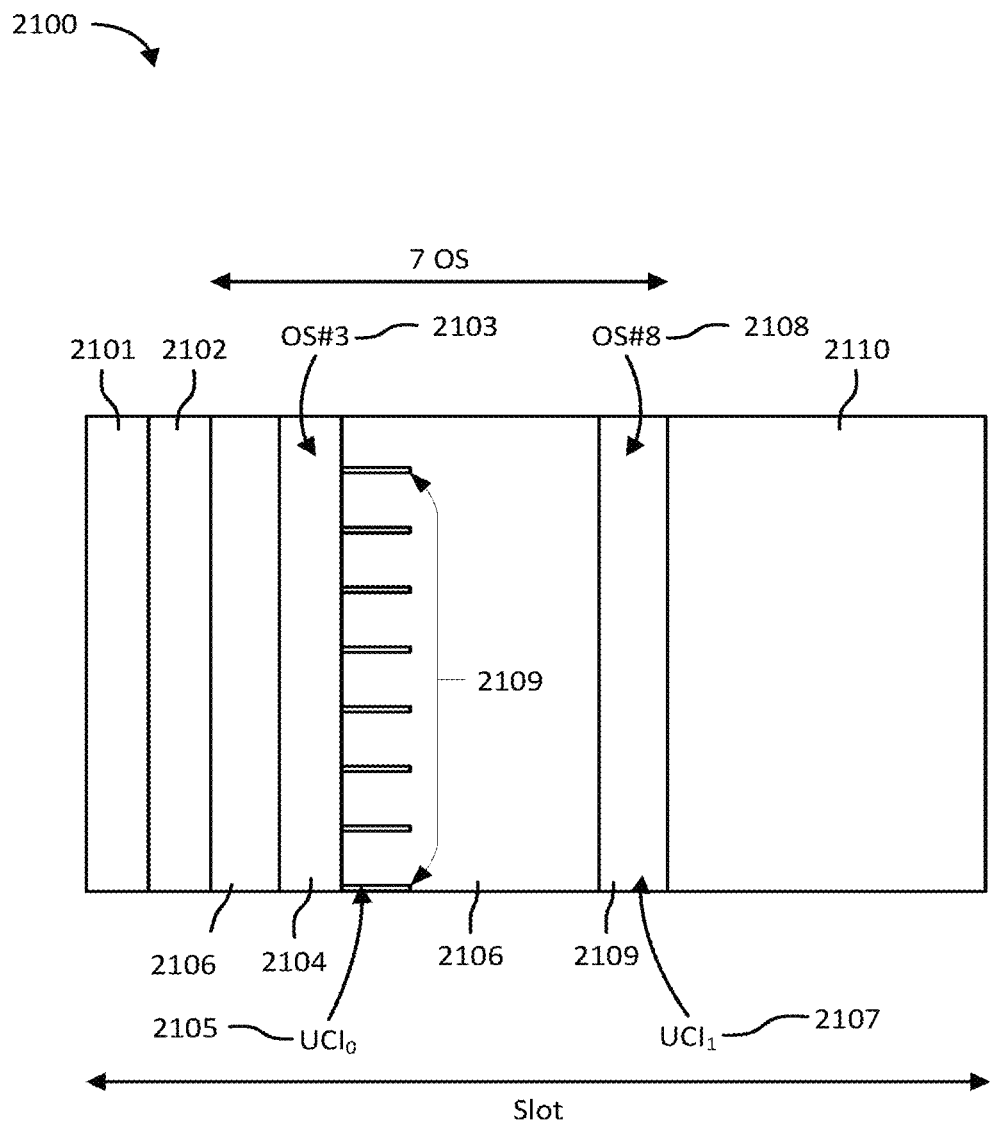
FIG. 21A is a diagram of HARQ-ACK UCI mapping resources no DMRS in vicinity of $UCI_1$.

FIG. 21A shows an example of HARQ-ACK UCI mapping resources with no DMRS in the vicinity of $UCI_1$ 2100. FIG. 21A shows the PDCCH 2101, gap 2102, OFDM symbol #3 DMRS 2104, PUSCH 2106, OFDM symbol #3 2103, OFDM symbol #8 2108, $UCI_0$ 2105, $UCI_1$ 2107, HARQ ACK 2109, and other UL signals 2110. The value of the beta-offset parameters, for example, $\beta_{offset}^{HARQ-ACK}$, may be set sufficiently large for the UCI instances that may not be close to a DMRS. In the example of FIG. 21A, where the PUSCH may be 7 symbols long and has only one DMRS symbol configured. Here the $UCI_1$ 2107 may use more resources compared to $UCI_0$ 2105 although both carry the same payload. The extra resources of $UCI_1$ 2107 may serve to compensate for poorer channel estimation quality for $UCI_1$ 2107. If DMRS is not available next to mapping location of a HARQ-ACK UCI, the UE may increase the beta-offset value by a factor $\beta_{offset,comp}^{HARQ-ACK}$ where $\beta_{offset,comp}^{HARQ-ACK}$ may be configured to the UE through RRC signaling. The UE may compute the number of resources using the factor $\beta_{offset,m}^{HARQ-ACK}$ instead of $\beta_{offset,comp}^{HARQ-ACK}$. Therefore, >1 may provide additional resources for the UCI mapping to the UE.

Figure 21B:
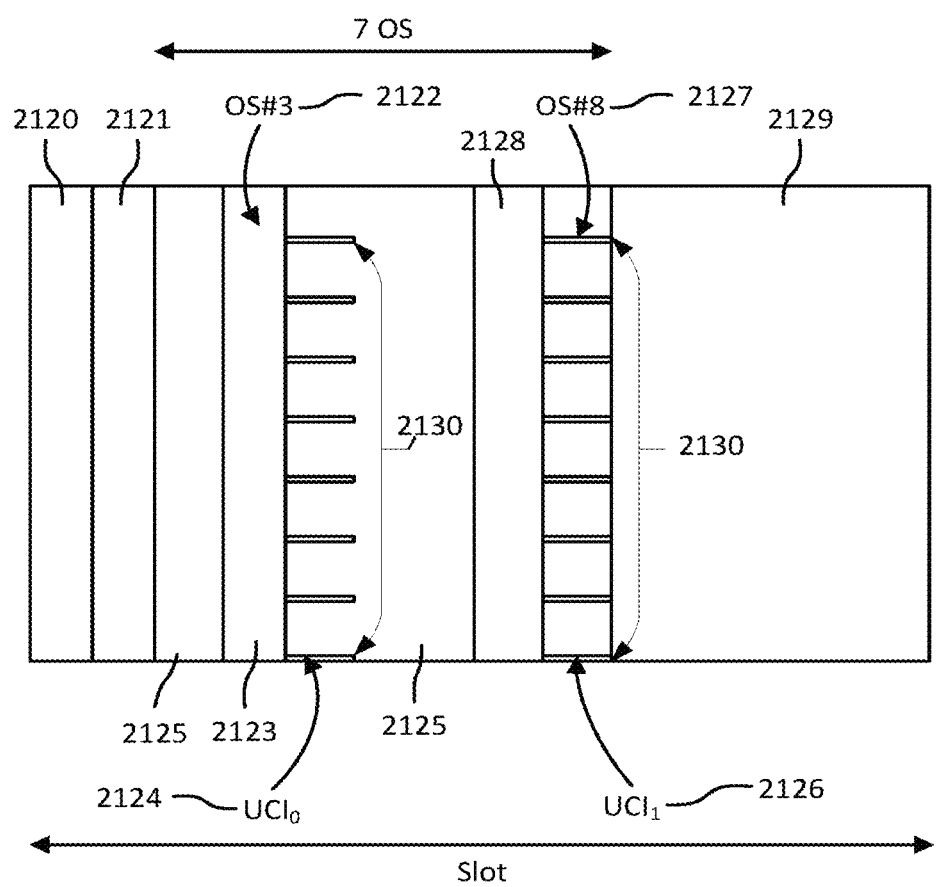
FIG. 21B is a diagram of HARQ-ACK UCI mapping resources Additional DMRS introduced in vicinity of $UCI_1$.

FIG. 21B shows an example of HARQ-ACK UCI mapping resources with an additional DMRS introduced into the vicinity of $UCI_1$. FIG. 20B shows the PDCCH 2120, gap 2121, OFDM symbol #3 2123, PUSCH 2125, OFDM symbol #3 2122, OFDM symbol #8 2127, $UCI_0$ 2124, $UCI_1$ 2126, DMRS 2128, HARQ ACK 2130, and other UL signals 2129. The UE changes the DMRS configuration for the PUSCH to ensure that a DMRS symbol may be available for mapping $UCI_m$ in its neighborhood. As shown in FIG. 21B, although configured for 7 symbols PUSCH with 1 DMRS in OS #3, the UE may generate a PUSCH of length 7 symbols with an extra DMRS in OS #7 so that $UCI_1$ can be mapped in the vicinity of the extra DMRS symbol. The UE may be expected to be configured with the extra locations for DMRS in the event of a need for piggybacked UCI in such sub-slots through RRC signaling.

A lower priority UCI may be piggybacked on a higher priority PUSCH. If the beta-offset value may be equal to 0, no UCI can be piggybacked on the PUSCH. Values less than 1 may be supported to enable some piggybacked resources for the low priority UCI on high priority PUSCH.

Figure 22A:
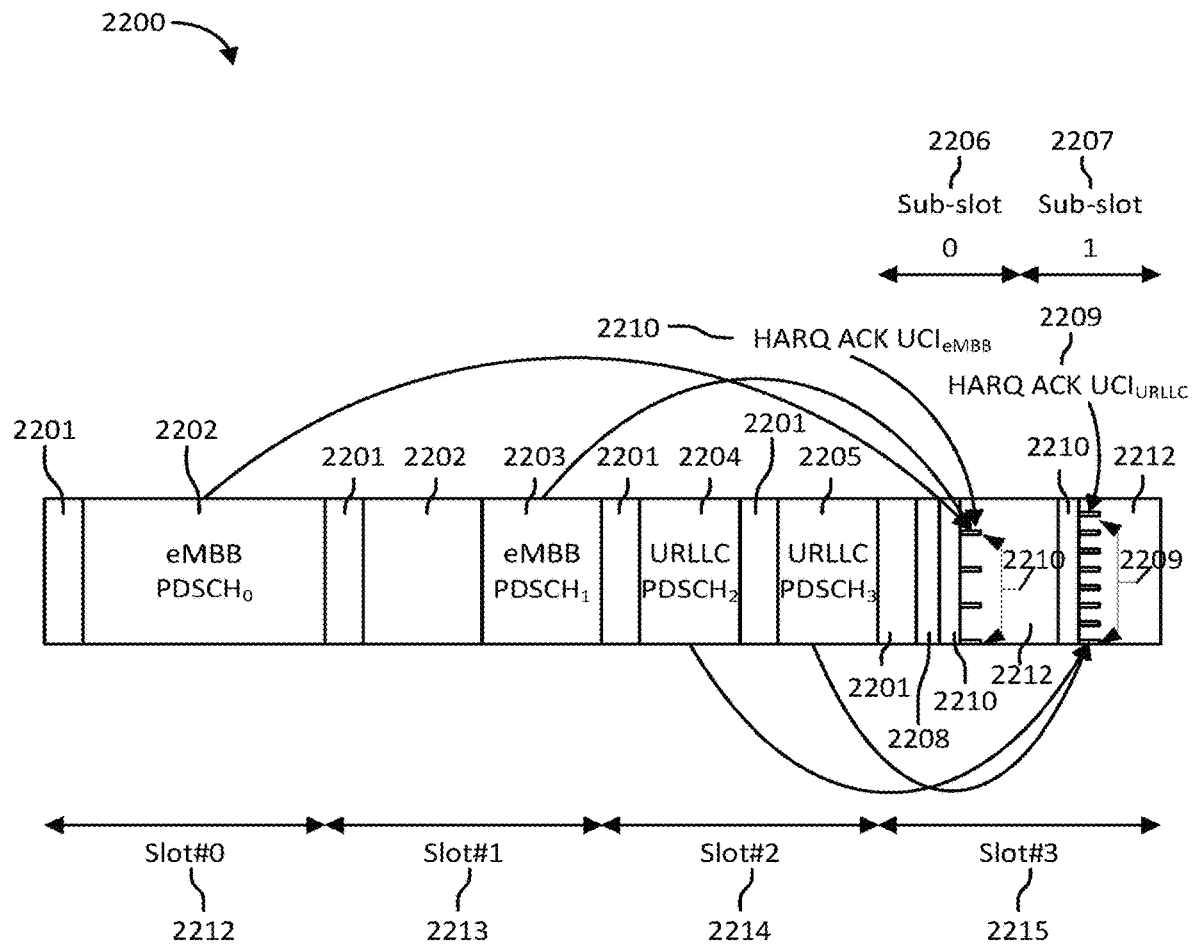
FIG. 22A is a diagram of $UCI_{URLLC}$ and $UCI_{eMBB}$ piggybacked to a PUSCH $UCI_{eMBB}$ precedes $UCI_{URLLC}$.
Figure 22B:
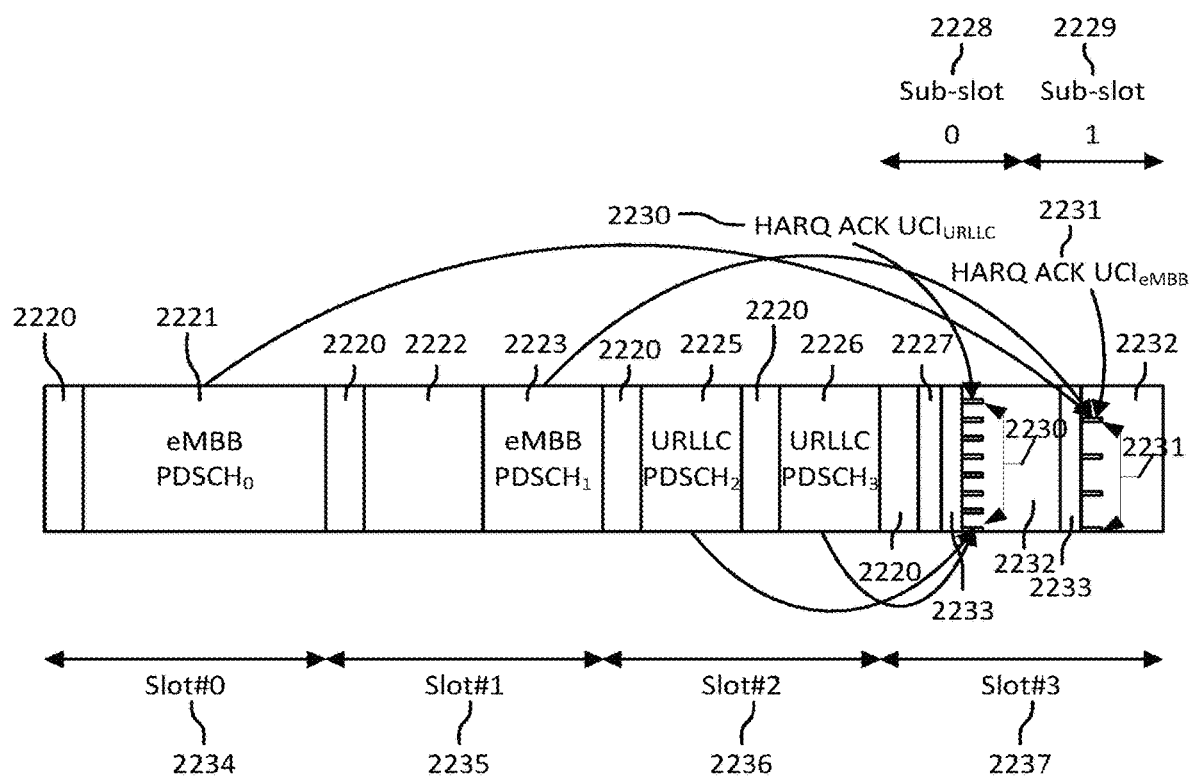
FIG. 22B is a diagram of $UCI_{URLLC}$ and $UCI_{eMBB}$ piggybacked to a PUSCH $UCI_{URLLC}$ precedes $UCI_{eMBB}$.

The UE may transmit both $UCI_{eMBB}$ and $UCI_{URLLC}$ in slot #3 in the methods shown in FIG. 22A-22B. FIG. 22A shows an example of $UCI_{URLLC}$ and $UCI_{eMBB}$ piggybacked to a PUSCH where the $UCI_{eMBB}$ precedes the $UCI_{URLLC}$ 2200. FIG. 22A shows PDCCH 2201, other UL signals 2202, DMRS 2210, HARQ ACK UCI 2260, and gap 2208. FIG. 22A also shows slot #0 2212, slot #1 2213, slot #2 2214, and slot #3 2215, which comprises sub-slot 0 2206 and sub- slot 1 2207. In some scenarios, it may be possible that the UE may have the HARQ-ACK to transmit for both URLLC and eMBB during a slot. In the example of FIG. 22A, the eMBB $PDSCH_0$ 2202 and $PDSCH_1$ 2203 may be scheduled in slots #0 2212 and slot #1 2213 and HARQ-ACK reporting of $UCI_{eMBB}$ 2210 may be scheduled for slot #3 2215. URLLC $PDSCH_2$ 2204 and URLLC $PDSCH_3$ 2205 may be scheduled for the UE in slot #3 2215, and HARQ-ACK reporting of $UCI_{URLLC}$ 2209 may also be scheduled for slot #3 2215. The UE has PUSCH 2212 scheduled in slot #3 2215, and therefore, it can piggyback UCI on PUSCH in slot #3 2215. The UE piggybacks $UCI_{eMBB}$ 2210 in the first sub-slot 2206 of the slot #3 2205 and $UCI_{URLLC}$ 2209 in the latter sub-slot 2207 of the slot #3 2205. This may be possible when the latency requirements for URLLC are such that transmission at the end of the slot #3 2215 are permissible.

FIG. 22B shows an example of $UCI_{URLLC}$ and $UCI_{eMBB}$ piggybacked to a PUSCH where the $UCI_{URLLC}$ precedes the $UCI_{eMBB}$. FIG. 22B shows PDCCH 2220, other UL signals 2222, DMRS 2233, and gap 2227. FIG. 22B also shows slot #0 2234, slot #1 2235, slot #2 2236, and slot #3 2237, which comprises sub-slot 0 2228 and sub-slot 1 2229. In some scenarios, it may be possible that the UE may have the HARQ-ACK to transmit for both URLLC and eMBB during a slot. In the example of FIG. 22B, the eMBB $PDSCH_0$ 2221 and $PDSCH_1$ 2223 may be scheduled in slots #0 2234 and slot #1 2235 and HARQ-ACK reporting of $UCI_{eMBB}$ 2231 may be scheduled for slot #3 2237. URLLC $PDSCH_2$ 2225 and URLLC $PDSCH_3$ 2226 may be scheduled for the UE in slot #3 2237, and HARQ-ACK reporting of $UCI_{URLLC}$ 2230 may also be scheduled for slot #3 2237. The UE has PUSCH 2232 scheduled in slot #3 2237, and therefore, it can piggyback UCI on PUSCH in slot #3 2232. In FIG. 22B, the UE piggybacks $UCI_{URLCC}$ 2230 in the first sub-slot 2228 of the slot #3 2237 and $UCI_{eMBB}$ 2231 in the latter sub-slot 2231 of the slot 2237. This allows URLLC UCI to be prioritized in time, provided the UE has the capability to process the URLLC grants within the given time line.

Figure 22C:
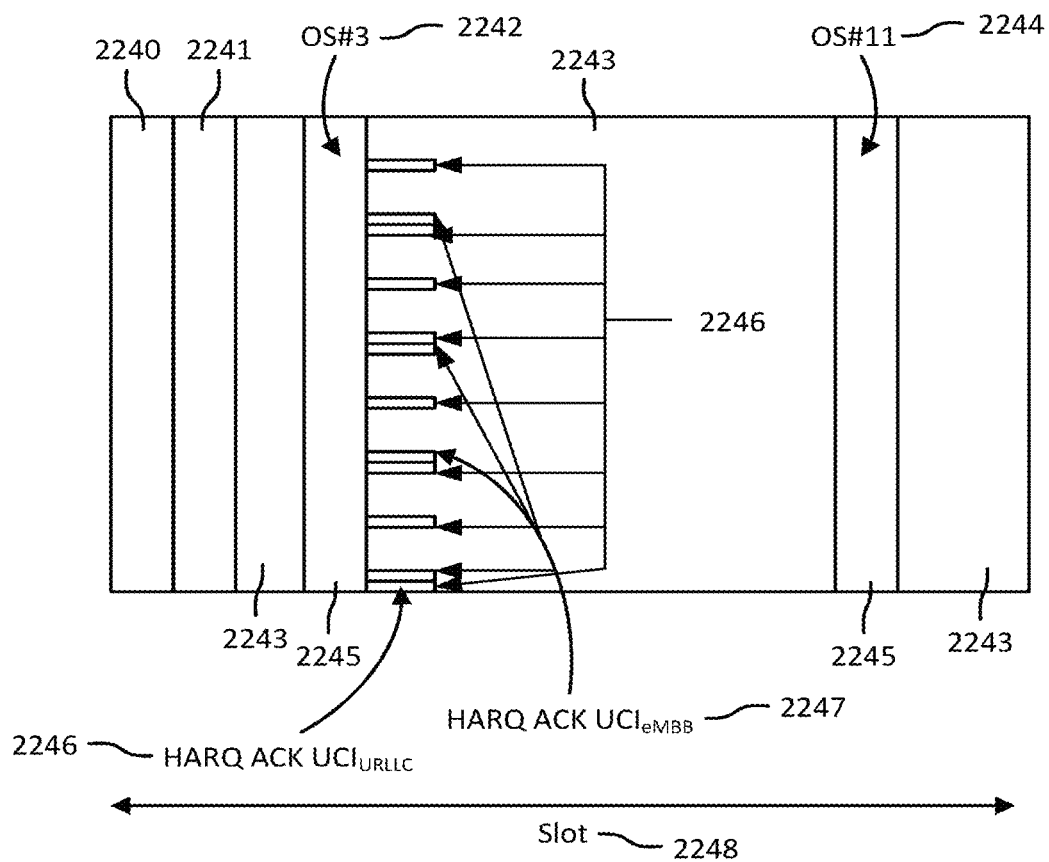
FIG. 22C is a diagram of $UCI_{URLLC}$ and $UCI_{eMBB}$ piggybacked to a PUSCH $UCI_{eMBB}$ and $UCI_{URLLC}$ mapped to same sub-slot of PUSCH.

FIG. 22C shows an example of $UCI_{URLLC}$ and $UCI_{eMBB}$ piggybacked to a PUSCH where the $UCI_{URLLC}$ and the $UCI_{eMBB}$ are mapped to the same sub-slot of the PUSCH. FIG. 22C shows a slot 2248 comprising the PDCCH 2240, gap 2241, the PUSCH 2243, OFDM symbol #3 2242, DMRS 2245, OFDM symbol #11 2244, HARQ ACK $UCI_{URLLC}$ 2246, and HARQ ACK $UCI_{eMBB}$ 2247. In FIG. 22C, both $UCI_{eMBB}$ 2247 and $UCI_{URLLC}$ 2246 may be mapped following the first DMRS 2245 of the PUSCH 2243. $UCI_{URLLC}$ 2246 may be mapped first to provide it the latency benefit and resources next to the DMRS 2245, followed by $UCI_{eMBB}$ 2247.

Figure 22D:
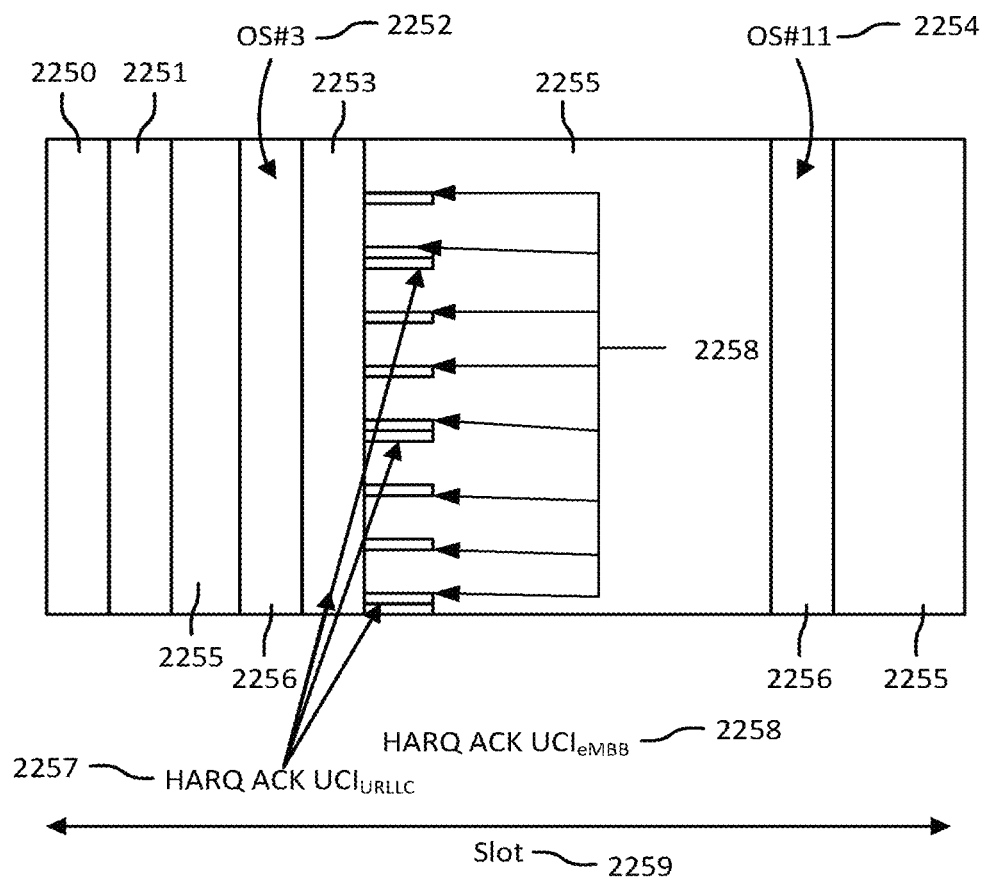
FIG. 22D is a diagram of $UCI_{URLLC}$ and $UCI_{eMBB}$ piggybacked to a PUSCH $UCI_{URLLC}$ resources mapped first followed by $UCI_{eMBB}$.

FIG. 22D shows an example of $UCI_{URLLC}$ and $UCI_{eMBB}$ piggybacked to a PUSCH where the $UCI_{URLLC}$ resources are mapped first followed by the $UCI_{eMBB}$. FIG. 22D shows a slot 2259 comprising the PDCCH 2250, gap 2251, the PUSCH 2255, OFDM symbol #3 2252, DMRS 2256, OFDM symbol #11 2254, HARQ ACK $UCI_{URLLC}$ 2257, and HARQ ACK $UCI_{eMBB}$ 2258. If $UCI_{URLLC}$ 2257 occupies all the resources on the symbols next to the DMRS 2256, $UCI_{eMBB}$ 2258 may be mapped in the next symbol as shown in the example of FIG. 22D.

Joint transmission of UCI of multiple priorities is described herein. The UE may support joint transmission of UCI of multiple priorities, i.e., the UE jointly encodes the HARQ ACK bits of multiple priorities and transmits it. When the UE transmits such UCI on PUSCH, it is proposed herein that the UE apply beta-offset values of the highest priority HARQ-ACK in the UCI. Considering that beta-offset value of higher priority UCI may provide more resources for UCI on PUSCH and therefore, higher reliability for higher priority, the HARQ ACK bits of lower priority may also receive higher reliability.

The UE may multiplex priorityLevel $p_{low}$'s $B_{low}$ HARQ-ACK bits with priorityLevel $p_{high}$'s $B_{high}$ HARQ-ACK bits if $B_{low} < B_{thresh}$, where $B_{thresh}$ may be a threshold which may be determined in one of the following ways:

(1) $B_{thresh}$ may be configured to the UE by the gNB through RRC signaling.
(2) $B_{thresh}$ may be a function of Blow and $B_{high}$. For example, if $B_{low}/B_{high} <= V$, where V may a constant or a parameter configured to the UE by the gNB.
(3) $B_{thresh}$ may be a function of a beta-offset value. For example, the beta-offset value may correspond to that of the highest priority level multiplexed in the UCI.
(4) $B_{thresh}$ may be a function of a beta-offset value, $B_{low}$ and $B_{high}$. For example, $B_{low}/B_{high} <= V1$ for beta-offset1, $B_{low}/B_{high} <= V2$ for beta-offset2, etc. Here V1, V2, etc. may be constants or parameters configured to the UE by the gNB.

UCI mapping with HARQ process repetition is described herein. For high priority PUSCH, the gNB may schedule repetitions. One UL grant may schedule two or more transmissions of the same HARQ process for reliability. The multiple transmissions of the HARQ process may be in one slot, or across a slot boundary in consecutive available slots. The repetitions, if in different slots, may have different starting symbols and/or durations. Each PUSCH transmission may be referred to as a PUSCH segment. Each PUSCH segment may have a different number of resources. UCI may be mapped on such repetitions or segments as shown in some examples in FIGS. 23A-23B where the label rep denotes repetition. Both URLLC and eMBB UCI may be piggybacked on PUSCH though the methods discussed below.

Figure 23A:
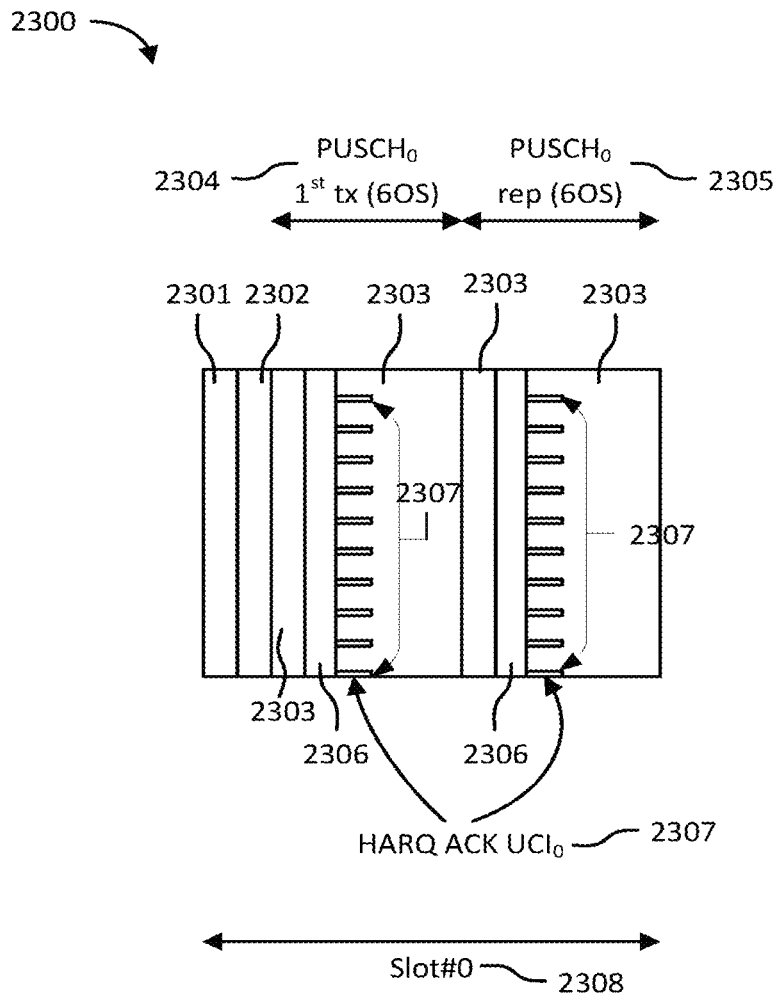
FIG. 23A is a diagram of Repetition of a HARQ process repetition of PUSCH in mini-slots, UCI split between the repetitions.

FIG. 23A shows an example of repetition of a HARQ process with the repetition of the PUSCH in mini-slots with the UCI split between repetitions 2300. FIG. 23A shows a slot 2308 comprising the PDCCH 2301, gap 2302, the PUSCH 2303, and DMRS 2306. In the example of FIG. 23A, PUSCH repetition occurs within a slot, and PUSCH$_0$ 2304 and 2305 may be transmitted twice in mini-slots and the UCI's modulated symbols 2307 (HARQ-ACK in this example) may be split into two and mapped on each of the mini-slots. In this case, the amount of rate matching or puncturing on a single repetition may be reduced thereby limiting the performance loss of a given PUSCH transmission.

Figure 23B:
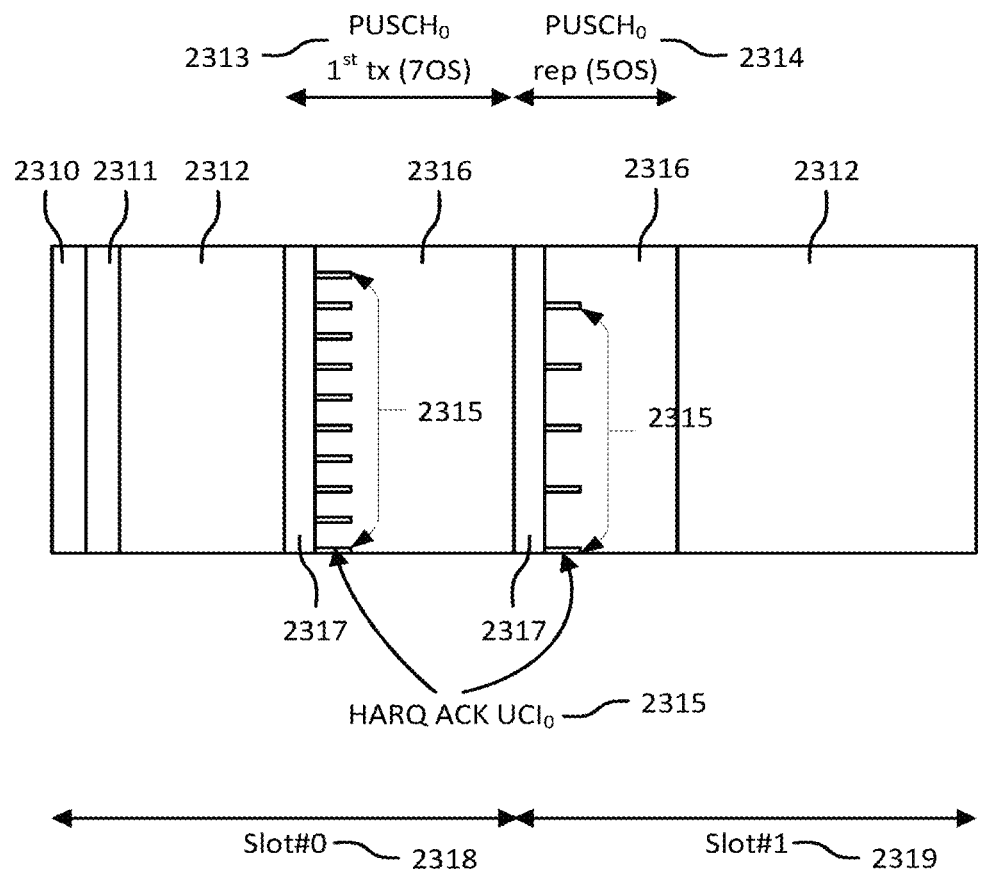
FIG. 23B is a diagram of Repetition of a HARQ process Multi-segment transmission across slot boundary, UCI split between the repetitions.

FIG. 23B shows an example of repetition of a HARQ process with multi-segment transmission across a slot boundary with the UCI split between repetitions. FIG. 23B shows slots #0 2318 and slot #1 2319 comprising the PDCCH 2310, gap 2311, other UL signals 2312, the PUSCH 2316, and DMRS 2317. In the example of FIG. 23B, repetition may occur across slots and each transmission within the repetition has a different duration and starting OFDM symbol. PUSCH$_0$ 2313 and 2314 may be transmitted twice across slots. The UCI 2315 may be split into two and mapped on each of the PUSCH segments.

Figure 23C:
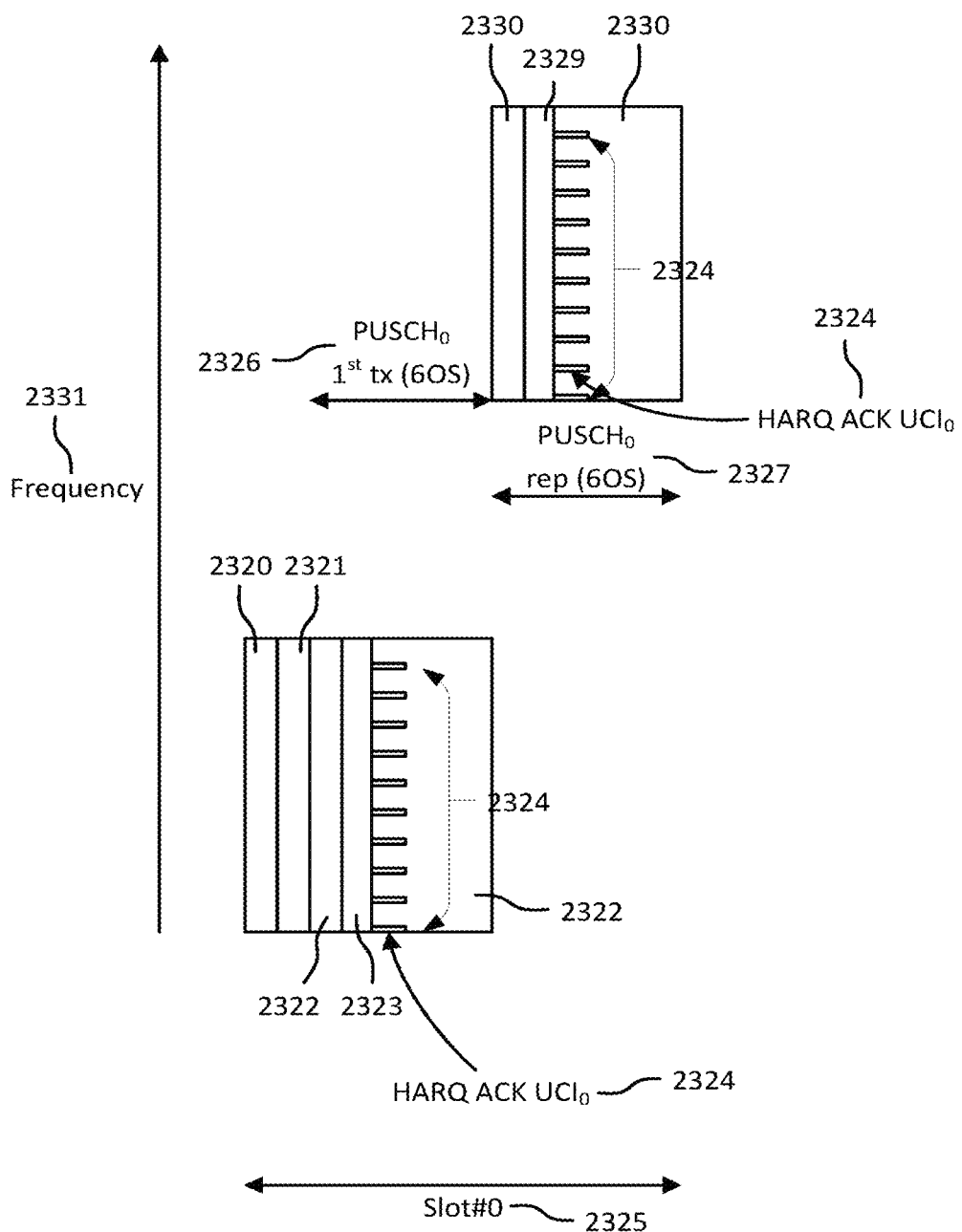
FIG. 23C is a diagram of Repetition of a HARQ process Mini-slots with frequency hopping, UCI split between the repetitions.

FIG. 23C shows an example of repetition of a HARQ process with mini-slots with frequency hopping with the UCI split between repetitions. FIG. 23C shows slot #0 2325 with respect to frequency 2331 comprising the PDCCH 2320, gap 2321, the PUSCH 2322 and 2330, and DMRS 2323 and 2329. In the example of FIG. 23C, PUSCH repetition 2326 and 2327 occurs within a slot 2325, but each repetition has a different frequency 2321 hop providing frequency diversity to the transmission. Here, again the UCI 2324 may be split into two parts and each part may be mapped on to one PUSCH transmission.

Figure 23D:
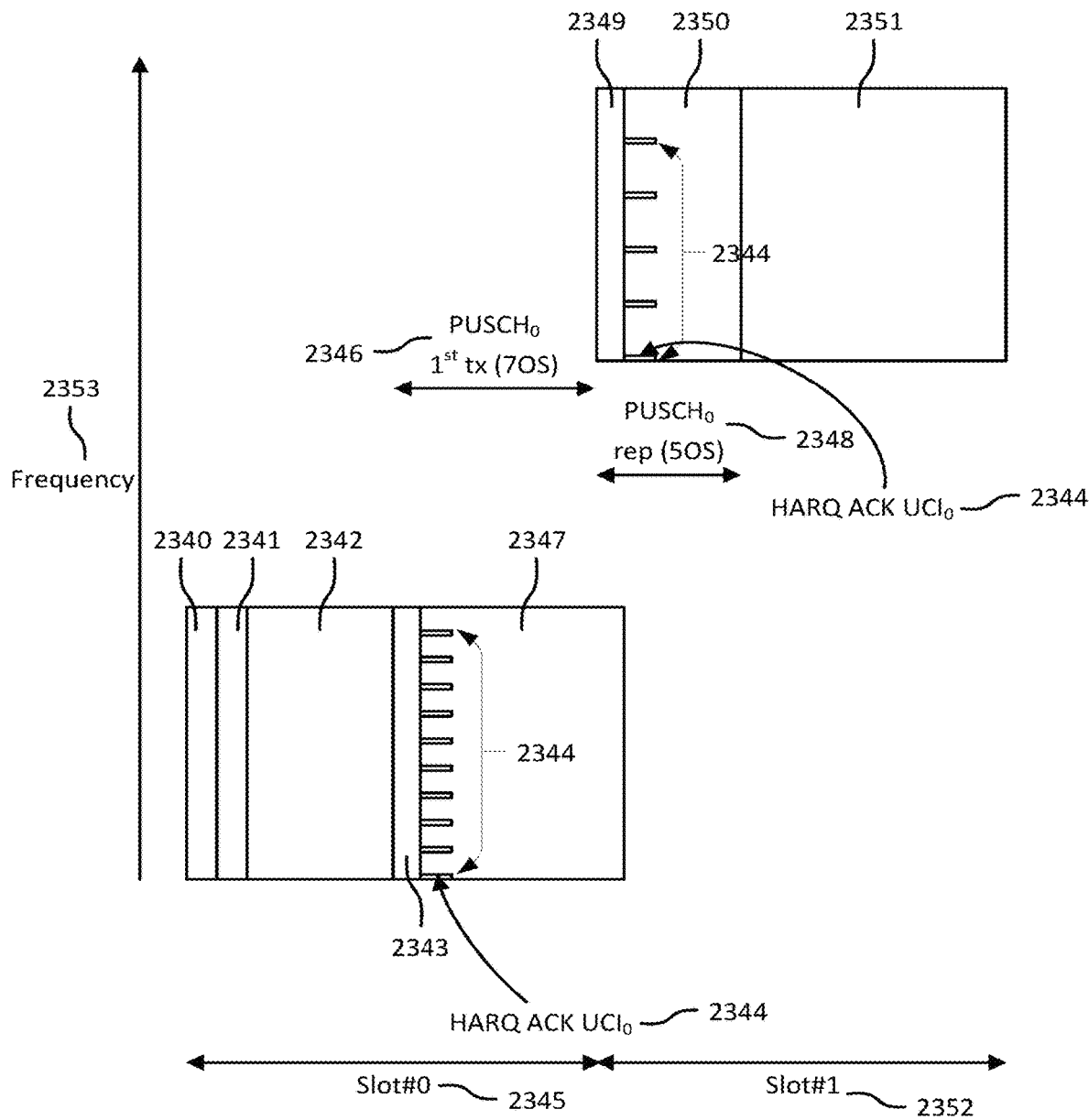
FIG. 23D is a diagram of Repetition of a HARQ process Multi-segment transmissions with hopping, UCI split between the repetitions.

FIG. 23D shows an example of repetition of a HARQ process with multi-segment transmissions with hopping with the UCI split between repetitions. FIG. 23D shows slot #0 2345 and slot #1 2352 with respect to frequency 2353 the PDCCH 2340, gap 2341, other UL signals 2342, the PUSCH 2347 and 2350, and DMRS 2342 and 2349. In the example of FIG. 23D, PUSCH segments occur across slots and each transmission within the PUSCH repetition 2346 and 2348 has a different duration and starting OFDM symbol. Here, again the UCI 2344 may be split into two parts and each part may be mapped to each PUSCH segment so that it can benefit from frequency 2353 diversity.

The splitting of the encoded and modulated symbols of the UCI between the mini-slots of the repetition or between the segments of the repetition may be done in the following ways.

The modulated UCI symbols may be generated jointly across the repetitions and split according to the amount of resources in each of the repetitions. This ensures that the performance loss from rate matching does not impact the PUSCH performance for the repetition that has fewer resources. For example, in FIG. 23B and FIG. 23D, the first PUSCH segment may be 7 OS while the second segment may be only 5 OS has fewer resources than the first. In this case, the UCI may be mapped to each segment in proportion to the resources in that segment.

A single DCI may schedule the repetitions/segments. It may indicate the beta-offset to use for UCI mapping spanning the set of R PUSCH repetitions/segments. The beta-offset may be applied to the total number of available resources across R PUSCH repetitions or R segments. The number of coded modulation symbols per layer for HARQ-ACK transmission, denoted as $Q'_{ACK}$, may be determined based on the total number of PUSCH resources available across the R repetitions/segments as shown in Equation 1.

Equation 1

$$Q'_{ACK} = \min\left\{ \left[ \frac{(O_{ACK} + L_{ACK}) \cdot \beta^{PUSCH}_{offset} \cdot \sum_{rep=0}^{R-1} \sum_{l=0}^{N^{PUSCH}_{symball,rep}-1} M^{UCI}_{sc,rep}(l)}{\sum_{r=0}^{C_{UL-SCH}-1} K_r} \right], \right.$$

$$\left. \left[ \alpha \cdot \left( \sum_{rep=0}^{R-1} \sum_{l=l_{0,rep}}^{N^{PUSCH}_{symball,rep}-1} M^{UCI}_{sc,rep}(l) \right) \right] \right\}$$

Here, $O_{ACK}$ may be the number of HARQ-ACK bits;

if $O_{ACK} \geq 360$, $L_{ACK}=11$; otherwise $L_{ACK}$ may be the number of CRC bits for HARQ-ACK $\beta^{PUSCH}_{offset} = \beta^{HARQ-ACK}_{offset,m}$;

$C_{UL-SCH}$ may be the number of code blocks for UL-SCH of the PUSCH transmission;

if the DCI format scheduling the PUSCH transmission includes a CBGTI field indicating that the UE may not transmit the $_r$-th code block, $K_r=0$; otherwise, $K_r$ may be the $_r$-th code block size for UL-SCH of the PUSCH transmission;

$M^{PUSCH}_{sc,rep}$ may be the scheduled bandwidth of the PUSCH transmission, expressed as a number of subcarriers;

$M^{PT-RS}_{sc,rep}(l)$ may be the number of subcarriers in OFDM symbol l that carries PTRS, in the PUSCH transmission;

$M^{UCI}_{sc,rep}(l)$ may be the number of resource elements that can be used for transmission of UCI in OFDM symbol l, for l=0, 1, 2, . . . , $N^{PUSCH}_{symb,all,rep}-1$, in the PUSCH transmission of repetition rep and $N^{PUSCH}_{symbol,rep}$ may be the total number of OFDM symbols of the PUSCH, including all OFDM symbols used for DMRS;

for any OFDM symbol that carries DMRS of the PUSCH, $M^{UCI}_{sc,rep}(l)=0$;

for any OFDM symbol that does not carry DMRS of the PUSCH, $M^{UCI}_{sc,rep}(l)=M^{PUSCH}_{sc,rep}-M^{PT-RS}_{sc,rep}(l)$;

α may be configured by higher layer parameter scaling;

$l_{0,rep}$ may be the symbol index of the first OFDM symbol that does not carry DMRS of the PUSCH, after the first DMRS symbol(s), in the PUSCH transmission of repletion rep.

α may be configured differently for each priority level. For URLLC, a larger α value may give more resources for UCI.

The $Q'_{ACK}$ symbols may be split between the repetitions based on the PUSCH resources in each repetition.

$Q'_{ACK,rep}$ may be the number of modulation symbols mapped to PUSCH repetition 'rep' and may be given by Equation 2.

$$Q'_{ACK,rep} = \left\lceil \frac{Q'_{ACK} \cdot \sum_{l=0}^{N^{PUSCH}_{symball,rep}-1} M^{UCI}_{sc,rep}(l)}{\sum_{rep=0}^{R-1} \sum_{l=0}^{N^{PUSCH}_{symball,rep}-1} M^{UCI}_{sc,rep}(l)} \right\rceil \text{ or } Q'_{ACK,rep} = \left\lfloor \frac{Q'_{ACK} \cdot \sum_{l=0}^{N^{PUSCH}_{symball,rep}-1} M^{UCI}_{sc,rep}(l)}{\sum_{rep=0}^{R-1} \sum_{l=0}^{N^{PUSCH}_{symball,rep}-1} M^{UCI}_{sc,rep}(l)} \right\rfloor$$

Equation 2 depending on the repetition/segment number.

FIG. 24A shows an example procedure for splitting modulated UCI symbols between repetitions with jointly generated UCi symbols across repetitions, mapping in proportion to the PUSCH resource in each segment 2400. The UCI may be encoded (step 2401), and then using the beta-offset 2403, rate matching is performed based on the total PUSCH resources in the set of R repeated PUSCH resources (step 2402). The UCI is modulated (step 2404), and the UCI may then be split into the R UCI segments, wherein UCI-segment$_{rep}$ length is proportional to the number of resources in PUSCH$_{rep}$ (step 2405). The UCI-segment$_{rep}$ may then be mapped to PUSCH$_{rep}$ (step 2406).

The $Q'_{ACK}$ UCI modulated symbols may be generated as described in Equation 1 and split nearly equally between the PUSCH repetitions or segments as shown in Equation 3. Examples in FIG. 23A-23D show equal splitting of the UCI resources between the two repetitions.

$$Q'_{ACK,rep} = \left\lceil \frac{Q'_{ACK}}{rep} \right\rceil \text{ or } Q'_{ACK,rep} = \left\lfloor \frac{Q'_{ACK}}{rep} \right\rfloor$$

Equation 3 depending on the value of rep.

FIG. 24B shows an example procedure for splitting modulated UCI symbols between repetitions with jointly generated UCi symbols across repetitions, mapping nearly equally between PUSCH segments. The UCI may be encoded (step 2411), and then using the beta-offset 2413, rate matching is performed based on the total PUSCH resources in the set of R repeated PUSCH resources (step 2412). The UCI is modulated (step 2414), and the UCI may then be split nearly equally into the R UCI segments (step 2415). The UCI-segment$_{rep}$ may then be mapped to PUSCH$_{rep}$ (step 2416).

The $Q'_{ACK}$ modulated symbols of UCI may be generated separately for each PUSCH repetition and mapped to each repetition/segment based on the beta-offset value for that PUSCH as shown in Equation 4. Here, $\beta^{PUSCH}_{offset,m\ rep}$ may be the beta-offset value for each repetition of PUSCH.

FIG. 24C shows an example procedure for splitting modulated UCI symbols with separately generated UCI modulated symbols for each repetition. The UCI may be encoded (step 2421), and then using the beta-offset 2423, rate matching is performed for the to PUSCH$_{rep}$ to the PUSCH$_{rep}$ (step 2422). The UCI is modulated (step 2423), and the UCI-segment$_{rep}$ may then be mapped to PUSCH$_{rep}$ (step 2424).

$$Q'_{ACK,rep} = \min\left\{ \left\lceil \frac{(O_{ACK} + L_{ACK}) \cdot \beta^{PUSCH}_{offset,m,rep} \cdot \sum_{l=0}^{N^{PUSCH}_{symball}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symball}-1} M^{UCI}_{sc}(l) \right\rceil \right\}$$

Equation 4

As another alternative, the UCI may not be split between repetitions but mapped fully on to one of the PUSCH repetitions. The repetition that may carry the UCI may be the one that overlaps with the PUCCH corresponding to that UCI. The start of the PUCCH may coincide with the start of the PUSCH repetition or the end of the PUCCH may coincide with the end of the PUSCH repetition. In this case, the UE maps the UCI to that particular repetition of PUSCH. FIGS. 25A-25D provide examples where a PUCCH transmission (which may be dropped by piggybacking the UCI on PUSCH) is shown along with the PUSCH.

FIG. 25A shows an example of UCI transmissions over PUSCH repetitions with mapping UCI to the PUSCH with minimal latency 2500. FIG. 25A shows slot #0 2509 comprising mini-slots 2506 and 2507, which comprise the PDCCH 2501, gap 2502, DMRS 2504, PUSCH 2503, and HARQ ACK UCI$_0$ 2505. In the example of FIG. 25A, the starting location of a 12-OS PUCCH 2508 may be aligned with that of the first transmission of a PUSCH 2503. As a result, the UCI 2505 may be piggybacked on that mini-slot 2506 and the PUCCH 2508 may be dropped.

FIG. 25B shows an example of UCI transmissions over PUSCH repetitions with mapping UCI to the PUSCH, which aligns with the end of a segment of the PUSCH. FIG. 25B shows slot #0 2518 comprising mini-slots 2515 and 2516, which comprise the PDCCH 2510, gap 2511, DMRS 2513, PUSCH 2512, and HARQ ACK UCI, 2514. In the example of FIG. 25B, the end of an 8-OS PUCCH 2517 may be aligned with the end of second segment of a PUSCH 2512. As a result, the UCI 2514 may be piggybacked on the second segment and the PUCCH 2517 may be dropped.

Figure 25D:
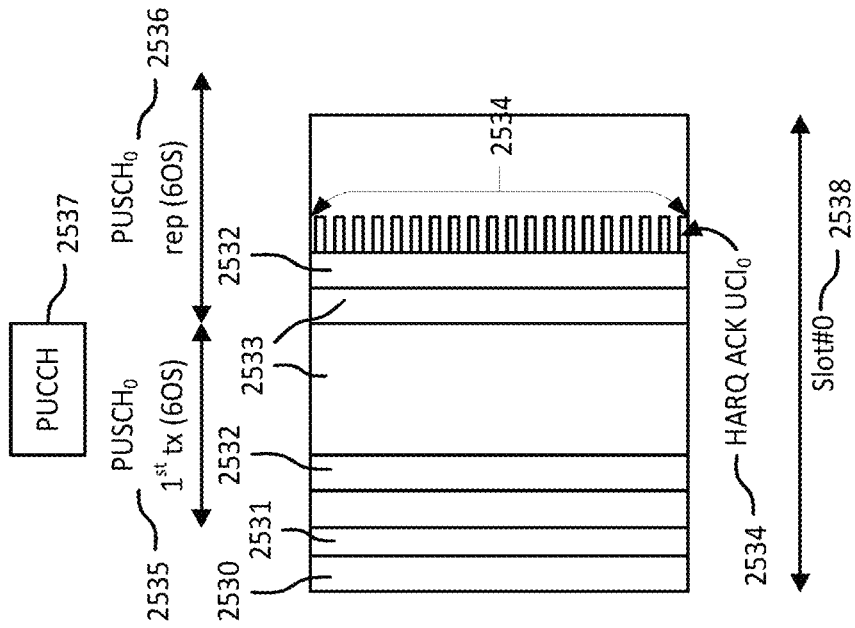
FIG. 25D is another diagram of UCI transmission over PUSCH repetitions.
Figure 25C:
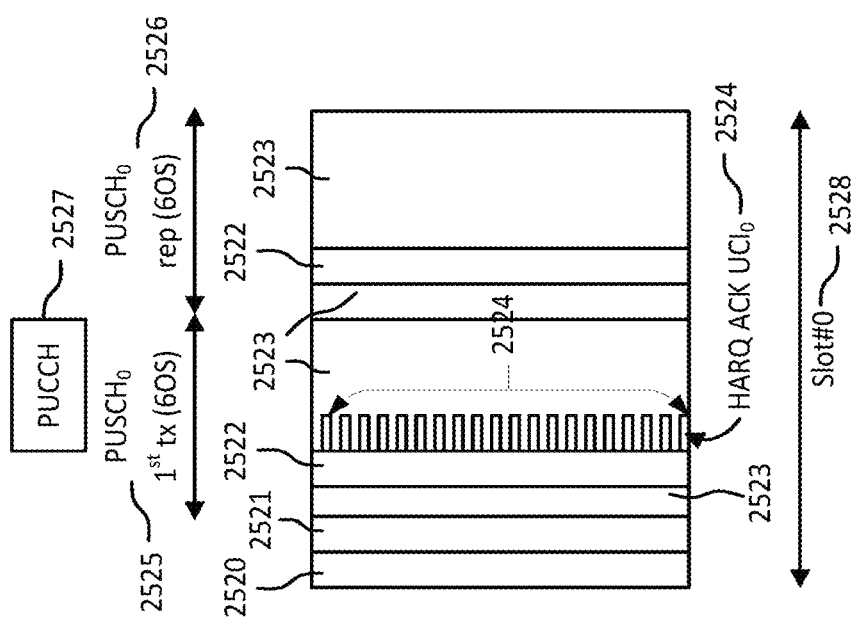
FIG. 25C is a diagram of UCI transmission over PUSCH repetitions with mapping UCI to first PUSCH overlapping with PUCCH (D) Map UCI to PUSCH according to UEs capability.

FIG. 25C shows an example of UCI transmissions over PUSCH repetitions with mapping UCI to the first PUSCH, which aligns with the end of a segment of the PUSCH. FIG. 25C shows slot #0 2528 comprising mini-slots 2525 and 2526, which comprise the PDCCH 2520, gap 2521, DMRS 2522, PUSCH 2523, and HARQ ACK UCI, 2524. In the example of FIG. 25C, the starting location of a 4-OS PUCCH lags the start of the first mini-slot of a PUSCH 2525. But if the UE has the capability to map it to the first mini-slot 2525, it does so and the PUCCH 2527 may be dropped.

FIG. 25D shows an example of UCI transmissions over PUSCH repetitions with mapping UCI to the PUSCH according to the UE's capabilities. FIG. 25D shows slot #0 2538 comprising mini-slots 2535 and 2536, which comprise the PDCCH 2530, gap 2531, DMRS 2532, PUSCH 2533, and HARQ ACK UCI, 2534. In the example of FIG. 25D, the PUCCH 2537 may be similar to that in FIG. 25C. However, the UE does not have the capability to map it to the first mini-slot 2535 due to latency in processing the piggybacked UCI 2534. Therefore, it maps it on the second mini-slot 2536 of the repetition and the PUCCH 2537 may be dropped.

Figure 26:
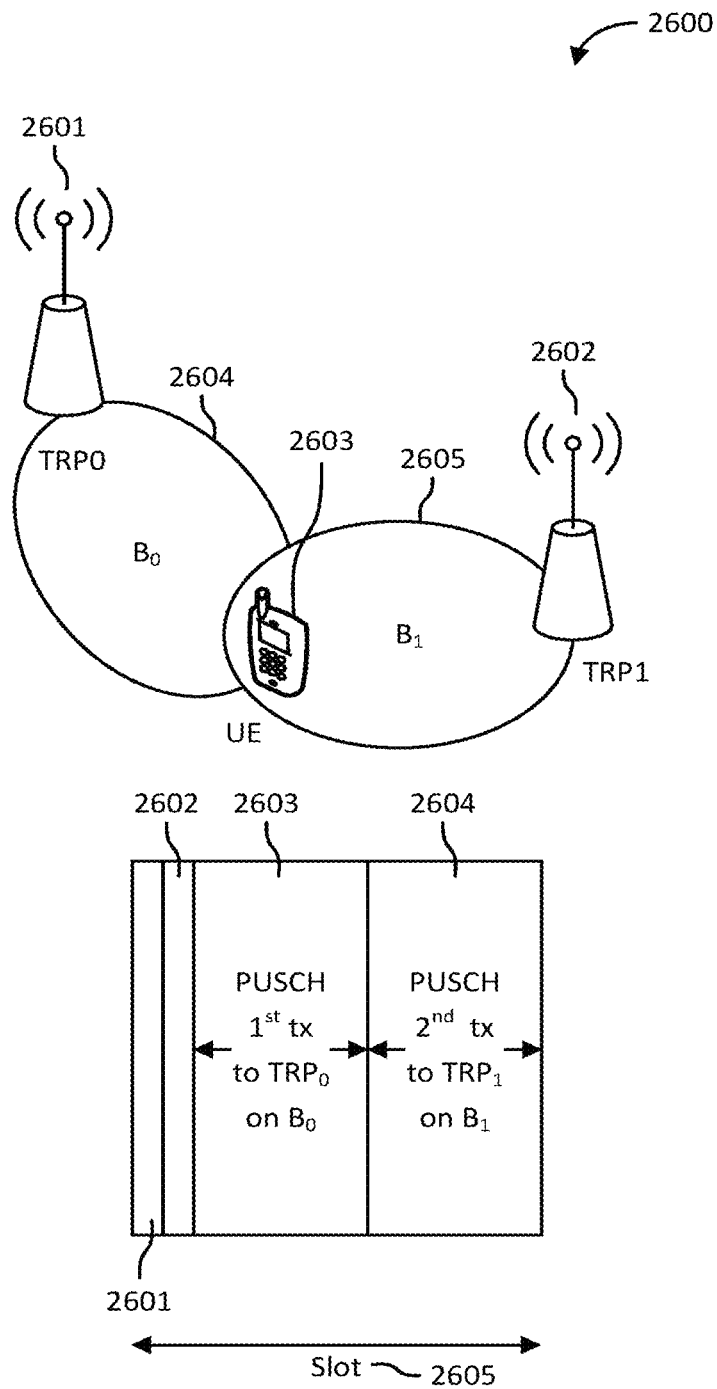
FIG. 26 is a diagram of Transmission of PUSCH repetitions to different TRPs.

FIG. 26 shows an example of transmission of PUSCH repetitions to different TRPs 2600. FIG. 26 shows slot 2605 comprising mini-slots 2603 and 2604, which comprise the PDCCH 2601 and gap 2602. In case of multi-TRP operation, a UE 2603 may transmit each repetition or segment to different TRPs, i.e., the spatial direction or correspondence of the beam with a DL RS or QCL with UL RS being different for each repetition/segment. In the example of FIG. 26, the PUSCH may be repeated in mini-slots 2603 and 2604 within a slot 2605. The transmissions to $TRP_0$ 2601 and $TRP_1$ 2602 may be transmitted on beams $B_0$ 2604 and $B_1$ 2605, respectively.

Different PUSCH repetitions may also hop in frequency as shown in FIG. 23C. Similarly, different segments of a PUSCH transmission such as those in FIG. 23B and FIG. 23D may also be transmitted to different TRPs.

One solution for piggybacking UCI on multi-TRP PUSCH is discussed below. The UCI for each TRP may be mapped to different repetitions/segments so that the targeted TRP receives its relevant UCI. The codebook for HARQ ACK for each UCI may contain only the HARQ ACK bits for PDSCH from that TRP. For instance, a first UCI includes ACK/NACK bit(s) of a first PDSCH. The first UCI and a first PUSCH repetition/segment share a spatial relation. In one example, an RS in a TCI state of the first PDSCH (or a TCI state of a set of layers of a first PDSCH) may be the same as the RS in the spatial relation of the first PUSCH repetition/segment. For example, a UE may derive an RS for the spatial relation of a first PUSCH repetition/segment from an RS in a TCI state of the first PDSCH.

Alternatively or additionally, the UE may be configured to report UCI for T TRPs on a transmission in a particular spatial direction. In this case, the codebook of the UCI may contain only the HARQ-ACK bits or CSI reports meant for those T TRPs.

Figure 27A:
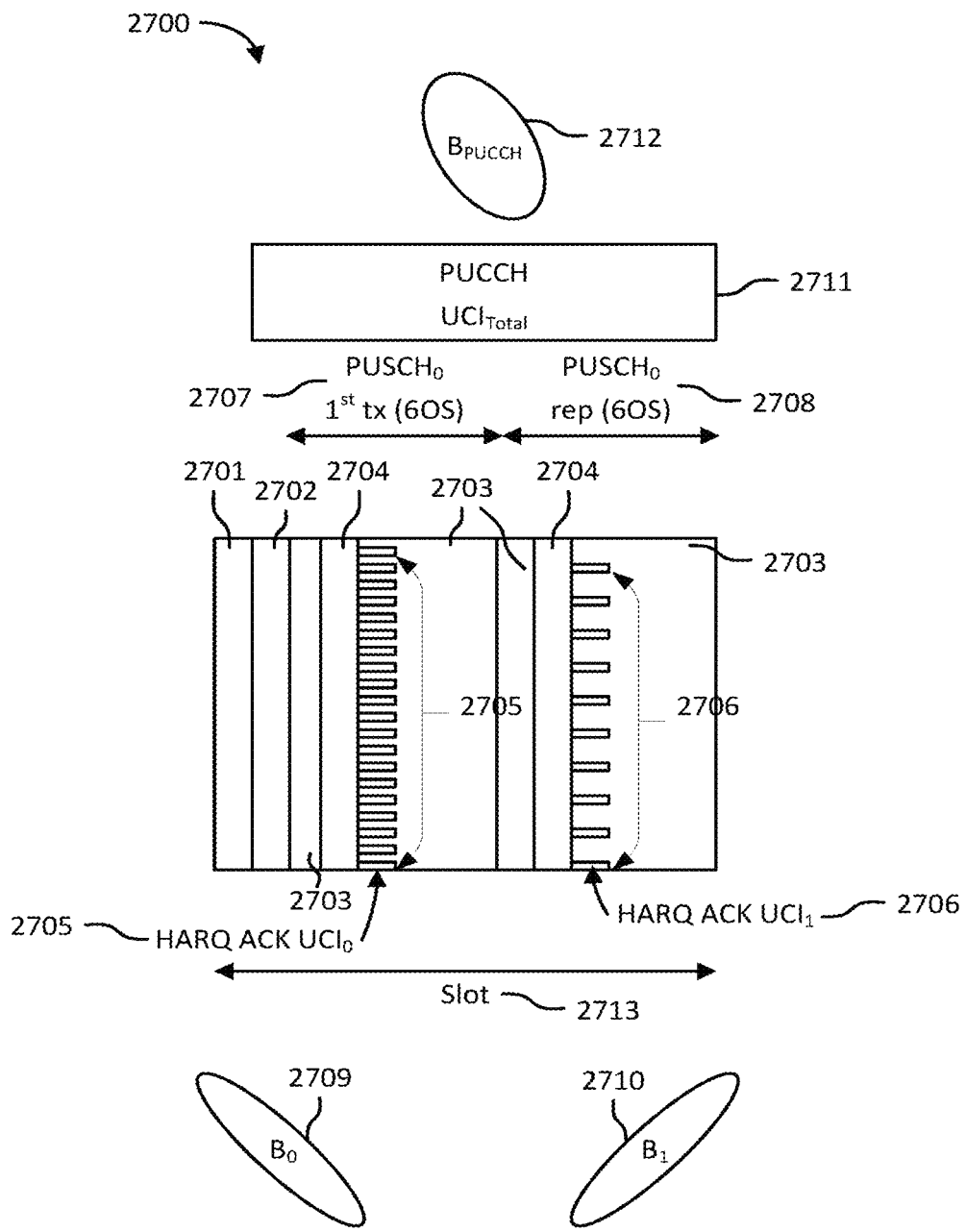
FIG. 27A is a diagram of UCI mapping to PUSCH repetitions targeted for different TRPs Separate HARQ-ACK codebook for each TRP.

FIG. 27A shows an example of mapping UCI to PUSCH repetitions targeted for different TRPs with a separate HARQ-ACK codebook for each TRP 2700. FIG. 27A shows slot 2713 comprising mini-slots 2707 and 2708, which comprise the PDCCH 2701, gap 2702, DMRS 2704, PUSCH 2703, HARQ ACK UCI, 2705 (transmitted in beam $B_0$ 2709), and HARQ ACK $UCI_1$ 2706 (transmitted in beam $B_1$ 2710). In the example of FIG. 27A, if the UCI transmission were to occur on a PUCCH 2711 (transmitted in beam $B_{PUCCH}$ 2711), the codebook for HARQ-ACK may include the bits for both $TRP_0$ and $TRP_1$ which may be denoted as $UCI_{Total}$. But when the PUSCH 2703 is available for transmission to each of $TRP_0$ and $TRP_1$, the UE may split the payload of $UCI_{Total}$ into $UCI_0$ 2705 and $UCI_1$ 2706, where $UCI_0$ 2705 may contain the HARQ-ACK bits for $TRP_0$ and $UCI_1$ 2706 may contain the bits for $TRP_1$. $UCI_0$ 2705 and $UCI_1$ 2706 may be encoded, modulated and mapped to respective repetitions or segments. In other words, a different codebook may be used to transmit piggybacked UCI to each TRP.

In some cases, both PDSCH repetition (from multiple TRPs) and PUSCH repetitions (to multiple TRPs) may be used. RRC may configure a beam/spatial association between certain PDSCH repetitions and certain PUSCH repetitions such that the HARQ-ACK is piggybacked on a corresponding PUSCH. If a UE has beam correspondence, the spatial-relation of the different PUSCH repetitions can be configured as, or alternatively or additionally derived from, the RS(s) in the TCI-states of the PDSCH repetitions. In one example, a sequential association between PDSCH repetitions and PUSCH repetitions, such that a 1st PUSCH repetition spatial relation may be equal to the TCI state of the 1st PDSCH repetition, etc. For example, there may be a sequential association between PDSCH repetitions and PUSCH repetitions, such that an RS in the 1st PUSCH repetition spatial relation is equal to an RS in the TCI state of the 1st PDSCH repetition, e.g. the RS in the TCI state with QCL type D (QCL with respect to spatial Rx parameter), etc.

Figure 27B:
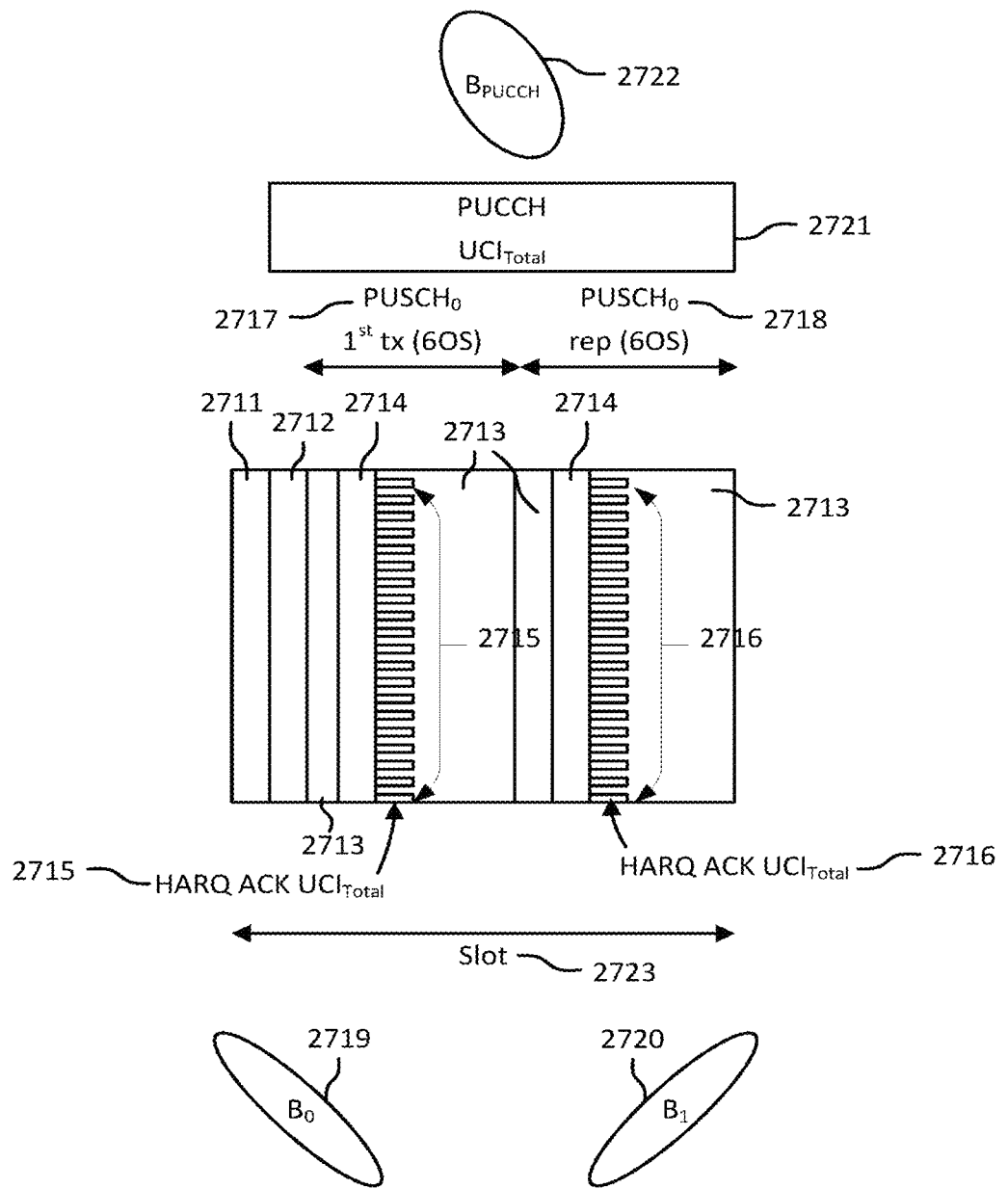
FIG. 27B is a diagram of UCI mapping to PUSCH repetitions targeted for different TRPs UCI with common codebook is repeated for each TRP.

FIG. 27B shows an example of mapping UCI to PUSCH repetitions targeted for different TRPs with UCI with common codebook is repeated for each TRP. FIG. 27B shows slot 2723 comprising mini-slots 2717 and 2718, which comprise the PDCCH 2711, gap 2712, DMRS 2714, PUSCH 2713, HARQ ACK UCI, 2715 (transmitted in beam $B_0$ 2719), and HARQ ACK UCI 2716 (transmitted in beam $B_1$ 2720). In the example of FIG. 27B, another solution for piggybacking UCI on multi-TRP PUSCH is shown in which $UCI_{Total}$ in PUCCH 2721 (transmitted in beam $B_{PUCCH}$ 2722) may be encoded, modulated, and repeated in each of the PUSCH mini-slots 2717 and 2718. So each TRP may receive the entire UCI out of which it may pick only relevant HARQ-ACK bits. Alternatively or additionally, the TRPs may communicate through backhaul and enable the combining of the $UCI_{Total}$ from multiple TRPs for increased robustness.

The beta-offsets may be configured differently for different PUSCH repetitions to enable different levels of protection for each beam (which may depend on the channel conditions in different spatial directions). Accordingly, the number of resources may be different for the UCI on each PUSCH within the repletion set.

The PUSCH repetition for CG or dynamic grant is described herein. When the CG PUSCH is used with multi-TRP operation or a dynamic grant providing PUSCH resources to multiple TRPs for a given HARQ process is used, the following configurations may be considered.

Figure 28A:
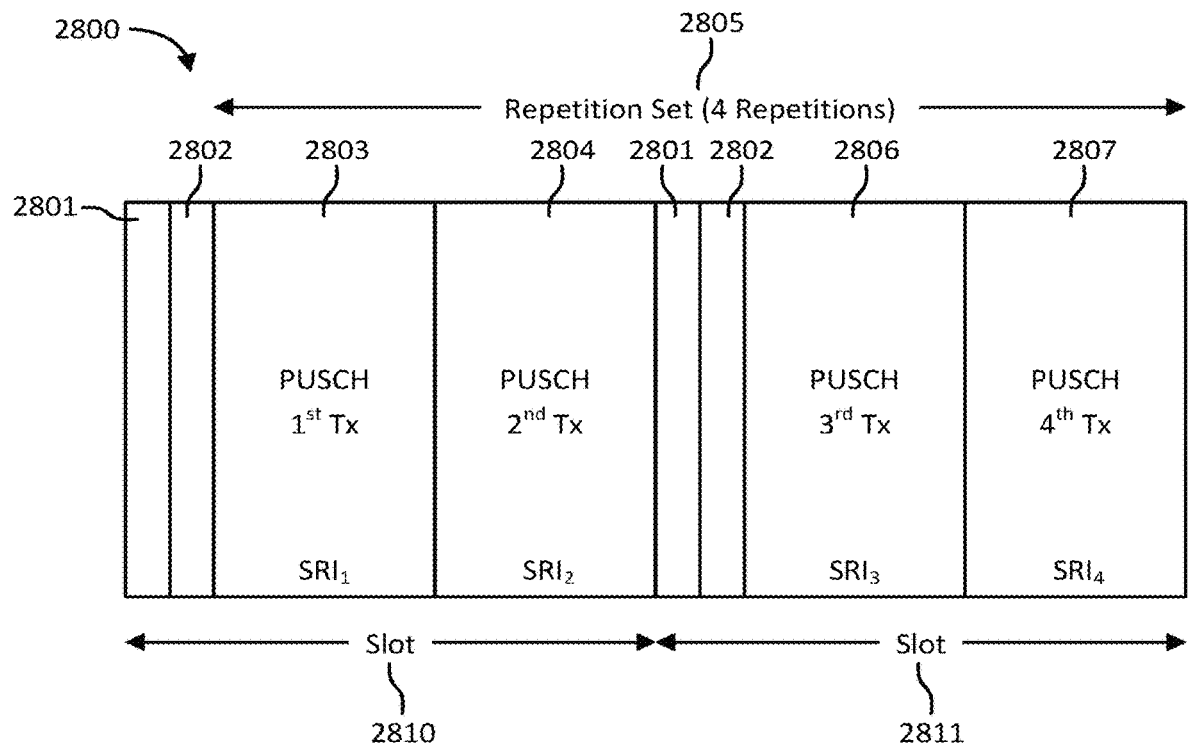
FIG. 28A is a diagram of PUSCH Repetition with SRI cycling.

FIG. 28A shows an example of PUSCH repetition with scheduling request indicator (SRI) cycling 2800. FIG. 28A shows slots 2810 and 2811 comprising the PDCCH 2801, gap 2802, $SRI_1$ 2803, $SRI_2$ 2804, $SRI_3$ 2806, and $SRI_4$ 2807. In the example of FIG. 28A, each repetition within the set of repetitions 2805 within a CG or dynamic grant may correspond to a different SRI (e.g., SRI 2803, SRI 2804, SRI 2806, and SRI 2807), TCI state and/or precoder, so that the UE may transmit each PUSCH within the repetition in a different spatial direction (to a different TRP). Thus, the UE may cycle through different SRIs, TCI states, and/or precoders to complete the repetition set. In the example of FIG. 28A, the SRIs (e.g., SRI 2803, SRI 2804, SRI 2806, and SRI 2807), TCI states, and/or precoders for the repetition may be configured for the UE through the RRC (at least for Type-1 CG, and possibly for Type-2 CG). Alternatively, the SRIs, TCI states, and/or precoders for the repetitions may be signaled through activation DCI for Type-2 CG.

Figure 28B:
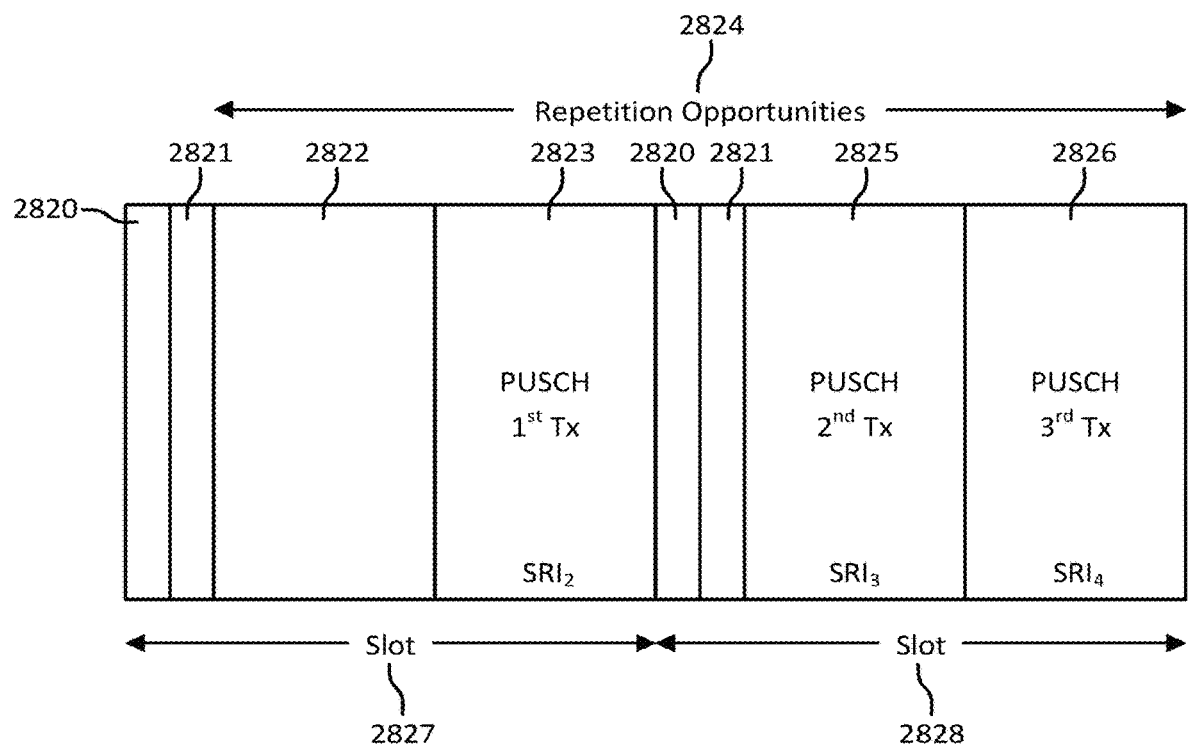
FIG. 28B is a diagram of PUSCH Repetition with the SRI fixed to the time resource.

FIG. 28B shows an example of PUSCH repetition with SRIs fixed to the time resource. FIG. 28B shows slots 2827 and 2828 comprising the PDCCH 2820, gap 2821, other signals 2822, SRI$_2$ 2823, SRI$_3$ 2825, and SRI$_4$ 2826. In the example of FIG. 28B, the SRI, TCI state and/or precoder for a transmission in a repetition set 2824 may be tied to the time resource of the grant. So, depending on when a UE begins its CG transmission, it may begin with a different SRI, TCI state and/or precoder as shown in the example in FIG. 28B. Here, the UE may be able to transmit the PUSCH only 3 times within the repetition set 2824 and the 1st transmission begins in the latter half of the slot. But the SRI may be tied to the time of transmission (which may be in terms of a symbol or mini-slot or slot); so, the 1st transmission uses SRI$_2$ 2823.

Figure 28C:
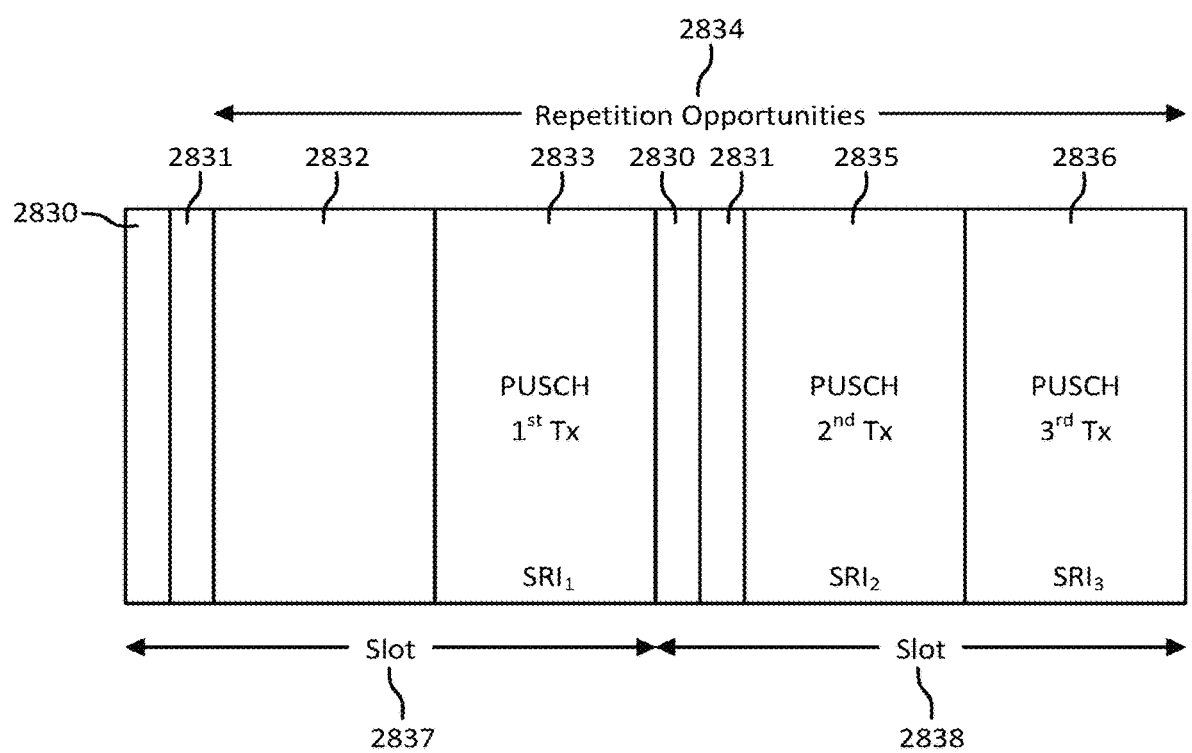
FIG. 28C is a diagram of PUSCH Repetition with the SRI as a function of the repetition instance.

FIG. 28C shows an example of PUSCH repetition with SRI as a function of the repetition analysis. FIG. 28C shows slots 2837 and 2838 comprising the PDCCH 2830, gap 2831, other signals 2832, SRI$_1$ 2833, SRI$_2$ 2835, and SRI$_3$ 2836. In the example of FIG. 28C, alternatively, the SRI, TCI state, and/or precoder may be tied to the r$^{th}$ transmission within the repetition set 2834. In the example of FIG. 28C, the UE is able to transmit the PUSCH only 3 times within the repetition set, and the 1st transmission begins in the latter half of the slot. The 1st transmission may use SRI$_1$ 2833. The TRPs may monitor for multiple possibilities of SRIs, TCI states, and/or precoders in each repetition opportunity.

In some cases, the number of repetitions may be greater than the number of different configured/indicated SRIs, TCI states, and/or precoders. In some cases, the UE may first transmit one repetition with each different SRI, TCI state, and/or precoder after which it may wrap around and uses the first SRI, TCI state, and/or precoder, such that subsequent repetitions may use different SRIs, TCI states, and/or precoder. Alternatively, the UE may use the same SRI, TCI state, and/or precoder on some subsequent repetitions, such that all SRIs, TCI states and/or precoders may be used during the repetitions, but without wrap around.

As an alternative to transmitting PUSCH HARQ process repetitions with different SRI, TCI state, and/or precoder in a CG, the UE may have multiple CGs configured to it, where each CG corresponds to one SRI, TCI state, and/or precoder. So, repetitions within a CG use the same SRI, TCI state, and/or precoder. For Type-1 and possibly Type-2 CGs, multiple CGs may be configured through RRC, where each CG has a different SRI, TCI state, and/or precoder. All parameters except the SRI, TCI state, and/or precoder may be the same for these CGs. Accordingly, the DMRS may be the same for these CGs. The spatial direction may distinguish one CG from another. Alternatively, the DMRS may be different for each of the CGs. For Type-2 CG, the SRI, TCI state and/or precoder may be indicated through the activation DCI. Such CGs may be combined into a single configured-grant-group that may be commonly configured through RRC (thereby reducing configuration overhead) or activated and deactivated jointly with a single DCI.

It may be beneficial to support early termination of a PUSCH transmission within a repetition set. This may apply for both configured and dynamically scheduled grants. If a TRP correctly decodes a PUSCH, the UE need not transmit the remaining repetitions of that PUSCH to other TRPs. Accordingly, a TRP may provide an early termination indication (ETI) to a UE to terminate the remaining repetitions. This may allow better spectrum utilization, less interference, and a reduction of power consumption for the UE.

Figure 29A:
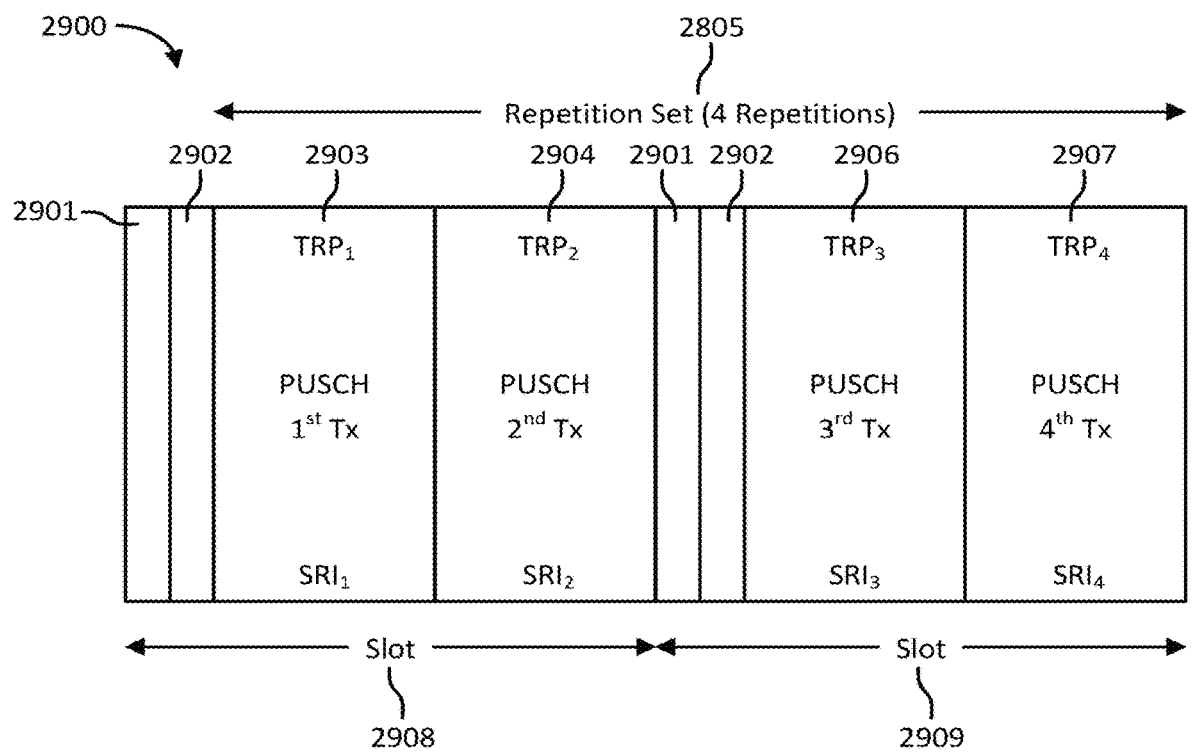
FIG. 29A is a diagram of PUSCH repetition in multi-TRP scenario with repetition set of 4 for a PUSCH HARQ ID.

FIGS. 29A-29H provide examples of PUSCH repetitions in multi-TRP scenarios 2900. FIG. 29A shows slots 2908 and 2909 comprising the PDCCH 2901, gap 2902, SRI$_1$ directed to TRP$_1$ 2903, SRI$_2$ directed to TRP$_2$ 2904, SRI$_3$ directed to TRP$_3$ 2906, and SRI$_4$ directed to TRP$_4$ 2907. In the example of FIG. 29A, the UE has a PUSCH repetition set of 4 2905 where each PUSCH transmission is directed to 4 TRPs: TRP$_1$, TRP$_2$, TRP$_3$, and TRP$_4$.

Figure 29B:
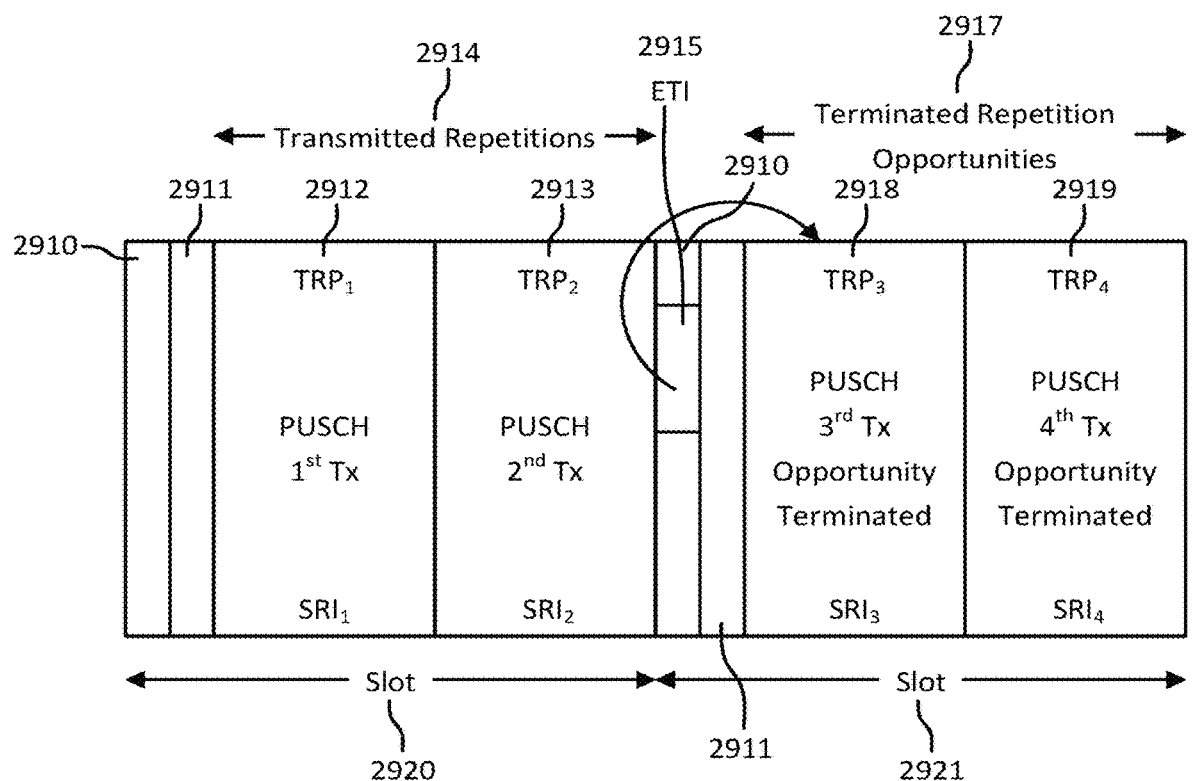
FIG. 29B is a diagram of PUSCH repetition in multi-TRP scenario with ETI indication to terminate transmissions 3 and 4.

FIG. 29B shows slots 2920 and 2921 comprising the PDCCH 2910, gap 2911, SRI$_1$ directed to TRP$_1$ 2912, SRI$_2$ directed to TRP$_2$ 2913, terminated SRI$_3$ directed to TRP$_3$ 2918, and terminated SRI$_4$ directed to TRP$_4$ 2919. In the example of FIG. 29B, TRP$_1$ successfully decodes the 1st transmission of PUSCH 2903 in the repetition set 2914 and sends an ETI 2915 through a DCI to the UE on the PDCCH in the next slot in the repetition set. The UE identifies the early termination and cancels the 3rd and 4th transmissions in the repetition set 2917 (terminated SRI$_3$ directed to TRP$_3$ 2918 and terminated SRI$_4$ directed to TRP$_4$ 2919).

Figure 29C:
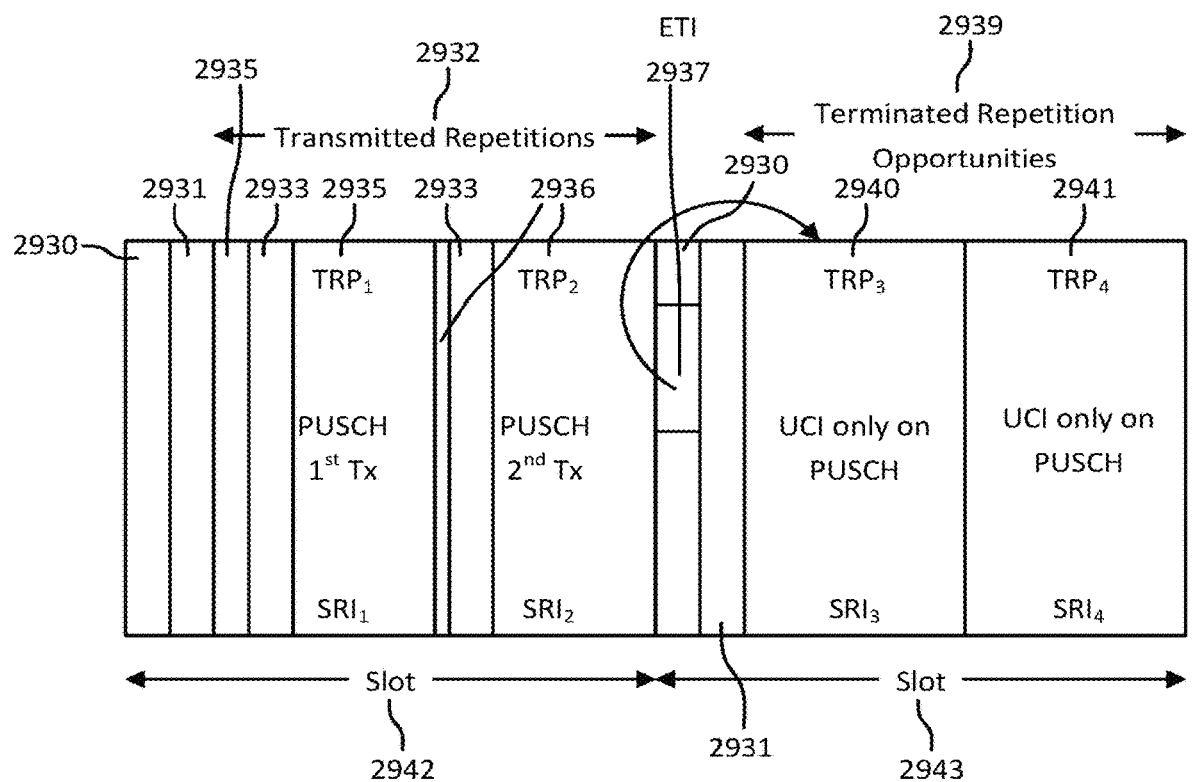
FIG. 29C is a diagram of PUSCH repetition in multi-TRP scenario with UCI-only-on-PUSCH upon termination of PUSCH repetitions.

FIG. 29C shows slots 2942 and 2943 comprising the PDCCH 2930, gap 2931, SRI$_1$ directed to TRP$_1$ 2935, SRI$_2$ directed to TRP$_2$ 2936, terminated SRI$_3$ directed to TRP$_3$ 2940, terminated SRI$_4$ directed to TRP$_4$ 2941, and UCI 2933. In the example of FIG. 29C, if the UE has to transmit the UCI 2933 concurrently with the PUSCH transmissions repetition set 2932, the UCI 2933 may be piggybacked on the PUSCH. If early termination cancels 2937 (indicated by ETI 2937 to the UE on the PDCCH) some of the PUSCH transmissions, the UCI 2933 may be transmitted on those PUSCH resources (terminated SRI$_3$ directed to TRP$_3$ 2940 and terminated SRI$_4$ directed to TRP$_4$ 2941) in the form of UCI only on PUSCH during the repetition set 2939.

Figure 29D:
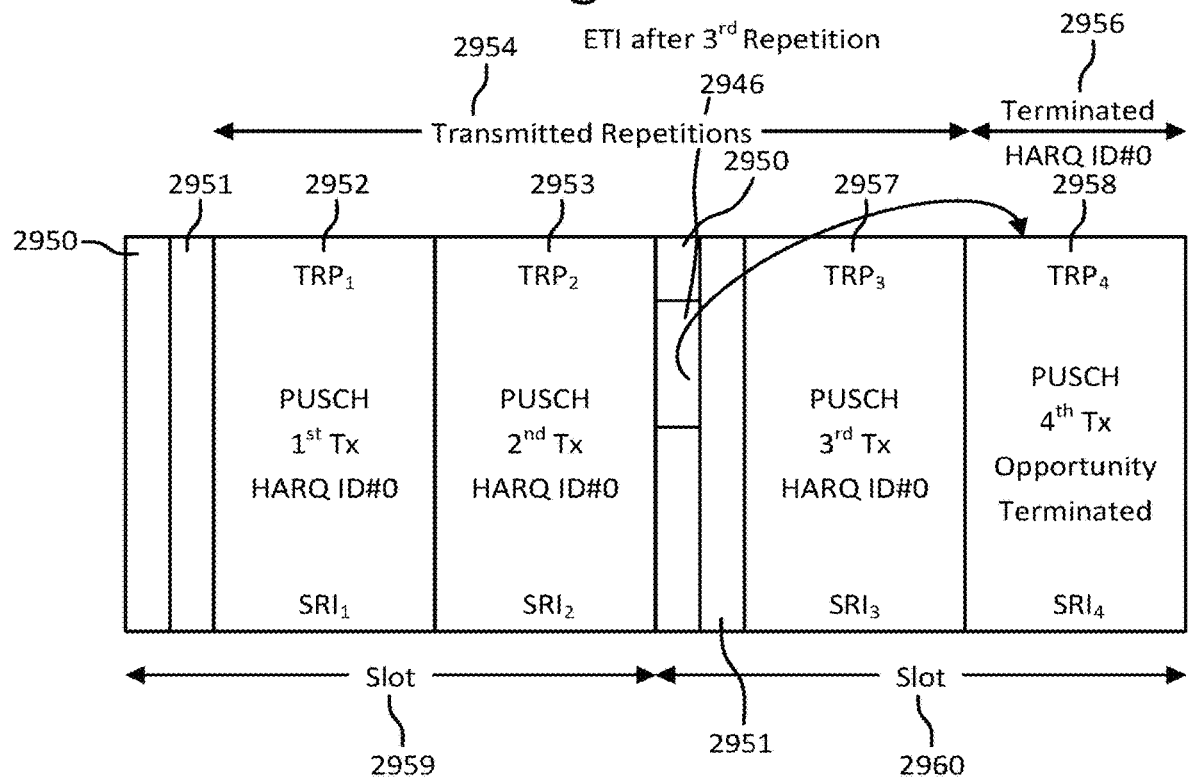
FIG. 29D is a diagram of PUSCH repetition in multi-TRP scenario with delayed termination of repetition.

FIG. 29D shows slots 2959 and 2960 comprising the PDCCH 2950, gap 2951, SRI$_1$ directed to TRP$_1$ 2952, SRI$_2$ directed to TRP$_2$ 2953, SRI$_3$ directed to TRP$_3$ 2957, and terminated SRI$_4$ directed to TRP$_4$ 2958. In the example of FIG. 29D, if the ETI 2946 DCI is from a TRP to the UE on the PDCCH, which has received at least one transmission from a repetition set 2954, the DCI may be in the form of an overriding grant for another HARQ process. The UE may identify the ID of the TRP transmitting the ETI DCI and may determine 2946 that the new grant may be prioritized over the previous one, i.e., the previous grant is terminated early. Here the HARQ ID #0 is terminated 2956 because the UE receives an overlapping grant for HARQ ID #1. Thus, an overriding grant implicitly terminates a repetition.

The DCI carrying the ETI may be transmitted in the following ways:
(1) The ETI DCI may be UE-specific and may be scrambled with C-RNTI or CS-RNTI of the UE.
(2) The ETI DCI is group-common and may be scrambled with the ETI-RNTI. The UE may be configured with ETI-RNTI through RRC signaling. The DCI may indicate the UE-IDs that may apply the early termination. Alternatively, the ETI DCI may occur in the form of a group-common UL pre-emption indication PDCCH where the UE is preempted from transmitting on certain resources.
(3) The UE may identify the ETI implicitly from the ACK-DCI which provides an ACK to the UE on one or more HARQ processed.

The ETI DCI may provide the following information to the UE either implicitly or explicitly:
(1) The PUSCH HARQ process to be terminated: this may be implicit if the ACK-DCI indicates an ACK for a given HARQ process.
(2) A number of repetitions after which the PUSCH repetitions may be terminated. As non-ideal backhaul conditions may exist, the early termination may not occur immediately after receiving the ETI but may be desired after K repetitions are completed. This time allows the TRPs to communicate the ACK status for that HARQ process.

Figure 29E:
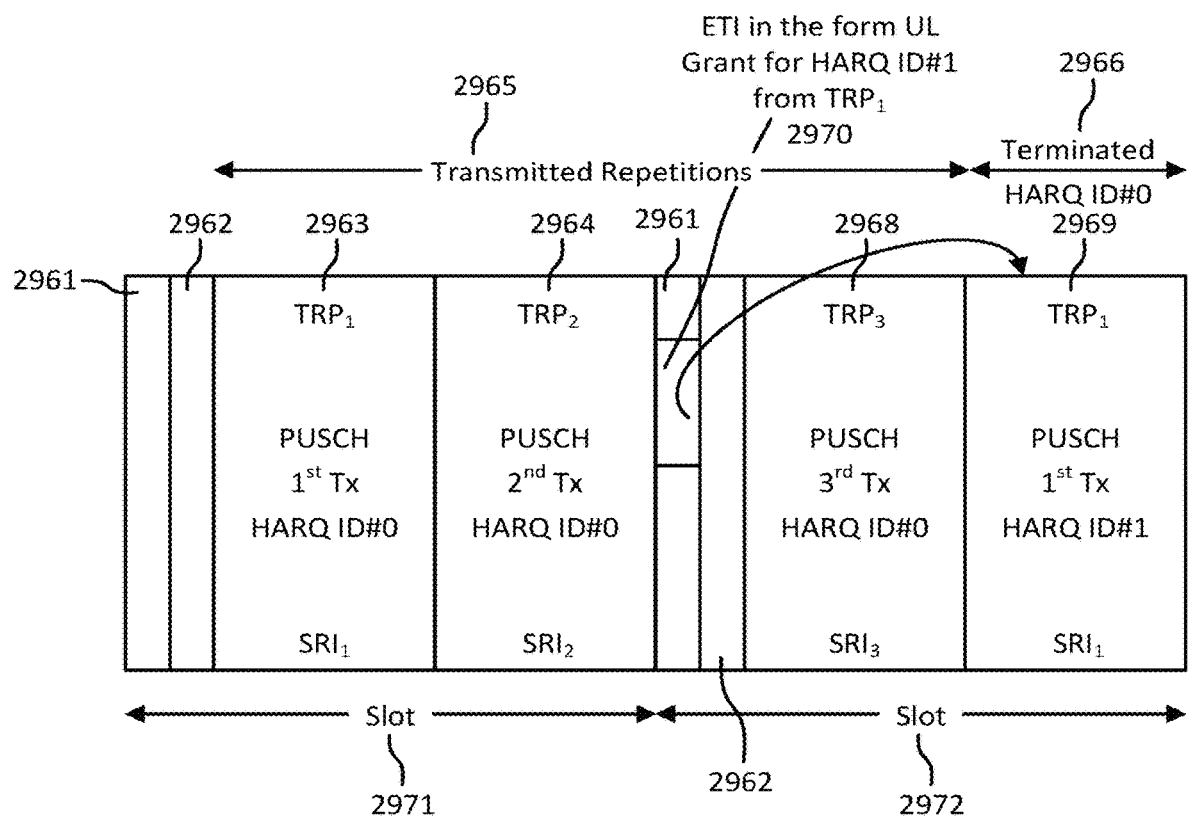
FIG. 29E is a diagram of PUSCH repetition in multi-TRP scenario with overriding grant indicating early termination.

FIG. 29E shows slots 2971 and 2972 comprising the PDCCH 2961, gap 2962, SRI$_1$ directed to TRP$_1$ 2963, SRI$_2$ directed to TRP$_2$ 2964, SRI$_3$ directed to TRP$_3$ 2968, and terminated SRI$_4$ directed to TRP$_4$ 2969. In the example of FIG. 29E, if the ETI 2970 is received to the UE on the PDCCH at least one transmission from a repetition set 2965, the UE may identify the ID of the TRP transmitting the ETI and may determine 2970 that the HARQ ID #0 is to be terminated 2966.

Figure 29F:
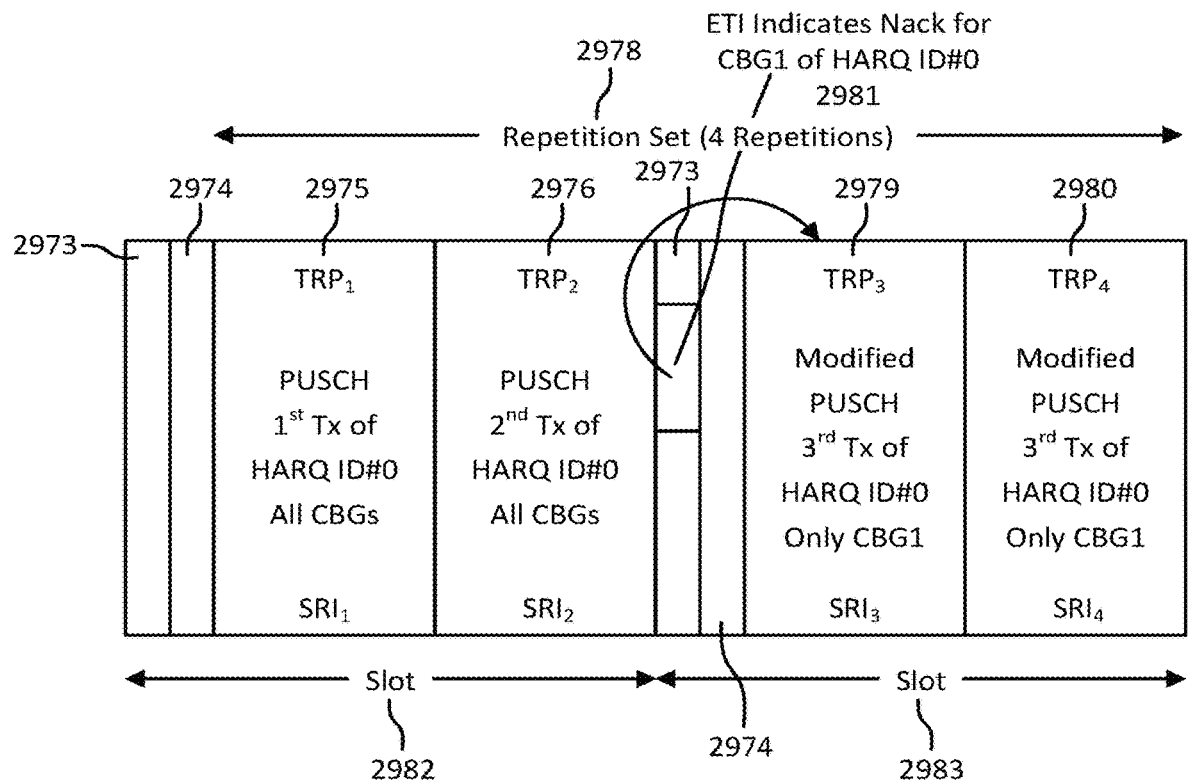
FIG. 29F is a diagram of PUSCH repetition in multi-TRP scenario with transmission of NACed CBGs in latter repetitions.

FIG. 29F shows slots 2982 and 2983 comprising the PDCCH 2973, gap 2974, SRI$_1$ directed to TRP$_1$ 2975, SRI$_2$ directed to TRP$_2$ 2976, modified SRI$_3$ directed to TRP$_3$ 2979, and modified SRI$_4$ directed to TRP$_4$ 2980. In the example of FIG. 29F, the ETI 2981 DCI to the UE on the PDCCH may modify the PUSCH grant for the remainder of the repetitions 2978. For example, if TRP$_1$ receives a 1st PUSCH transmission of HARQ ID #0 and observes that CBG1 is a NACK while other CBGs are an ACK, the ETI 2981 DCI may indicate that UE needs to transmit only CBG1 from the r$^{th}$ repetition. FIG. 29F shows that the 3rd and 4th transmissions are modified 2979 and 2980 by the UE 2981 upon reception of the ETI 2981 indicating NACK on CBG1.

Figure 29G:
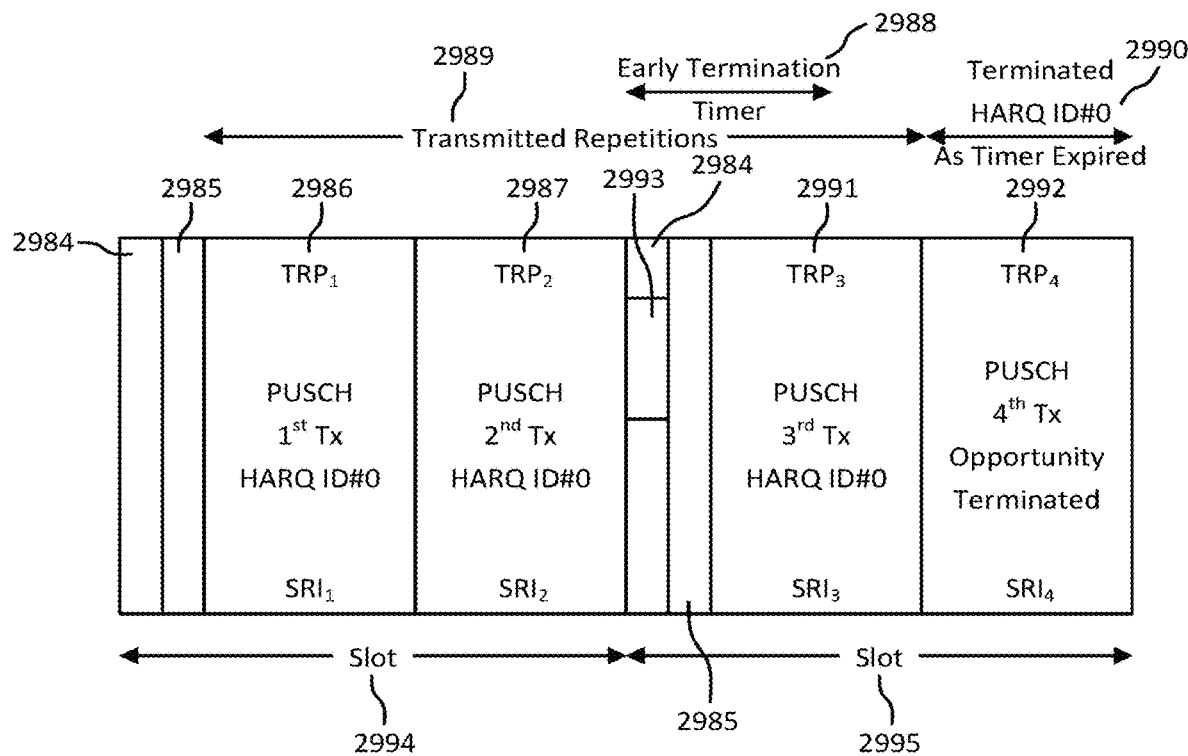
FIG. 29G is a diagram of PUSCH repetition in multi-TRP scenario with Early TerminationTimer based termination of PUSCH repetition.

FIG. 29G shows slots 2994 and 2995 comprising the PDCCH 2984, gap 2985, SRI directed to TRP$_1$ 2986, SRI$_2$ directed to TRP$_2$ 2987, SRI$_3$ directed to TRP$_3$ 2991, and terminated SRI$_4$ directed to TRP$_4$ 2992. In the example of FIG. 29G, timer based early termination is shown with terminated SRI$_4$ directed to TRP$_4$ 2992. Alternatively, in order to support early termination, the gNB may configure the UE with a timer, EarlyTerminationTimer. When the UE receives the ETI 2933 on the PDCCH, it sets the timer 2988 and decrements it or resets the timer. When the timer 2988 resets or expires, the UE terminates the remaining PUSCH repetitions 2989 for the corresponding HARQ ID. The timer value may be configured for the UE through RRC signaling and determined by the gNB based on the latency of the backhaul between the TRPs and the UE capability to react to changes due to ETI.

Selective termination is described herein. The ETI may indicate selective termination, i.e., certain repetitions may be dropped (e.g., if TRP1 and TRP3 have ideal backhaul). When TRP1 successfully decodes the 1st transmission, it sends an ETI to terminate only the 3rd transmission to TRP3. TRP1 communicates the status of ACK for the PUSCH to TRP3 within minimal latency.

Figure 29H:
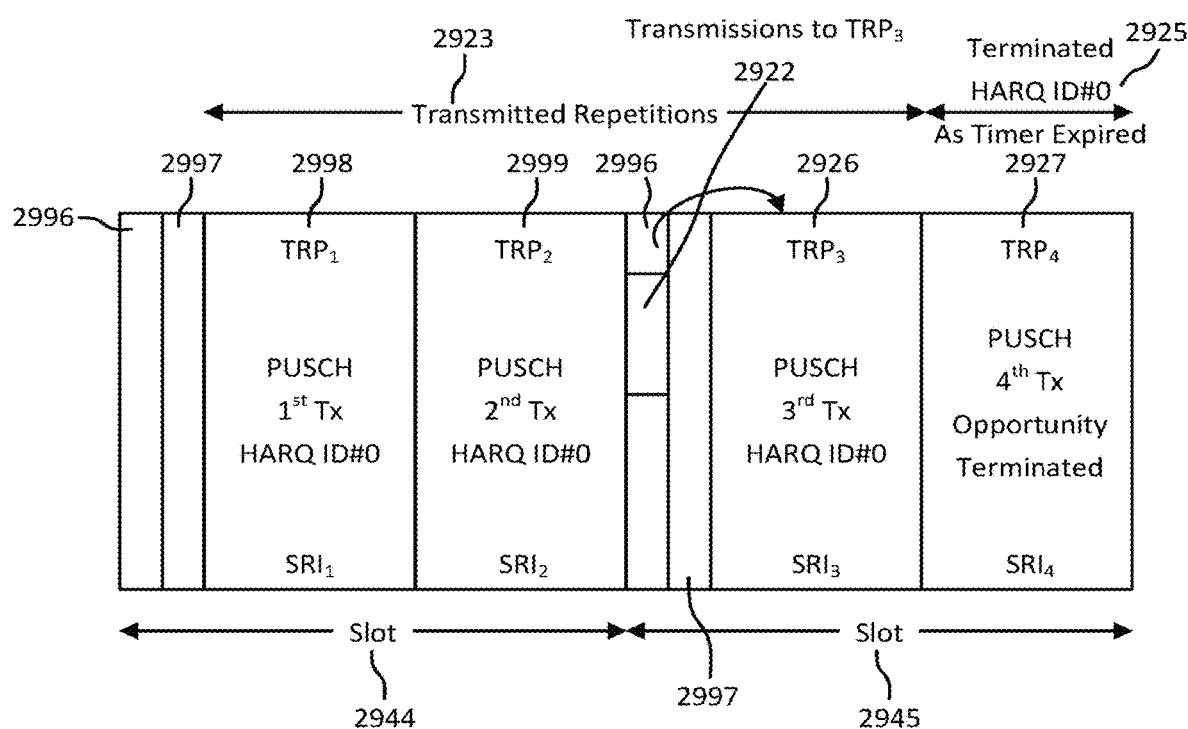
FIG. 29H is a diagram of PUSCH repetition in multi-TRP scenario with selective termination of repetitions.

FIG. 29H shows slots 2944 and 2945 comprising the PDCCH 2996, gap 2997, SRI$_1$ directed to TRP$_1$ 2998, SRI$_2$ directed to TRP$_2$ 2999, SRI$_3$ directed to TRP$_3$ 2926, and SRI$_4$ directed to TRP$_4$ 2927. SRI$_1$ directed to TRP$_1$ 2998, SRI$_2$ directed to TRP$_2$ 2999, SRI$_3$ directed to TRP$_3$ 2926 are transmitted during repetitions 2923. In the example of FIG. 29H, however, TRP$_4$ and TRP$_1$ may have a non-deal backhaul. As a result, an ACK from TRP$_1$ is not communicated to TRP$_4$ within acceptable latency (e.g., HARQ ID #0 is terminated at the timer expires 2925), and it is desired that TRP$_4$ should receive the PUSCH from the UE. The ETI 2922 to the UE on the PDCCH terminates the transmission to TRP$_3$. As a result, the UE terminates the transmission to TRP$_3$ and performs the 4th PUSCH transmission to TRP$_4$.

In order to enable such an operation, the notion of 'TRP-group' where a TRP-group consists of certain TRPs is introduced. The gNB may configure the UE with multiple TRP-groups through RRC signaling. A TRP-group is expected to contain TRPs that have ideal backhaul conditions with respect to at least one other TRP in that group. Here, if a TRP in a TRP-group ACKs a HARQ process, then the UE may terminate the transmission of repetitions of that HARQ process to other TRPs in that group as ideal backhaul conditions are expected to enable inter TRP communication of the ACK within that TRP-group.

Figure 30:
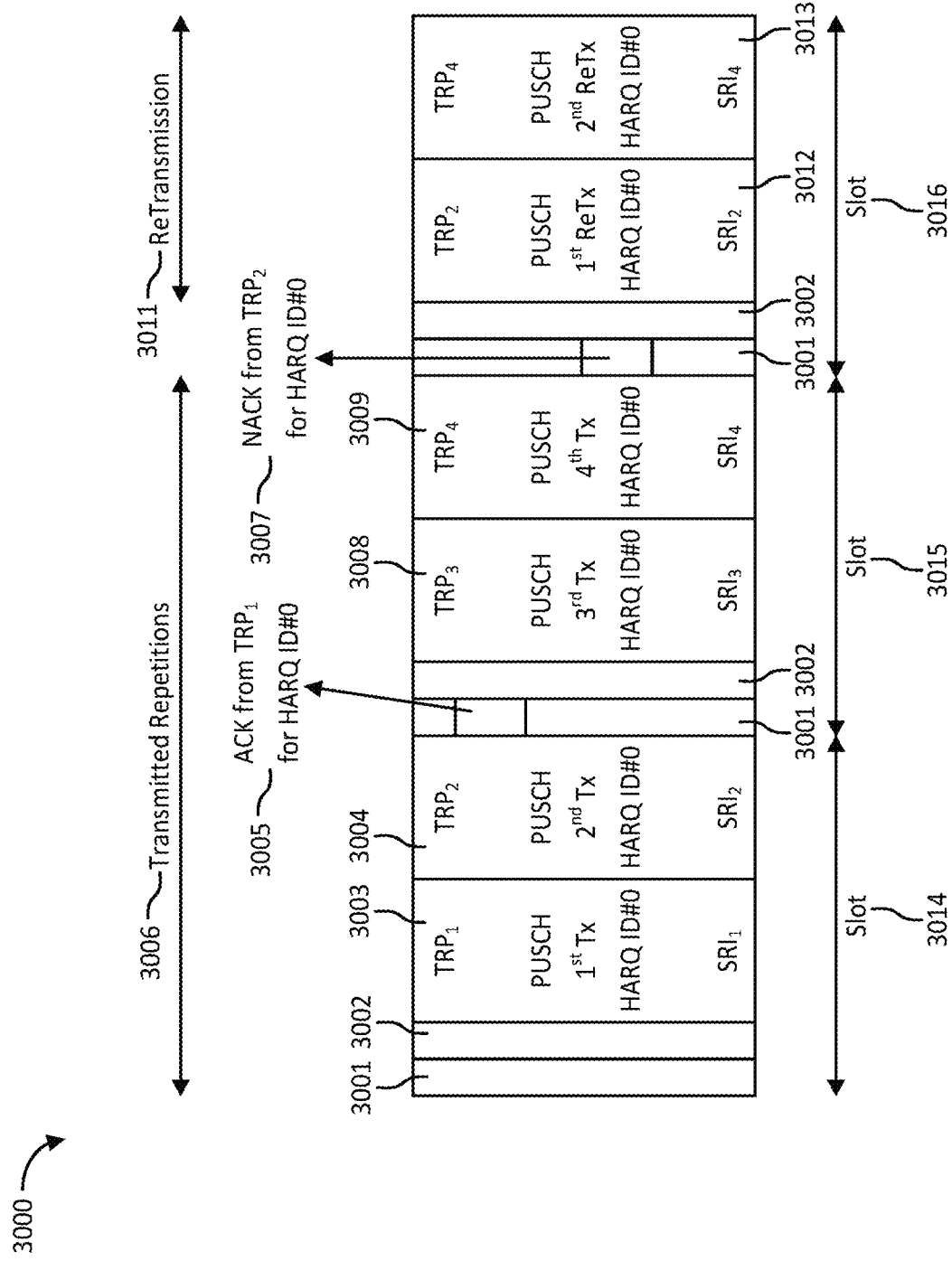
FIG. 30 is a diagram of retransmission to TRPs within a TRP-group when one TRP from the group NACKs the transmission.

FIG. 30 shows an example retransmission to TRPs within a TRP-group when one TRP from the group NACKs the transmission 3000. FIG. 30 shows slots 3014, 3015, and 3016 comprising the PDCCH 3001, gaps 3002, and during transmitted repetitions 3006: SRI$_1$ directed to TRP$_1$ 3003, SRI$_2$ directed to TRP$_2$ 3004, SRI$_3$ directed to TRP$_3$ 3008, and SRI$_4$ directed to TRP$_4$ 3009. In the example of FIG. 30, if a TRP in a TRP-group needs retransmission, the UE may only retransmit a HARQ process to one or more TRPs within that group. Assuming that TRP$_1$ and TRP$_3$ are in TRP-group1 whereas TRP$_2$ and TRP$_4$ are in TRP-group2. UE may have an UL grant for PUSCH repetitions of HARQ ID #0. TRP$_1$ detects an ACK for the PUSCH HARQ ID #0 3005 whereas TRP$_2$ detects a NACK 3007 (TRP$_1$ may indicate the ACK either explicitly or implicitly; 3005 to the UE on the PDCCH; TRP$_2$ may indicate the NACK either explicitly or implicitly 3007 to the UE on the PDCCH). A dynamic grant for retransmission may schedule the retransmission 3011 to one or more TRPs within that TRP-group (e.g., SRI$_2$ directed to TRP$_2$ 3012 and SRI$_4$ directed to TRP$_4$ 3013). Alternatively, for a CG, the UE may retransmit only to the TRP-groups from which no ACK was received. In this example, the UE may retransmit HARQ ID #0 only to TRP$_2$ 3012 and/or TRP$_4$ 3013 which are within TRP-group2. The UE may be configured to retransmit to certain TRPs within the target TRP-group through RRC signaling. This may reduce the signaling overhead in the DCI when scheduling the retransmission.

Figure 31A:
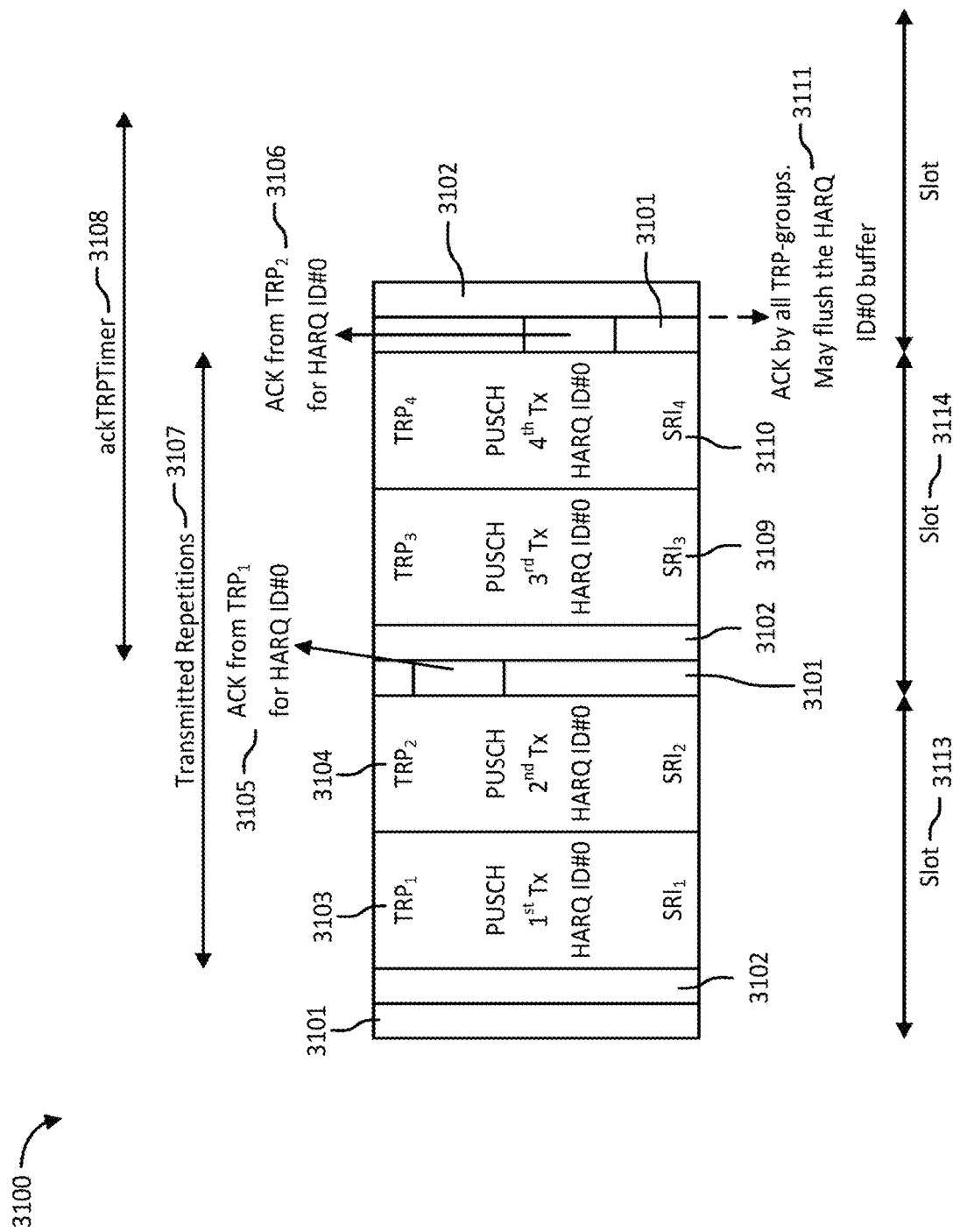
FIG. 31A is a diagram of a UE flushing its HARQ buffer upon receiving an ACK from all TRP-groups.
Figure 31B:
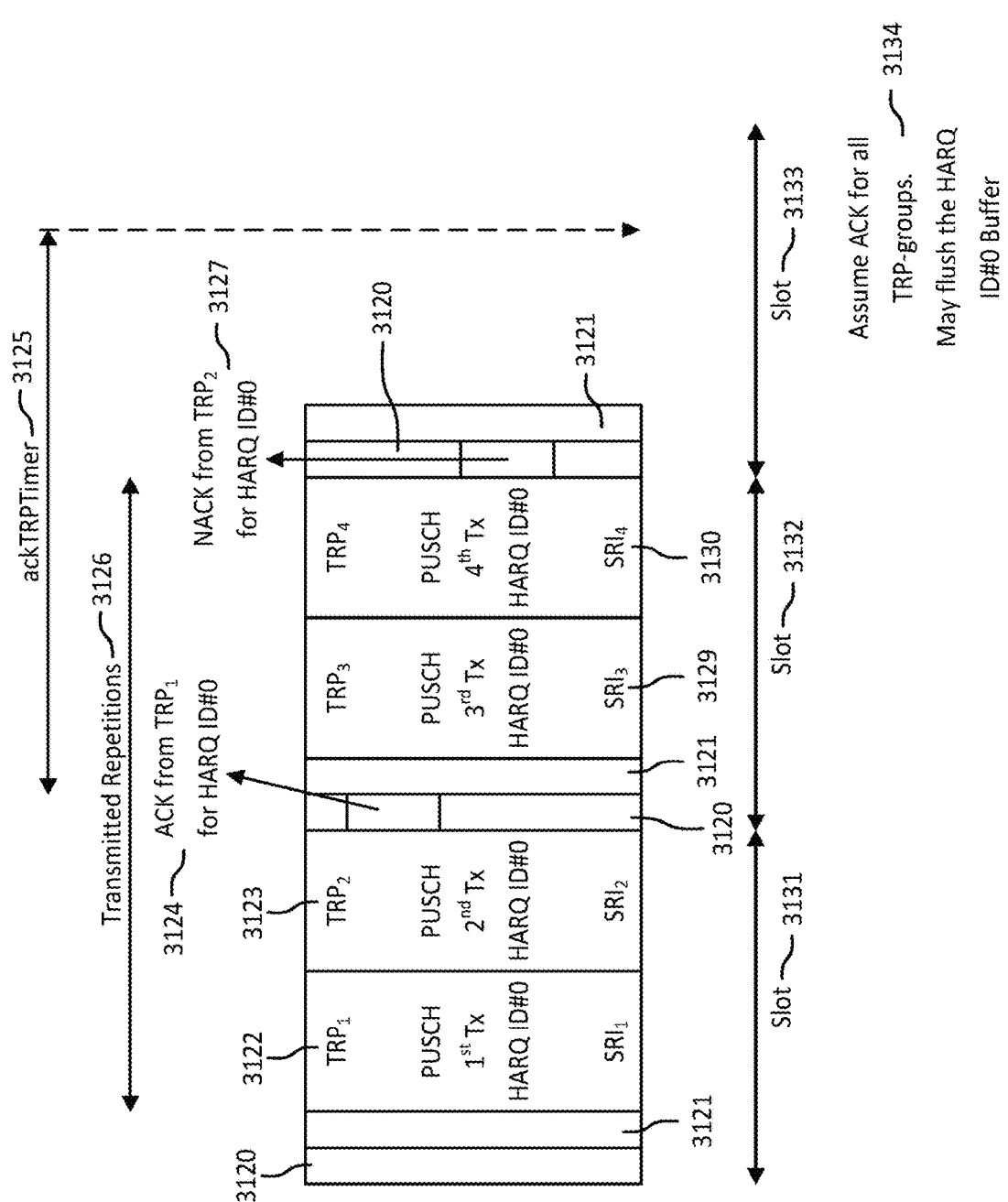
FIG. 31B is a diagram of a UE identifying an ACK from all TRP-groups with reception of at least one ACK, HARQ buffer flushing after expiration of the timer.

FIGS. 31A-31B shows examples of the UE identifying ACKs from all TRP-groups 3100. The UE may not clear its HARQ buffer for ID #0 until it has received an ACK from at least one TRP within each TRP-group or until a timer ackTRPTimer expires. This is to ensure that all target TRPs (or TRP-groups) receive the ACK status and/or have enough time to transfer the data and/or ACK status of acknowledged HARQ process between the TRPs (or TRP-groups).

FIG. 31A shows slots 3113 and 3114 comprising the PDCCH 3101, gaps 3102, and during transmitted repetitions 3107: SRI$_1$ directed to TRP$_1$ 3103, SRI$_2$ directed to TRP$_2$ 3104, SRI$_3$ directed to TRP$_3$ 3109, and SRI$_4$ directed to TRP$_4$ 3110. FIG. 31A shows an example in which reception of the ACK is from each TRP group. When a UE receives an ACK from a TRP in a TRP-group (e.g., on the PDCCH receiving an ACK from TRP$_1$ for HARQ ID #0 3105 and ACK from TRP$_2$ for HARQ ID #0 3106), it may set and start decrementing the ackTRPTimer 3108. If the UE receives an ACK from all other TRP-groups before the timer 3108 expires, it may clear the HARQ buffer for ID #0 3111.

FIG. 31B shows slots 3131, 3132, and 3133 comprising the PDCCH 3120, gaps 3121, and during transmitted repetitions 3126: SRI$_1$ directed to TRP$_1$ 3122, SRI$_2$ directed to TRP$_2$ 3123, SRI$_3$ directed to TRP$_3$ 3129, and SRI directed to TRP$_4$ 3130. FIG. 31B shows an alternative example, wherein if the UE's ackTRPTimer 3126 expires before all ACKs are received from the TRP-groups for HARQ ID #0 (e.g., on the PDCCH receiving an ACK from TRP$_1$ for HARQ ID #0 3124), the UE may clear its buffer for HARQ ID #0 3134 even if it receives a NACK from another TRP-group (e.g., NACK from TRP$_2$ for HARQ ID #0 3127), as shown in FIG. 31B, because it is expected that the TRPs have enough time to communicate the status of the ACK and/or the PUSCH data between the concerned TRPs or TRP-groups.

Note that the ACK may be implicitly indicated by the TRP to the UE through a grant for the same HARQ ID but with the NDI set to indicate a new transmission.

In the example shown in FIGS. 31A-31B, the timer may be set upon reception of the first ACK for that HARQ process. Other alternatives presented herein may also be considered as a starting point to set the timer.

The timer may be set when the first transmission of PUSCH occurs in the repetition set of that HARQ ID.

The timer may be set when the last transmission of PUSCH occurs in the repetition set of that HARQ ID.

The value for ackTRPTimer may be configured to the UE through RRC signaling and may depend on the latency in the non-ideal backhaul.

Intra-UE prioritization of PUSCH is described herein. Prioritization of configured grant over dynamic grant is described herein. A UE may have a configured grant of high priority but may receive a dynamic grant for PUSCH of low priority colliding with a configured grant. In this case, the UE may not service the dynamic grant but only transmit the configured grant. Alternatively or additionally, if the UE has the capability, it may puncture the dynamic grant PUSCH and may transmit the dynamic PUSCH on available resources. The gNB may monitor the DMRS of the configured grant and if it receives it, it may expect to process the high priority configured grant PUSCH.

Figure 32A:
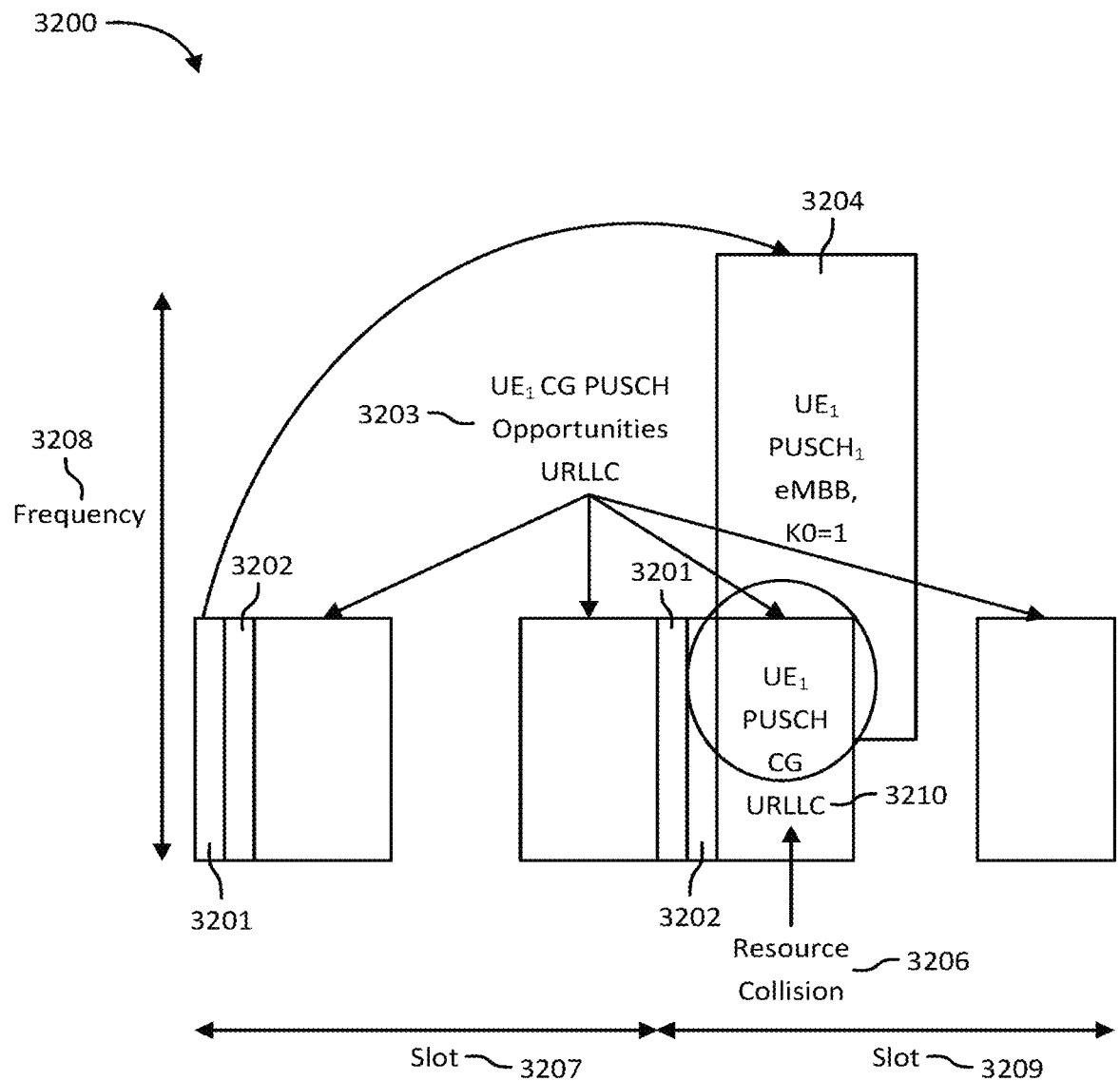
FIG. 32A is a diagram of Intra-UE collision between a low priority PUSCH grant and a high priority PUSCH grant eMBB PUSCH resources are punctured in the location of URLLC resources.
Figure 32B:
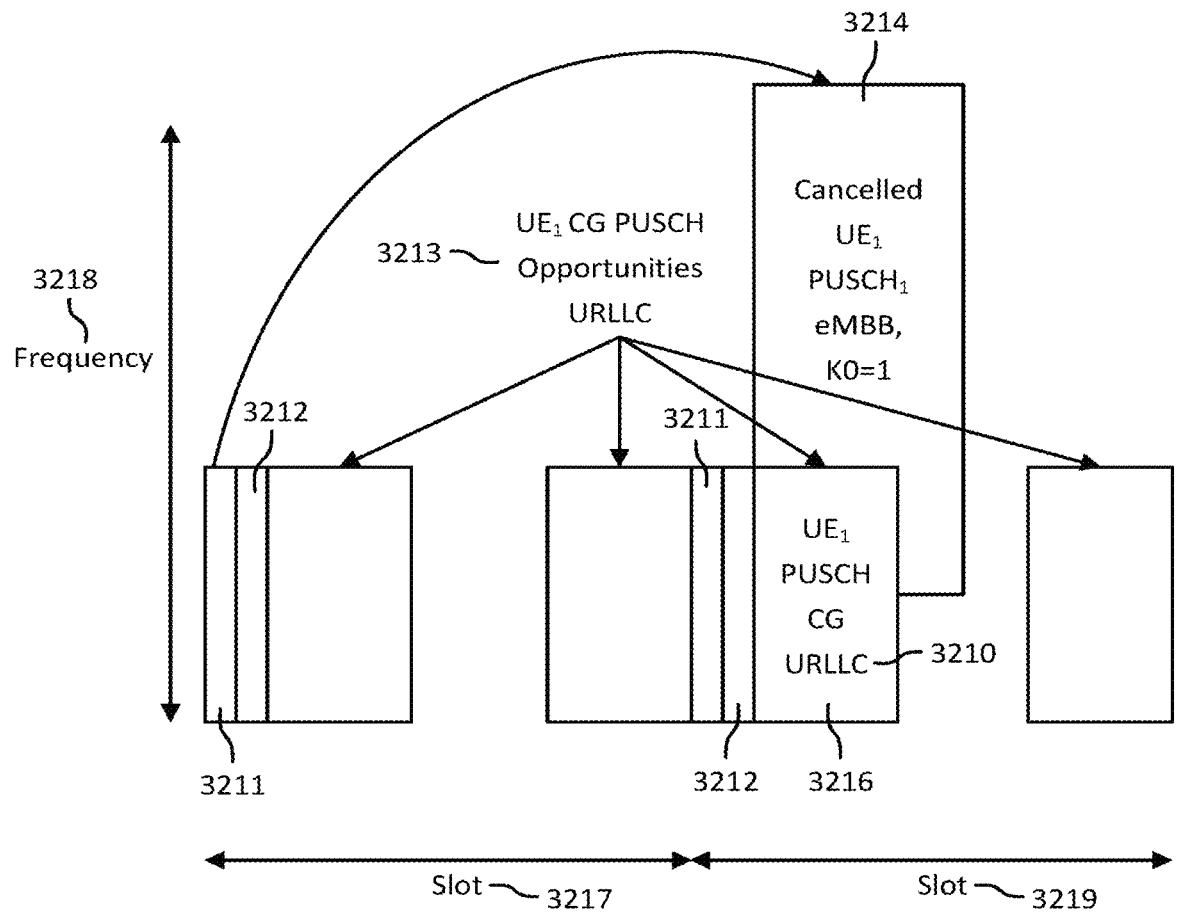
FIG. 32B is a diagram of Intra-UE collision between a low priority PUSCH grant and a high priority PUSCH grant eMBB transmission is fully cancelled.
Figure 32C:
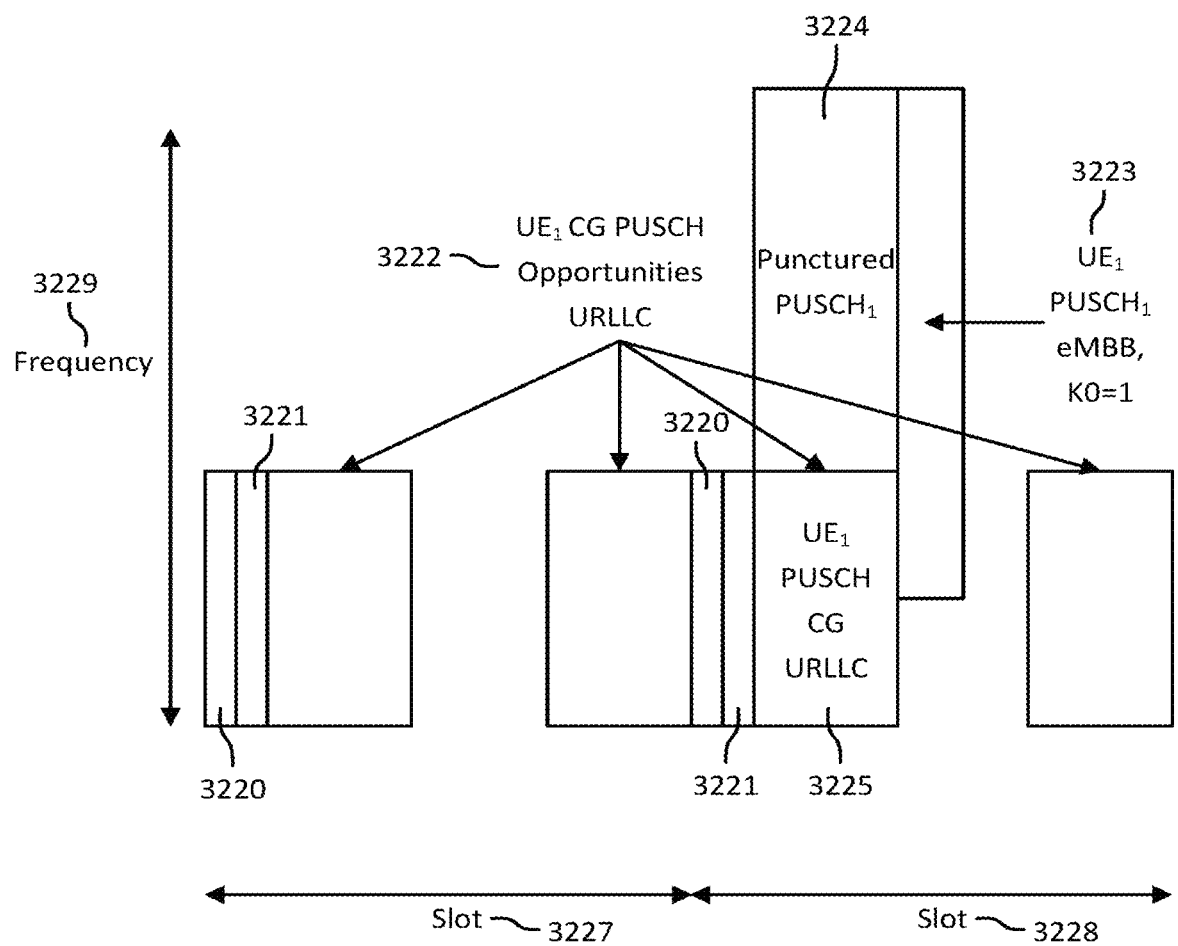
FIG. 32C is a diagram of Intra-UE collision between a low priority PUSCH grant and a high priority PUSCH grant eMBB PUSCH resources are punctured on the symbols where collision occurs with URLLC PUSCH.

FIGS. 32A-32C show examples of intra-UE collision between a low priority PUSCH grant and a high priority PUSCH grant 3200. FIG. 32A shows, with respect to frequency 3208, slots 3207 and 3209 comprising the PDCCH 3201, and gap 3202. In the example of FIG. 32A, the UE may transmit CG PUSCH URLLC opportunities 3203 which has a resource conflict 3206 with a dynamic grant received for eMBB PUSCH$_1$ 3204. Here the UE punctured PUSCH$_1$ 3210 in the REs where there is resource conflict.

FIG. 32A shows, with respect to frequency 3218, slots 3217 and 3219 comprising the PDCCH 3211, and gap 3212. The UE may transmit CG PUSCH URLLC opportunities 3213 which has a resource conflict with a dynamic grant received for eMBB PUSCH$_1$ 3214. In the alternative example of FIG. 32B, the UE cancels PUSCH$_1$ 3214 as it may not be capable of processing both the eMBB 3214 and URLLC PUSCH 3216 at the same time.

FIG. 32C shows, with respect to frequency 3229, slots 3227 and 3228 comprising the PDCCH 3220, and gap 3221. The UE may transmit CG PUSCH URLLC opportunities 3222 which has a resource conflict with a dynamic grant received for eMBB PUSCH$_1$ 3224. In the alternative example of FIG. 32C, the PUSCH$_1$ 3223 may be transmitted only on symbols that do not overlap with the CG PUSCH 3223, i.e., PUSCH$_1$ 3224 may be punctured in the symbols overlapping with CG PUSCH 3225.

Similar behavior may be supported for a case wherein a high priority dynamic UL grant has resource conflict with low priority dynamic UL grant. This scenario may arise if a gNB transmits a low priority UL grant and subsequently transmits a higher priority UL grant that collides with the low priority grant to the same UE. Alternatively or additionally, in the multi-TRP case, one TRP may schedule a high priority grant whereas another may schedule a low priority UL grant that may result in a resource conflict in the UE.

Figure 33:
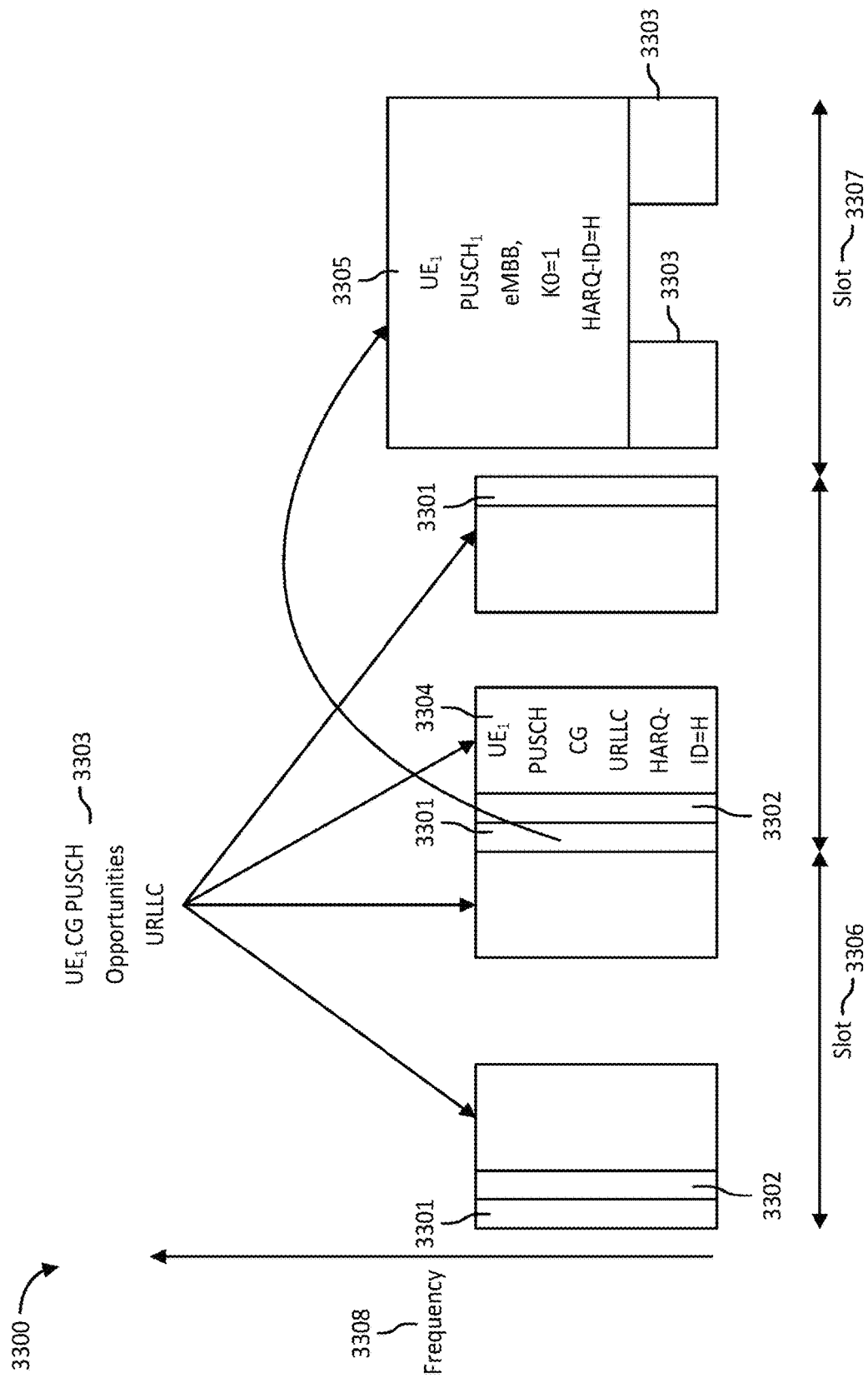
FIG. 33 is a diagram of $PUSCH_{URLLC}$ and $PUSCH_{eMBB}$ have the same HARQ-ID D (Note that the PUSCH resources do not collide)

FIG. 33 shows an example in which the PUSCHURLLC and PUSCHeMBB have the same HARQ ID 3300. FIG. 33 shows, with respect to frequency 3308, slots 3306 and 3307 comprising the PDCCH 3301, and gap 3302. The UE may transmit CG PUSCH URLLC opportunities 3303, and the UE receives an UL grant for PUSCHeMBB transmission with HARQ-ID 'H' 3305. The UE also has a configured grant PUSCH$_{URLLC}$ transmission 3304 with the same HARQ-ID. In this case, the UE's transmission buffer with ID H contains URLLC data. It may be desirable that this should not be flushed until the UE knows that the URLLC HARQ transmission was correctly received by the gNB. In this case, if the dynamic grant for lower priority PUSCH with same HARQ ID is received, the UE may ignore that low priority grant even though the resources do not collide between the PUSCH$_{URLLC}$ and PUSCH$_{eMBB}$.

The acknowledgement of the URLLC PUSCH may occur implicitly, i.e., the UE does not receive a rescheduling for HARQ-ID H with a DCI indicating higher priority (URLLC priority) prior to the expiry of a timer ConfiguredGrant-Timer. Therefore, if any of the PUSCH$_{eMBB}$ occurs within the ConfiguredGrantTimer duration following the PUSCH$_{URLLC}$ transmission, the UE drops all or part of the PUSCH$_{eMBB}$ grant.

If the PUSCH grants additionally collide in time, it may be desirable to indicate priority level of the transmitted PUSCH to enable the gNB to correctly identify which PUSCH was transmitted. Here, the UE may use the RNTI$_p$ corresponding to its priority level to mask its RNTI in its PUSCH transmission.

If the gNB indicated the acknowledgement to the CG explicitly, the UE may not flush its transmission buffer H until the acknowledgement may be received. It is proposed herein that the gNB may indicate the priority of the PUSCH process being acknowledged to avoid ambiguity in the event of HARQ ID collisions.

Figure 34:
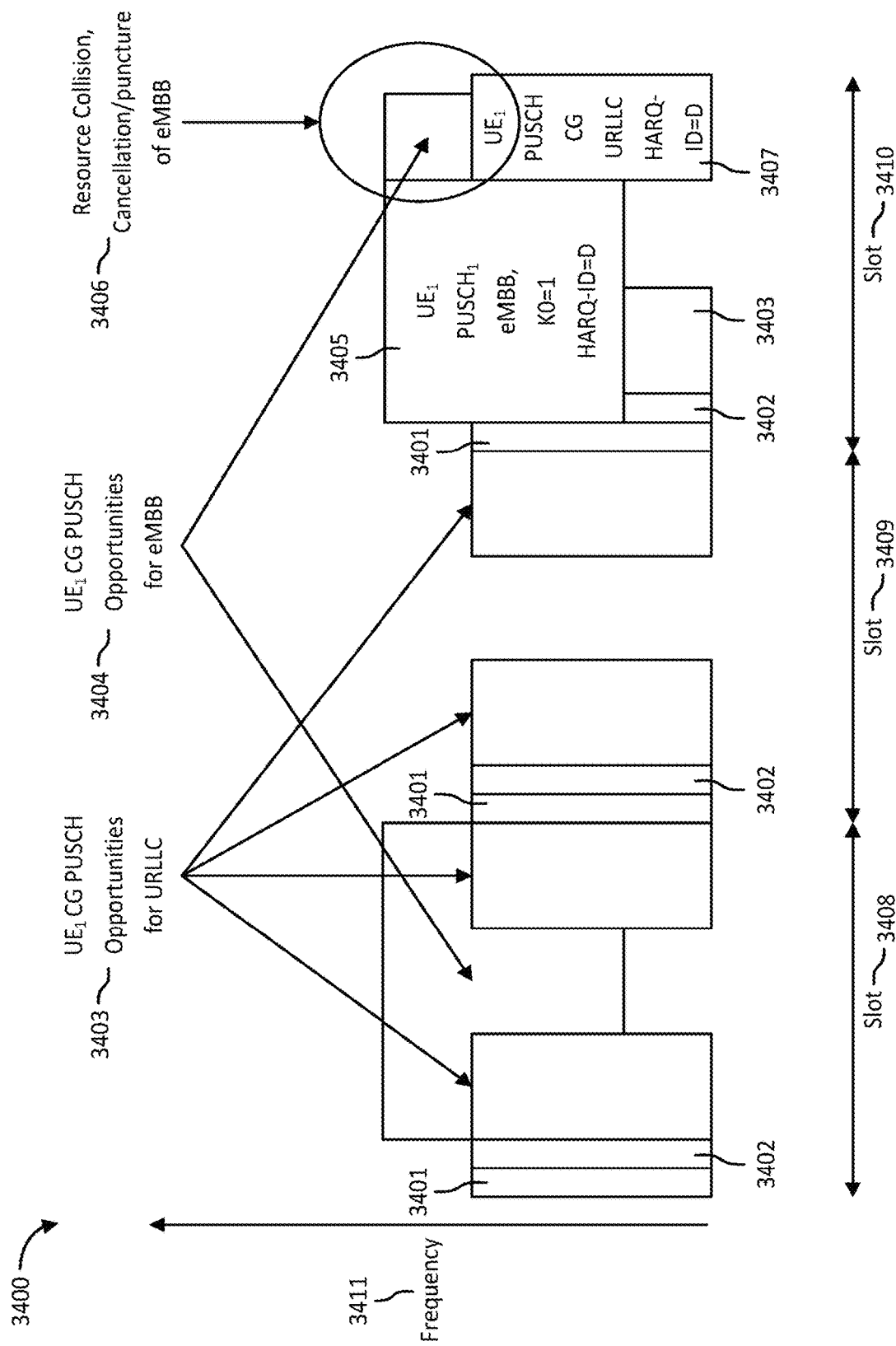
FIG. 34 is a diagram of Intra-UE collision of CG PUSCH. Lower priority CG PUSCH is cancelled or punctured by higher priority CG PUSCH.

FIG. 34 shows an example of an intra-UE collision of the CG PUSCH 3400. If a UE may be configured with multiple configured grants of different priority levels, it may begin a transmission of a lower priority CG PUSCH but may need to preempt it to transmit a higher priority CG PUSCH. FIG. 34 shows, with respect to frequency 3411, slots 3408, 3409, and 3410 comprising the PDCCH 3401, and gap 3402. The UE may transmit CG PUSCH URLLC opportunities 3403. In the alternative example of FIG. 34, the UE may be configured with two CGs, one for a low priority PUSCH referred to as an eMBB 3404 and one with high priority PUSCH referred to as an URLLC 3403. The UE may begin an eMBB PUSCH transmission 3405 when it receives a URLLC TB for transmission via CG. So the UE transmissions may cancel or puncture the eMBB transmission 3406 and transmit the URLLC PUSCH 3407. The gNB may monitor DMRS for both CG PUSCH of both priorities and may detect that the URLLC CG PUSCH has punctured the eMBB CG PUSCH. The gNB may flush the punctured part of the eMBB CG PUSCH in its soft buffer.

It is proposed herein that CGs with different priorities have different durations configured for their ConfiguredGrantTimer duration. For low priority transmissions, the PUSCH duration may be longer than for high priority transmissions. Accordingly, it may be desirable to have longer duration for the ConfiguredGrantTimer for low priority CG PUSCH.

Figure 35A:
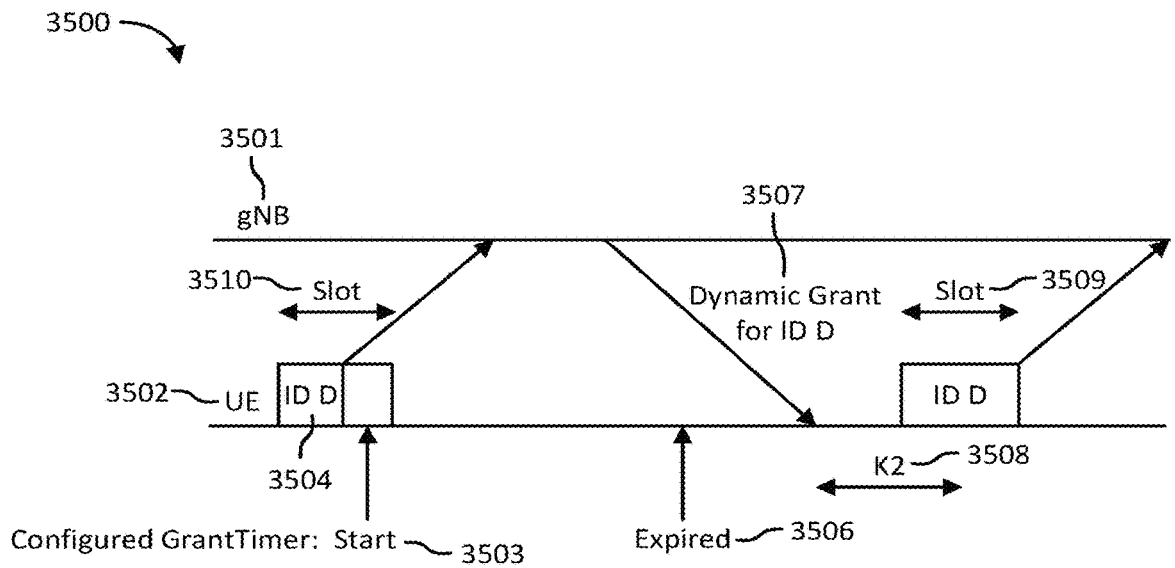
FIG. 35A is a diagram of Retransmission of intra-UE preempted low priority CG PUSCH Upon receiving a dynamic grant from the gNB.

FIG. 35A shows an example of a retransmission of an intra-UE preempted low priority CG PUSCH upon receiving a dynamic grant from the gNB 3500. If the eMBB CG PUSCH was punctured, a mode of operation may allow the gNB to schedule a dynamic grant for its retransmission with the CS-RNTI. In the example of FIG. 35A, the UE 3502 transmits the HARQ ID D 3504 to the gNB 3501 during slot 3503 and the configuredGrantTimer starts 3503. After the configuredGrantTimer expires 3506, the UE 3502 receives a dynamic grant for ID D 3507, and then the UE 3502 retransmits the HARQ ID D 3509 on the dynamic grant. However, in this case, the latency for the retransmission can be high.

Figure 35B:
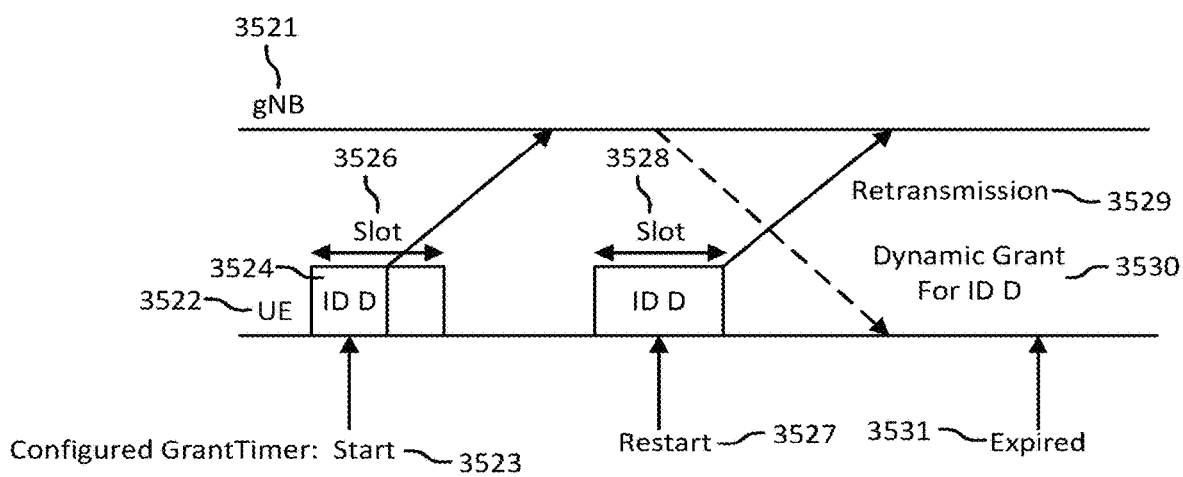
FIG. 35B is a diagram of Retransmission of intra-UE preempted low priority CG PUSCH Retransmission as CG PUSCH.

FIG. 35B shows an example of a retransmission as a CG PUSCH. In the example of FIG. 35B, the UE 3522 transmits the HARQ ID D 3524 to the gNB 3521 during slot 3526 and the configuredGrantTimer starts 3523. In this alternative example, the retransmission may occur prior to the expiration of the configuredGrantTimer and instead the UE retransmits the PUSCH, during slot 3528, as it was punctured by its own URLLC traffic 3529. The UE restarts the configuredGrantTimer 3257 upon retransmission. If the UE receives a dynamic grant for HARQ ID D 3530 after the CG retransmission, it may ignore the dynamic grant.

Furthermore, the retransmission may comprise only the CBGs that were cancelled or punctured. The UE may be RRC configured to retransmit either all the CBGs in the low priority PUSCH or only the impacted CBGs in the low priority PUSCH. As the gNB knows which CBGs were impacted in the first transmission, it can correctly soft-combine the retransmission. Accordingly, there may be no need for indicating the transmitted CBGTIs in the retransmission.

Intra-UE prioritization between DL and UL is described herein. In some situations, conflict may occur between a DL and UL transmission in the UE. The configuration for flexible symbols may be denoted as 'X' in the slot-format that may either be RRC configured or indicated through a DCI such as the format2_0 group-common DCI scrambled with the SFI-RNTI. In case of intra-UE conflict between the DL and UL, the following scenarios may arise.

Figure 36A:
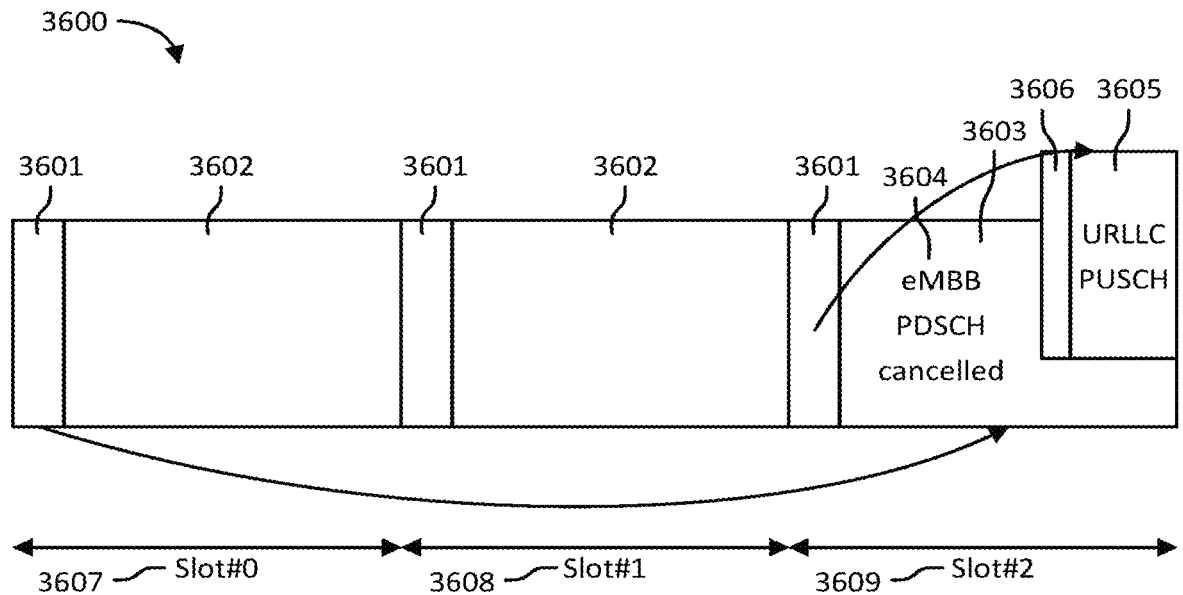
FIG. 36A is a diagram of Intra-UE DL and UL collision Low-priority PDSCH and high-priority PUSCH collision.

FIG. 36A is a diagram of Intra-UE DL and UL collision Low-priority PDSCH and high-priority PUSCH collision 3600. FIG. 36A shows slot #0 3607, slot #1 3608, slot #2 3609 comprising PDCCH 3601, other DL signals 3602, and gap 3606. In the example of FIG. 36A, one or more flexible symbols may be scheduled for a low-priority PDSCH through a grant (e.g., eMBB PDSCH 3603). A high priority UL grant may also be scheduled on one or more of same symbols (e.g., URLLC PUSCH 3605). In this case, the UE may suspend the PDSCH 3604 and may transmit the PUSCH.

Figure 36B:
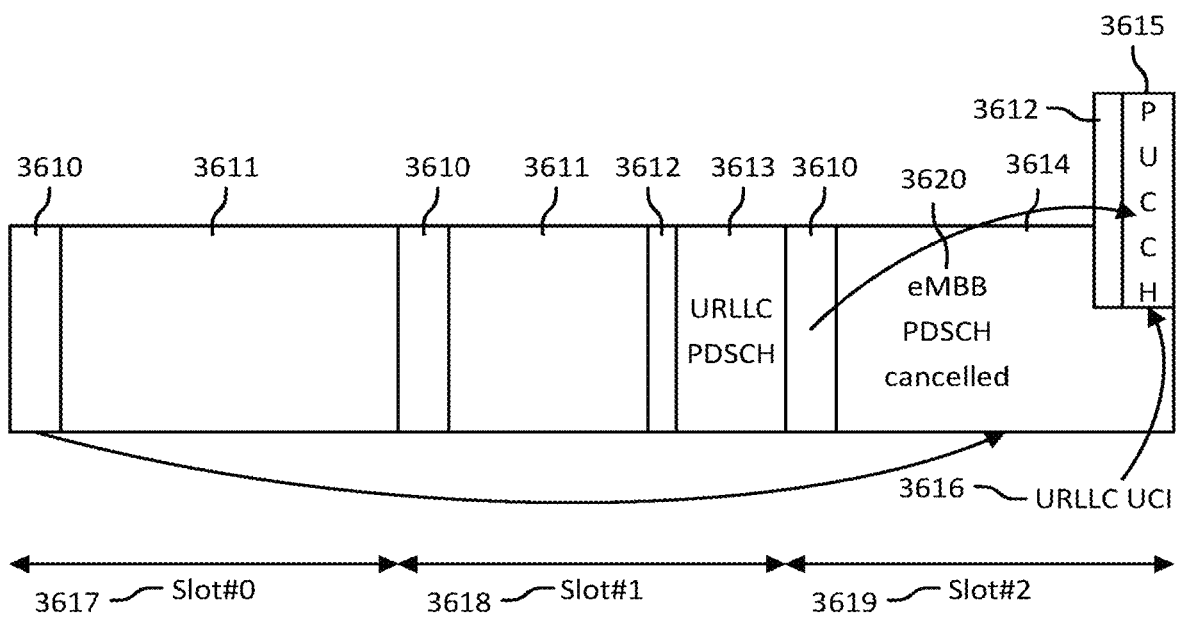
FIG. 36B is a diagram of Intra-UE DL and UL collision Low-priority PDSCH and high priority PUCCH collision.

FIG. 36B is a diagram of Intra-UE DL and UL collision Low-priority PDSCH and high priority PUCCH collision. FIG. 36B shows slot #0 3617, slot #1 3618, slot #2 3619 comprising PDCCH 3610, other DL signals 3611, and gap 3612. In the example of FIG. 36B, one or more flexible symbols may be scheduled for a low-priority PDSCH through a grant (e.g., eMBB PDSCH 3614). A high priority UL grant (e.g., URLLC UCI 3616 on the PUCCH 3615) may also be scheduled such that its PUCCH may be on one or more of the same flexible symbols. In this case, the UE may suspend the PDSCH 3620 and transmits the PUCCH 3615.

Figure 36C:
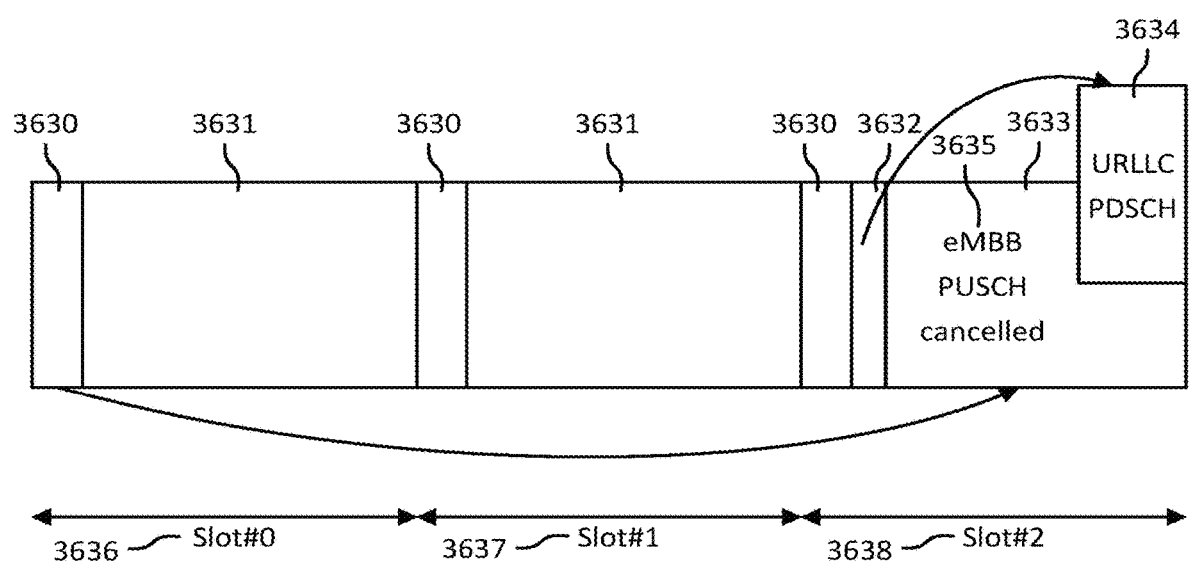
FIG. 36C is a diagram of Intra-UE DL and UL collision Low-priority PUSCH and high priority PDSCH collision.

FIG. 36C is a diagram of Intra-UE DL and UL collision Low-priority PUSCH and high priority PDSCH collision. FIG. 36C shows slot #0 3636, slot #1 3637, slot #2 3638 comprising PDCCH 3630, other DL signals 3631, and gap 3632. In the example of FIG. 36C, one or more flexible symbols may be scheduled for a low-priority PUSCH through a grant (e.g., eMBB PUSCH 3633). A high priority DL grant (e.g., URLLC PDSCH 3634) may also be scheduled such that its PDSCH may be on one or more of the same flexible symbols. In this case, the UE may suspend the PUSCH 3635 and receives the PDSCH 3634.

MAC layer prioritization and preemption of uplink transmissions is described herein. For the UL transmissions, the UE's MAC layer may prioritize the higher priority transmission if there is sufficient time to react to the grants. MAC transmissions may be considered to be conflicting when physical transmissions are either partially or fully overlapped in time. The UE's MAC may prioritize new conflicting transmissions, and/or preempt existing transmissions already delivered to the physical layer.

If there is sufficient time to react to available conflicting grants, the MAC may determine the priority of individual PUSCH transmissions before delivery of MAC protocol data units (PDUs) to the physical layer. If there is insufficient time to prioritize conflicting grants before delivery of one or more MAC PDUs to the physical layer, the MAC may preempt transmission of MAC PDUs already provided to the physical layer or may provide relative priority information to the physical layer for proper processing of each transmission.

The MAC may also prioritize between a conflicting Scheduling Request (SR) and PUSCH transmissions. Similar to conflicting PUSCH transmissions MAC procedures for SR transmissions are affected by the minimum processing time and/or when the physical layer is informed of the transmission.

For either configured or dynamic grants, the UE may delay MAC PDU multiplexing and assembly until the minimal processing time requirement for each individual grant. Similarly, MAC SR processing and transmission indications to the physical layer may be delayed (e.g., until availability of the associated PUCCH resources). If a new conflicting grant is determined or a conflicting SR is triggered in advance of the minimum processing requirement for an existing conflicting grant or an SR, the UE may perform MAC transmission prioritization operation.

MAC transmission prioritization may comprise the following operations:

The MAC may determine for each outstanding grant which logical channels may be multiplexed into each PDU for each outstanding grant in advance of when the first grant needs to be processed considering the minimum processing requirement for each grant. Each logical channel may be configured with one or more priorities, the highest priority selected for logical channels multiplexed into the MAC PDU may determine the priority of the transmission. Priority of MAC Control Elements (CE) may also be taken into account. Each MAC CE type (i.e. PHR, BSR . . . ) may have a known priority which is used to determine the priority of the PUSCH transmission. For example, the highest priority of logical channels and MAC CEs multiplexed in to the MAC PDU may be used to determine the PUSCH transmission priority. This operation may effectively divide the existing MAC PDU multiplexing and assembly procedure into a two-step procedure. The existing Logical Channel Prioritization (LCP) procedure may determine the priority of available data as it multiplexes and assembles each MAC PDU for transmission. In this procedure the priority available data is determined in a first step before the multiplexing and assembly of a MAC PDU and generation of MAC CEs is initiated.

Alternatively, a priority may be associated with each configured and/or dynamic grant. In this case the priority of logical channels multiplexed onto the MAC PDU may not be taken into account. Normal logical channel prioritization for data multiplexing may take place. PUSCH transmission priority may be determined by the grant. Depending on data available for the transmission and/or the priority associated with each grant or priority associated with logical channels multiplexed into each MAC PDU or the priority of the logical channel that triggered the SR, the MAC may determine the priority of each transmission and retransmission.

PUSCH transmission priority may also be determined by a combination of grant priority and the priority of the data multiplexed within the MAC PDU. For example, the highest priority of either data multiplexed or the grant may be used to determine the PUSCH transmission priority.

When transmission prioritization is to be applied, the lower priority grant(s) or SR transmissions may either not be utilized, or additional information may be provided to the physical layer to properly prioritize the transmission. Utilizing a grant comprises multiplexing and assembly of data, e.g., a MAC Service Data Unit (SDU) or a MAC CE, into a MAC PDU and transmission of that MAC PDU associated with the grant, or comprises transmission of an SR associated with the grant. When a grant is not utilized, no multiplexing or assembly of data into a MAC PDU is performed and no SR transmission is performed.

If the MAC determines a grant is not to be utilized due to transmission prioritization, the MAC may inform the physical layer of the transmission canceled by the MAC in order to properly process higher priority transmissions that have not been canceled. Grants that are not utilized may be directly or indirectly signaled to the gNB scheduler. For example, the prioritized transmission which was not canceled may provide a transmission cancellation indication.

When lower priority transmissions are not cancelled by the MAC, relative priorities determined by the MAC may be provided to the physical layer along with each MAC PDU and/or SR transmission. In addition to uniquely processing each transmission, to ensure more or less reliable information indicating the relative priorities of each transmission may be directly or indirectly signaled to the gNB scheduler.

Irrespective of how MAC transmission prioritization is determined (i.e. LCP or grant based), when a grant is not utilized due to prioritization, the MAC may enable procedures to recover the lost grant. This may be accomplished by triggering an SR and/or by maintaining an SR pending state for the configured SR resource associated with the logical channel(s) that would have been serviced by the lost grant. A Buffer Status Report may also be generated as a result of the lost grant. When the MAC determines a grant may not be utilized this operation may be internal to the MAC. When the physical layer determines a grant is not be utilized the MAC may be informed to initiate procedures to recover the lost grant.

If a new conflicting grant is determined or a conflicting SR is triggered after the minimum processing requirement of an existing conflicting grant or a conflicting SR transmission, the UE may perform MAC transmission preemption operation.

MAC transmission preemption operation may comprise the following operations:

The MAC may determine transmission priority similarly to how prioritization is determined when a new grant or SR transmission is determined in advance of the minimum grant processing time of an existing grant (i.e. either grant or logical channel based) or SR transmission.

If the new grant or SR transmission is determined to be of a higher priority than the existing grant or SR transmission, the MAC may perform normal multiplexing and assembly of the MAC PDU and/or perform SR processing. When the MAC PDU and/or SR is delivered to lower layers, a preemption indication may be included. The preemption indication may identify the MAC PDU or SR transmission to be preempted.

When the physical layer detects a preemption indication the preempted transmission may either be discarded or adjusted (i.e. puncturing) in order to better ensure successful transmission of the prioritized transmission. In the case the transmission is discarded by the physical layer, the MAC may be informed. For a discarded MAC PDU transmission the MAC may take actions to recover the lost data. For example, similar actions may be taken as if a HARQ NACK was received for the canceled transmission. The maximum number of HARQ retransmissions may be incremented to allow for the same number of actual transmissions as would be allowed if the transmission was not canceled. For a discarded SR transmission, the MAC may cancel the SR pending state and/or retrigger the SR. In the case a MAC PDU containing MAC CE's are discarded, the MAC may take actions to recover and retransmit the lost MAC CE's (i.e. BSR, PHR). This may be accomplished by retriggering the MAC CEs and/or clearing the associated prohibit timers.

When an existing transmission is preempted, the new preempting transmission may provide an indication either directly or indirectly to the gNB scheduler of the preempted transmission. This may result in the gNB rescheduling the discarded transmission or taking actions as if the lower priority SR was received.

When the new grant or SR transmission is determined to be of a lower priority than the existing MAC PDU or SR transmission, the MAC either discards the new grant or SR transmission or provides relative priority information to the physical layer in order to determine processing that may not disrupt the current higher priority transmission. If the MAC discards the new grant or SR transmission, multiplexing and assembly of the MAC PDU and/or processing of the SR transmission may not be performed. This operation effectively makes the MAC PDU multiplexing and assembly and SR processing a two-step procedure where prioritization is determined in a first step. The physical layer may also be informed of the cancellation.

In the case physical layer preemption may be applied the MAC layer may be notified of the cancelled transmission. In this case the MAC may reinitiate transmission of the cancelled transmission in a subsequent available grant. This operation may invoke a procedure similar to reception of a HARQ NAK received for the cancelled transmission. The maximum number of HARQ retransmissions may be incremented to allow for the same number of actual transmissions as would be allowed if the transmission was not cancelled. Example of scenarios where it might be practical for PHY to perform grant preemption or grant prioritization include one or more of the following:

The physical layer may detect a preemption indication from the MAC.

The MAC may instruct the PHY for transmission with transmission priority. PHY may perform transmission preemption based on transmission priority provided by MAC The MAC may keep track of de-prioritized and/or preempted transmissions. When a threshold of the number of de-prioritized and/or preempted transmissions may be exceeded the MAC may take actions to report and correct failures of lower priority transmissions. When a threshold of deprioritized and/or preempted transmissions occurs for a logical channel or particular grant priority higher layers may be informed in order to take actions to correct the transmission failures more efficiently. Actions taken may be reporting the condition to the NB scheduler and/or adjusting relative priorities of logical channels of grants.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHZ, and the provision of new ultra-mobile broadband radio access above 6 GHz. The flexible radio access is expected to consist of a new, non-backwards compatible radio access in new spectrum below 6 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHZ, with cm Wave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 37A:
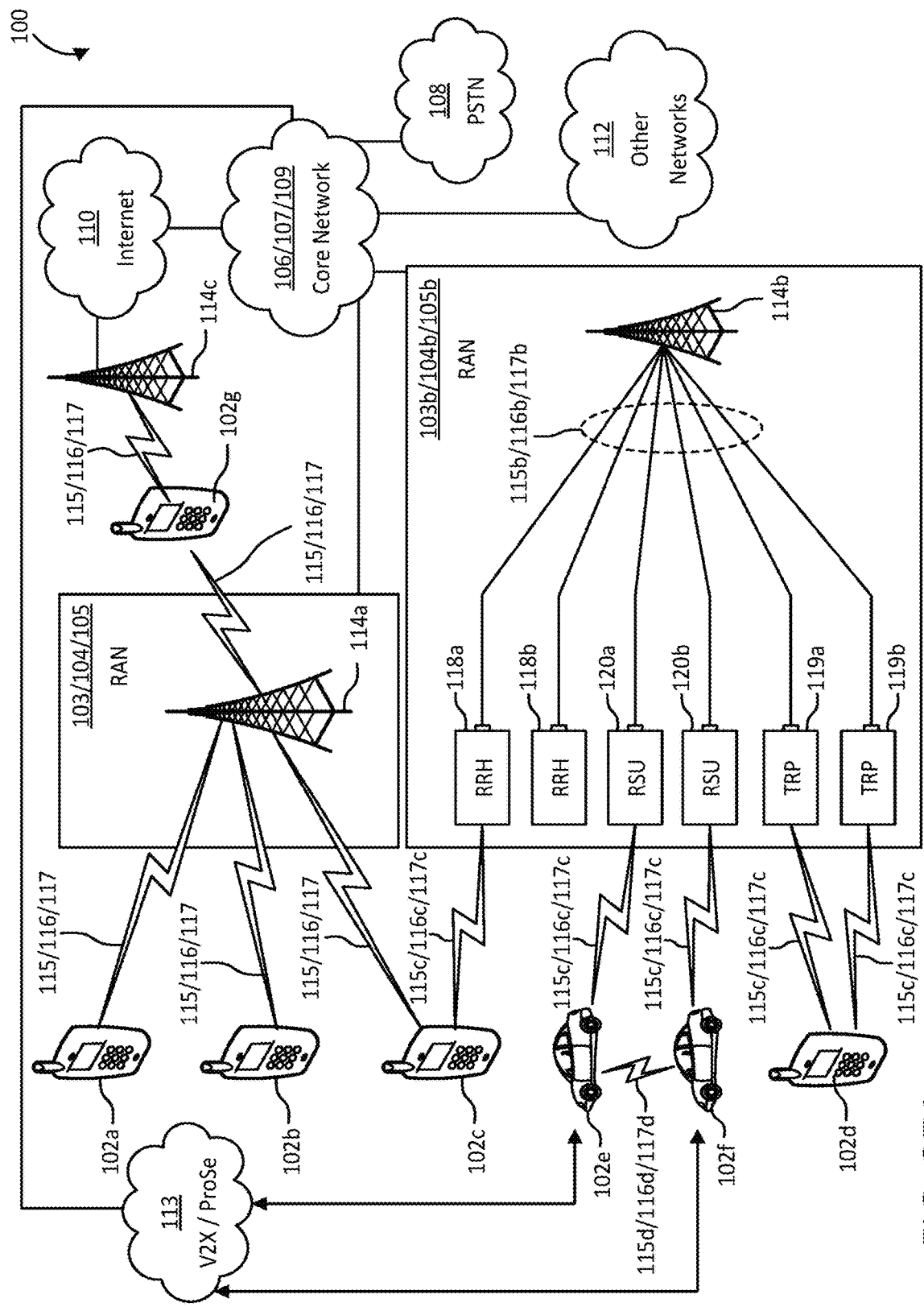
FIG. 37A illustrates an example communications system in which the methods and apparatuses described and claimed herein may be embodied.

FIG. 37A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 37A-37E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 37A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*c*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 37A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VOIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 37A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 37A may be configured to communicate with the base station 114a, which may employ a cellular-based radio technology, and with the base station 114c, which may employ an IEEE 802 radio technology.

Figure 37B:
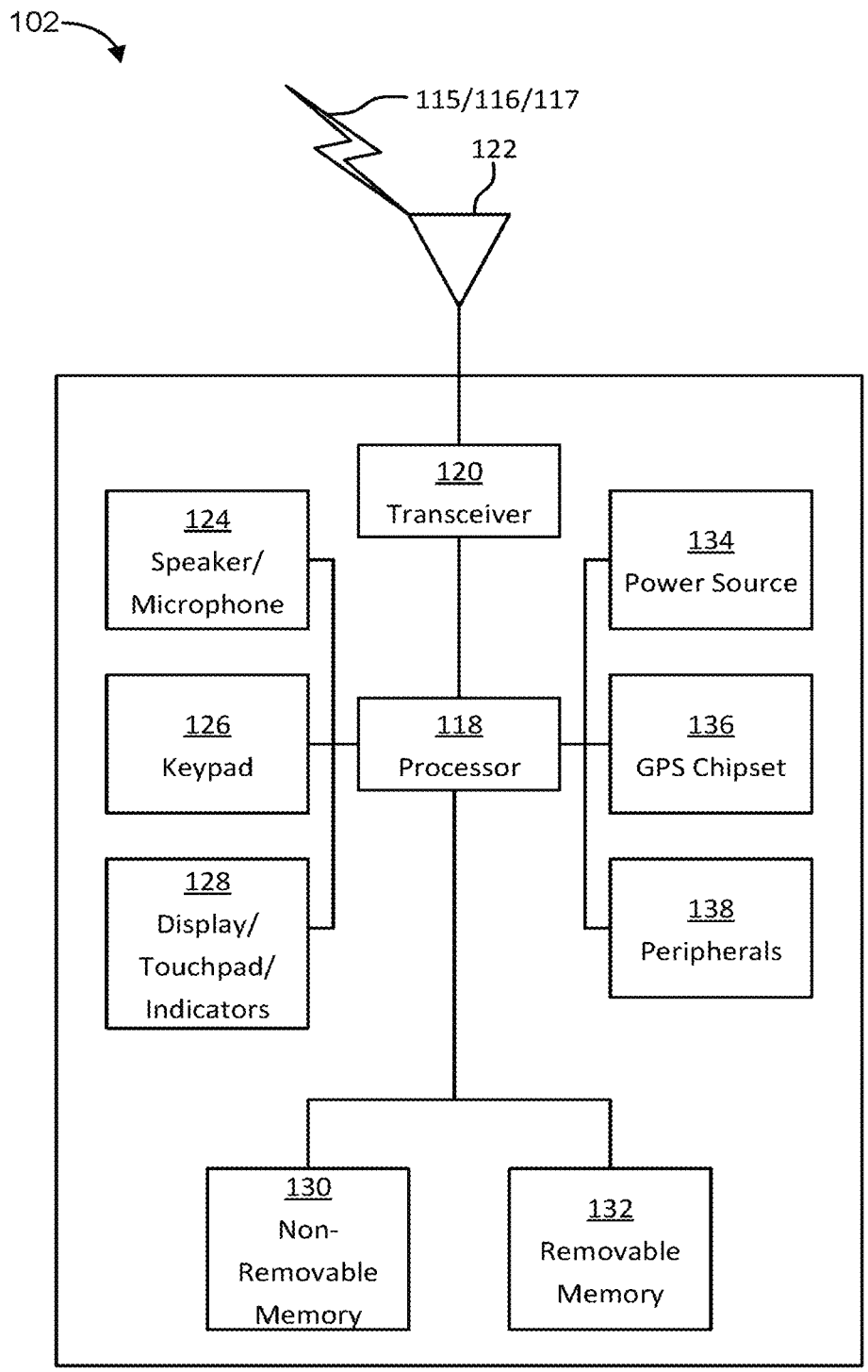
FIG. 37B is a block diagram of an example apparatus or device configured for wireless communications.

FIG. 37B is a block diagram of an example apparatus or device configured for wireless communications in accordance with the embodiments illustrated herein, such as for example, a WTRU 102. As shown in FIG. 37B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 37B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 37B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 37B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 37C:
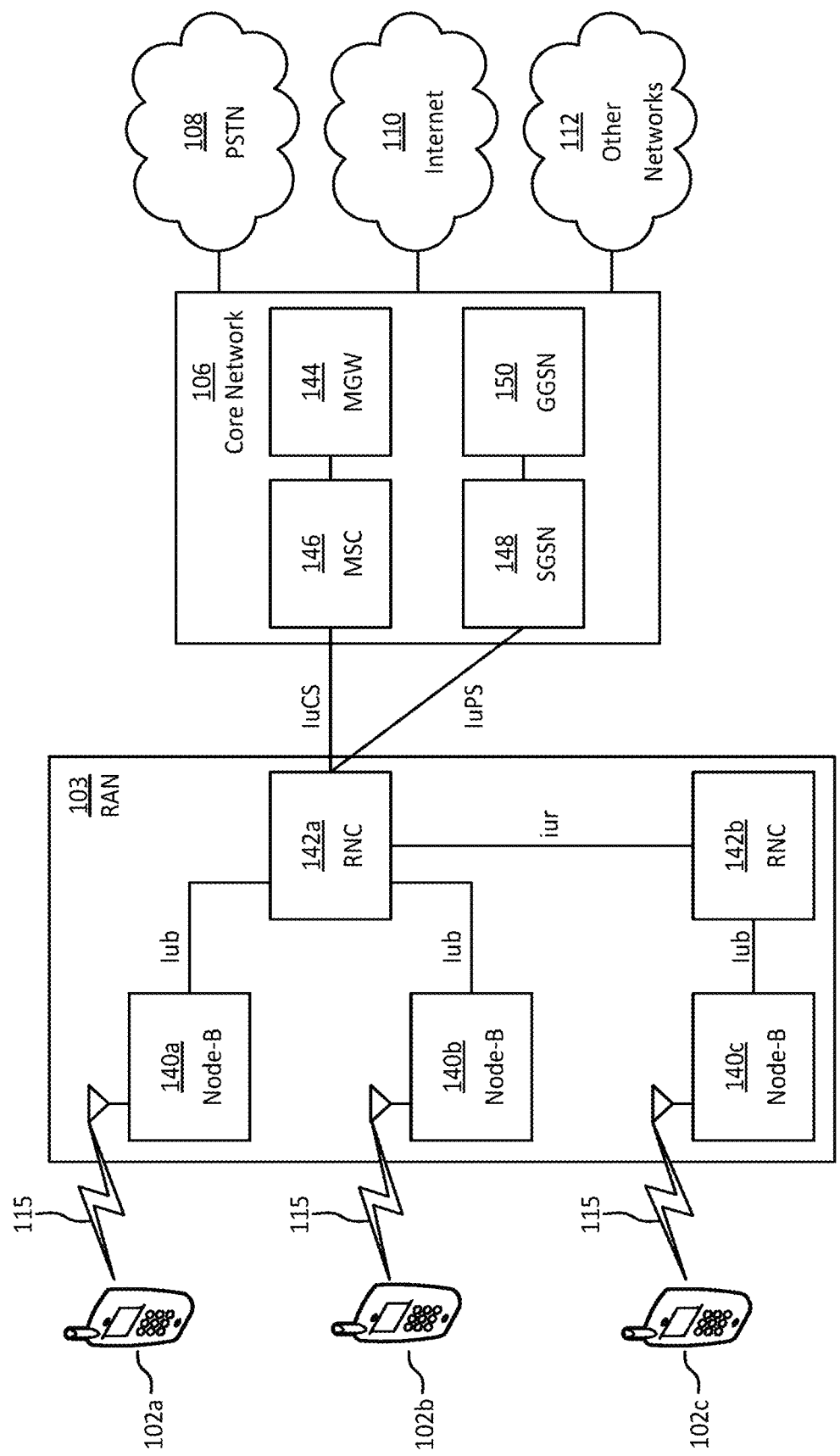
FIG. 37C is a system diagram of an example radio access network (RAN) and core network.

FIG. 37C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 37C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 37C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 37C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 37D:
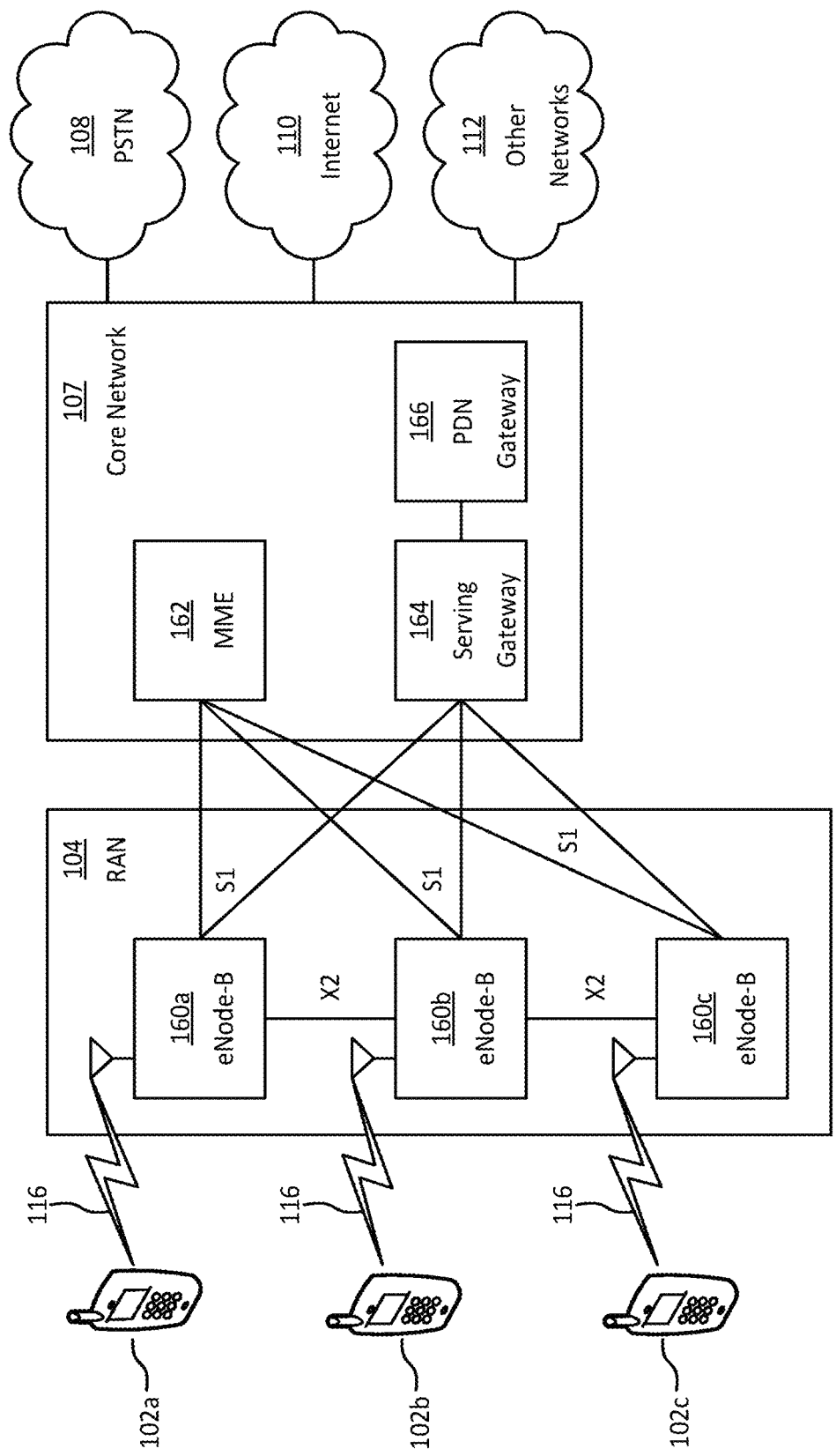
FIG. 37D is a system diagram of another example RAN and core network.

FIG. 37D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 37D, the eNode-Bs 160a, 160b, 160c may communicate with one another over an X2 interface.

The core network 107 shown in FIG. 37D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 37E:
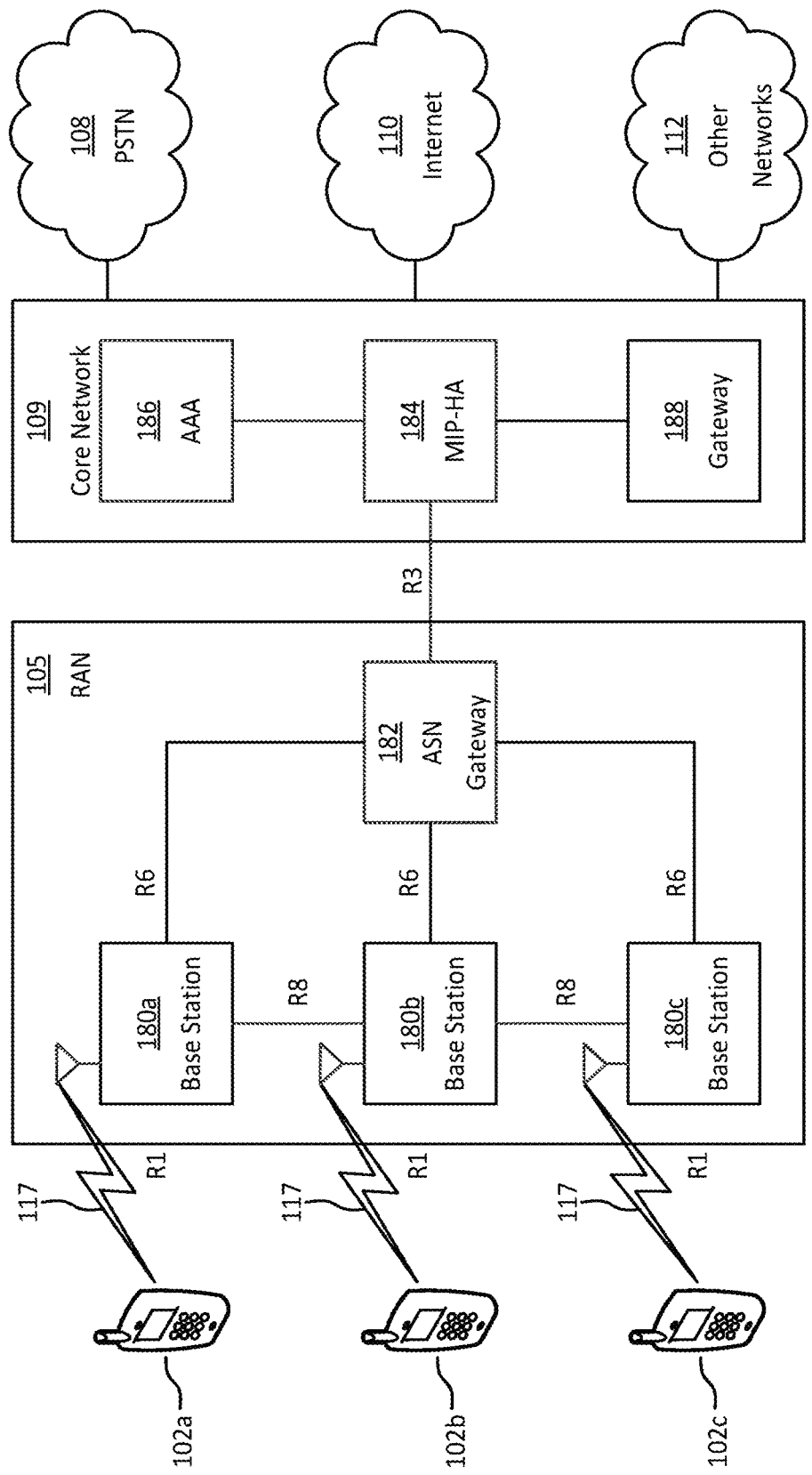
FIG. 37E is a system diagram of another example RAN and core network.

FIG. 37E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 37E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 37E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 37E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 37A, 37C, 37D, and 37E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 37A, 37B, 37C, 37D, and 37E are provided by way of example only, and it is understood that the subject matter disclosed and claimed herein may be embodied or implemented in any similar communication system, whether presently defined or defined in the future.

Figure 37F:
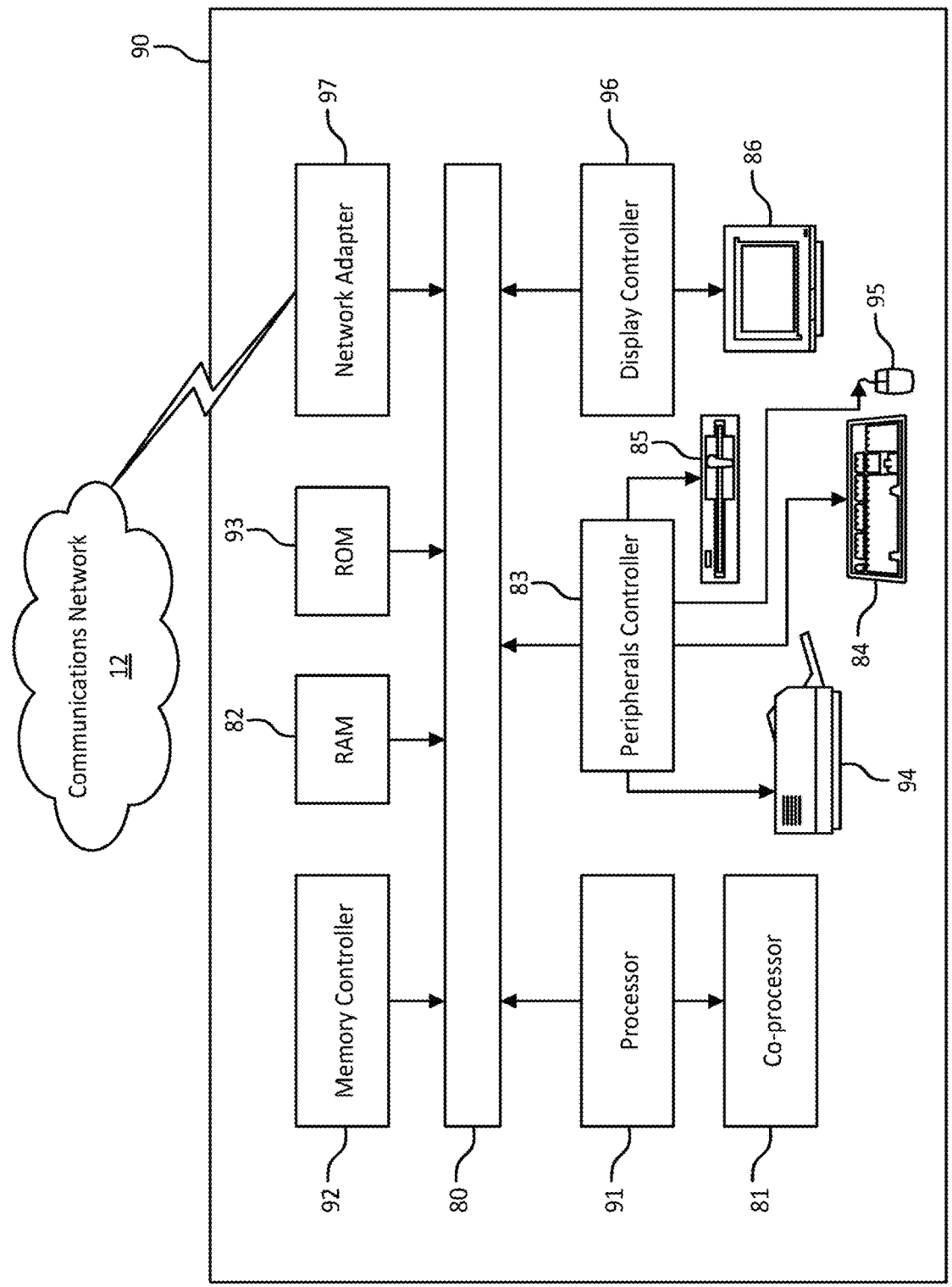
FIG. 37F is a block diagram of an example computing system.

FIG. 37F is a block diagram of an exemplary computing system 90 in which one or more apparatuses of the communications networks illustrated in FIGS. 37A, 37C, 37D and 37E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 37A, 37B, 37C, 37D, and 37E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 37G:
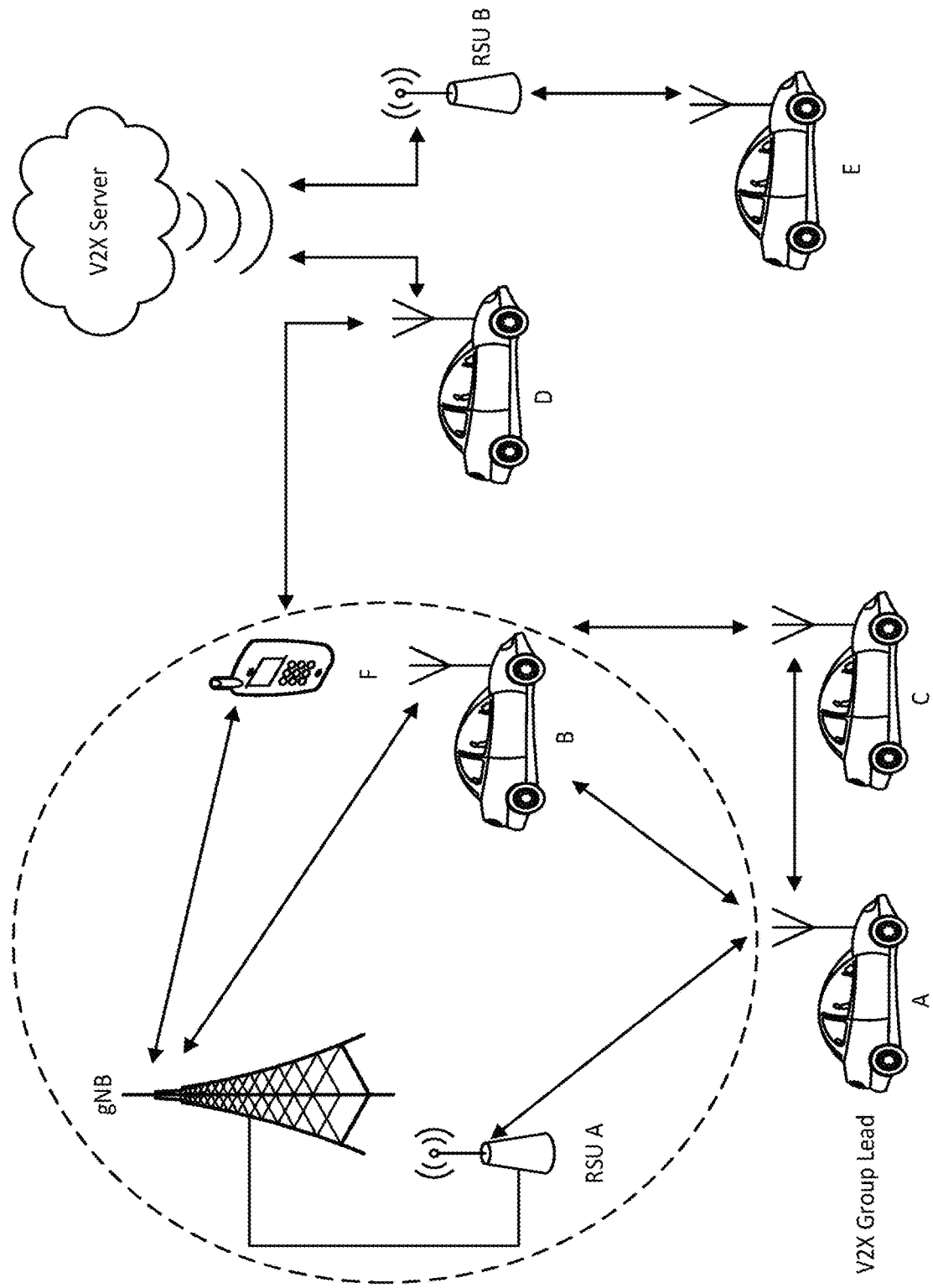
FIG. 37G is a block diagram of another example communications system.

FIG. 37G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU) comprising a processor configured to:

receive radio resource control signaling (RRC) comprising configuration information configuring a first Hybrid Automatic Repeat Request (HARQ) codebook associated with a first priority and a second HARQ codebook associated with a second priority, wherein the RRC signaling indicates that the first HARQ codebook is associated with a first sub-slot length for physical uplink control channel (PUCCH) feedback and that the second HARQ codebook is associated with a second sub-slot length for PUCCH feedback;

receive first downlink control information (DCI), the first DCI scheduling a first physical downlink shared channel (PDSCH) transmission, the first DCI indicating the first priority, wherein first HARQ feedback for the first PDSCH transmission is associated with the first HARQ codebook, and the first HARQ codebook is associated with the first priority;

receive second DCI, the second DCI scheduling a second PDSCH transmission, the second DCI indicating the second priority, wherein second HARQ feedback for the second PDSCH transmission is associated with the second HARQ codebook, and the second HARQ codebook is associated with the second priority;

determine, based on a first field in the first DCI, a first time for transmitting a first PUCCH transmission comprising the first HARQ feedback for the first PDSCH transmission, the first field indicating a first number of sub-slots according to the first sub-slot length associated with the first HARQ codebook;

determine, based on a second field in the second DCI, a second time for transmitting a second PUCCH transmission comprising the second HARQ feedback for the second PDSCH transmission, the second field indicating a second number of sub-slots according to the second sub-slot length associated with the second HARQ codebook;

determine that the first PUCCH transmission and the second PUCCH transmission at least partially overlap in time; and transmit the first PUCCH transmission and cancel at least a portion of the second PUCCH transmission based on the first priority being higher than the second priority;

transmit the first PUCCH transmission and cancel at least a portion of the second PUCCH transmission based on the first priority being higher than the second priority.

2. The WTRU of claim 1, wherein the first DCI comprises a third field, the third field indicating the first priority, and the second DCI comprises a fourth field, the fourth field indicating the second priority.

3. The WTRU of claim 1, wherein the first field corresponds to a K1 field of the first DCI.

4. The WTRU of claim 3, wherein, for at least one priority level, the WTRU is configured to interpret the K1 field in units of slots.

5. The WTRU of claim 1, wherein the RRC signaling indicates a first number of symbols for the first sub-slot length for PUCCH feedback and a second number of symbols for the second sub-slot length for PUCCH feedback, wherein the first number of symbols and the second number of symbols are different.

6. The WTRU of claim 1, wherein the RRC signaling indicates that at least one of the first sub-slot length for PUCCH feedback or the second sub-slot length for PUCCH feedback has a length of half of a slot.

7. The WTRU of claim 1, wherein the WTRU is configured to transmit at least two PUCCH transmissions in a single slot.

8. The WTRU of claim 7, wherein each of the at least two PUCCH transmissions in a single slot is transmitted in a respective sub-slot of the single slot.

9. The WTRU of claim 1, wherein the RRC signaling further comprises a first set of one or more PUCCH resources for the first HARQ codebook associated with the first priority, and a second set of one or more PUCCH resources for the second HARQ codebook associated with the second priority.

10. The WTRU of claim 1, wherein HARQ feedback corresponding to the first HARQ codebook is separately encoded form HARQ feedback corresponding to the second HARQ codebook.

11. A method implemented by a wireless transmit/receive unit (WTRU), the method comprising:

receiving radio resource control signaling (RRC) comprising configuration information configuring a first Hybrid Automatic Repeat Request (HARQ) codebook associated with a first priority and a second HARQ codebook associated with a second priority, wherein the RRC signaling indicates that the first HARQ codebook is associated with a first sub-slot length for physical uplink control channel (PUCCH) feedback and that the second HARQ codebook is associated with a second sub-slot length for PUCCH feedback;

receiving first downlink control information (DCI), the first DCI scheduling a first physical downlink shared channel (PDSCH) transmission, the first DCI indicating the first priority, wherein first HARQ feedback for the first PDSCH transmission is associated with the first HARQ codebook, and the first HARQ codebook is associated with the first priority;

receiving second DCI, the second DCI scheduling a second PDSCH transmission, the second DCI indicating the second priority, wherein second HARQ feedback for the second PDSCH transmission is associated with the second HARQ codebook, and the second HARQ codebook is associated with the second priority;

determining, based on a first field in the first DCI, a first time for transmitting a first PUCCH transmission comprising the first HARQ feedback for the first PDSCH transmission, the first field indicating a first number of sub-slots according to the first sub-slot length associated with the first HARQ codebook;

determining, based on a second field in the second DCI, a second time for transmitting a second PUCCH transmission comprising the second HARQ feedback for the second PDSCH transmission, the second field indicating a second number of sub-slots according to the second sub-slot length associated with the second HARQ codebook;

determining that the first PUCCH transmission and the second PUCCH transmission at least partially overlap in time; and transmitting the first PUCCH transmission and cancel at least a portion of the second PUCCH transmission based on the first priority being higher than the second priority.

12. The method of claim 11, wherein the first DCI comprises a third field, the third field indicating the first priority, and the second DCI comprises a fourth field, the fourth field indicating the second priority.

13. The method of claim 11, wherein the first field corresponds to a K1 field of the first DCI.

14. The method of claim 13, wherein, for at least one priority level, the WTRU interprets the K1 field in units of slots.

15. The method of claim 11, wherein the RRC signaling indicates a first number of symbols for the first sub-slot length for PUCCH feedback and a second number of symbols for the second sub-slot length for PUCCH feedback, wherein the first number of symbols and the second number of symbols are different.

16. The method of claim 11, wherein the RRC signaling indicates that at least one of the first sub-slot length for PUCCH feedback or the second sub-slot length for PUCCH feedback has a length of half of a slot.

17. The method of claim 11, wherein the WTRU transmits at least two PUCCH transmissions in a single slot.

18. The method of claim 17, wherein each of the at least two PUCCH transmissions in a single slot is transmitted in a respective sub-slot of the single slot.

19. The method of claim 11, wherein the RRC signaling further comprises a first set of one or more PUCCH resources for the first HARQ codebook associated with the first priority, and a second set of one or more PUCCH resources for the second HARQ codebook associated with the second priority.

20. The method of claim 11, wherein HARQ feedback corresponding to the first HARQ codebook is separately encoded form HARQ feedback corresponding to the second HARQ codebook.

\* \* \* \* \*

UNITED STATES PATENT AND TRADEMARK OFFICE
CERTIFICATE OF CORRECTION

| | | |
|---|---|---|
| PATENT NO. | : 12,177,868 B2 | Page 1 of 1 |
| APPLICATION NO. | : 18/759537 | |
| DATED | : December 24, 2024 | |
| INVENTOR(S) | : Lakshmi R. Iyer et al. | |

It is certified that error appears in the above-identified patent and that said Letters Patent is hereby corrected as shown below:

In the Claims

In Claim 1: Column 53 Line 10 to 13:
After "in time; and" delete:
"transmit the first PUCCH transmission and cancel at least a portion of the second PUCCH transmission based on the first priority being higher than the second priority;"

Signed and Sealed this
Twenty-fifth Day of March, 2025

Coke Morgan Stewart
*Acting Director of the United States Patent and Trademark Office*